United States Patent
Wang et al.

(10) Patent No.: US 12,335,159 B2
(45) Date of Patent: Jun. 17, 2025

(54) METHODS, ARCHITECTURES, APPARATUSES AND SYSTEMS FOR AGE AWARE SERVICES

(71) Applicant: InterDigital Patent Holdings, Inc., Wilmington, DE (US)

(72) Inventors: Chonggang Wang, Princeton, NJ (US); Shamim Rahman, Cote St. Luc (CA); Xavier De Foy, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 8 days.

(21) Appl. No.: 18/036,040

(22) PCT Filed: Nov. 11, 2021

(86) PCT No.: PCT/US2021/058902
§ 371 (c)(1),
(2) Date: May 9, 2023

(87) PCT Pub. No.: WO2022/103919
PCT Pub. Date: May 19, 2022

(65) Prior Publication Data
US 2023/0412516 A1   Dec. 21, 2023

Related U.S. Application Data

(60) Provisional application No. 63/113,305, filed on Nov. 13, 2020.

(51) Int. Cl.
*H04L 47/283* (2022.01)
*H04L 45/00* (2022.01)
*H04L 47/17* (2022.01)

(52) U.S. Cl.
CPC .......... *H04L 47/283* (2013.01); *H04L 45/566* (2013.01); *H04L 47/17* (2013.01)

(58) Field of Classification Search
CPC ...... H04L 47/283; H04L 47/17; H04L 45/566
See application file for complete search history.

(56) References Cited

U.S. PATENT DOCUMENTS

| 7,853,716 B1 * | 12/2010 | Baxter, III | ............ H04L 49/205 |
| | | | 709/240 |
| 2018/0131625 A1 * | 5/2018 | Kam | ....................... H04L 47/32 |

(Continued)

FOREIGN PATENT DOCUMENTS

| JP | 3954328 B2 * | 8/2007 | |
| WO | WO-2019168965 A1 * | 9/2019 | ............. H04L 45/74 |

(Continued)

OTHER PUBLICATIONS

Yu et al., "Average Age of Information in Short Packet Based Machine Type Communication," IEEE Transactions On Vehicular Technology, vol. 69, No. 9, Sep. 2020 (Year: 2020).*

(Continued)

*Primary Examiner* — Alina A Boutah
(74) *Attorney, Agent, or Firm* — Jamie T. Nguyen

(57) ABSTRACT

Procedures, methods, architectures, apparatuses, systems, devices, and computer program products that may be implemented in wireless communications. In one representative method, the WTRU may send one or more age of information (AoI) preferences for a traffic flow to a network entity, and the WTRU may receive one or more AoI rules for the traffic flow from the network entity. The WTRU may receive a packet associated with the traffic flow, and the received packet may include an indication of AoI of the packet. The WTRU may send one or more additional AoI preferences to the network entity, such as upon determining that any of the AoI preferences and/or AoI rules are not satisfied based on the indication of AoI. The indication of AoI may correspond (Continued)

to a processing state of the packet along a path in a network and/or to a time since the packet was created.

16 Claims, 39 Drawing Sheets

(56) References Cited

U.S. PATENT DOCUMENTS

| | | | |
|---|---|---|---|
| 2018/0159799 A1* | 6/2018 | Tietz | H04L 49/254 |
| 2018/0159800 A1* | 6/2018 | Tietz | H04L 49/9047 |
| 2020/0120025 A1* | 4/2020 | Voit | H04L 45/74 |

FOREIGN PATENT DOCUMENTS

| | | | | |
|---|---|---|---|---|
| WO | WO-2019193154 A1 | * | 10/2019 | |
| WO | WO-2020036768 A1 | * | 2/2020 | H04L 12/189 |

OTHER PUBLICATIONS

Kam et al., On the Age of Information With Packet Deadlines, IEEE Transactions On Information Theory, vol. 64, No. 9, Sep. 2018 (Year: 2018).*

Jing et al., "Minimizing the Age of Multisource Information With Budget Constraint in Internet of Things," IEEE Internet of Things Journal, vol. 9, No. 8, Apr. 15, 2022. (Year: 2022).*

Maice Costa et al., "Age of Information with Packet Management", IEEE International Symposium on Information Theory, 2014, 5 pages.

R. Shreedhar et al.,. "ACP: An End-to-End Transport Protocol for Delivering Fresh Updates in the Internet-of-Things," 2019, 12 pages.

R.D. Yates, "The Age of Information in Networks: Moments, Distribution, and Sampling," 2020, 17 pages.

Third Generation Partnership Project, "Technical Specification Group Services and System Aspects; System architecture for the 5G System (5GS); Stage 2 (Release 16)," 3GPP TS 23.501 V16.5.1 (Aug. 2020).

Sun Yin et al., "Age-optimal updates of multiple information flows", IEEE Infocom 2018—IEEE Conference On Computer Communications Workshops (INFOCOMWICSHPS), IEEE, Apr. 15, 2018 (Apr. 15, 2018), 10 pages.

Federico Chiariotti et al., "Information Freshness of Updates Sent over LEO Satellite Multi-Hop Networks", Arxiv.Org, Cornell University Library, 201 Olin Library Cornell University Ithaca, NY 14853, Jul. 10, 2020 (Jul. 10, 2020), 30 pages.

Corneo Lorenzo et al., "Age of Information-Aware Scheduling for Timely and Scalable Internet of Things Applications", IEEE Infocom 2019—IEEE Conference On Computer Communications, IEEE, Apr. 29, 2019 (Apr. 29, 2019), 16 pages.

Third Generation Partnership Project, "Technical Specification Group Services and System Aspects; Procedures for the 5G System (5GS); Stage 2 (Release 16)," 3GPP TS 23.502 V16.5.1 (Aug. 2020).

R. D. Yates and S. Kaul, "Real-Time Status Updating: Multiple Sources," Proceedings of IEEE International Symposium on Information Theory, 2012, 5 pages.

Costa Maice et al., "On the Age of Information in Status Update Systems With Packet Management", IEEE Transactions On Information Theory, IEEE, USA, vol. 62, No. 4, Apr. 30, 2016 (Apr. 30, 2016), 14 pages.

Quinn et al., "Network Service Header (NSH)" Internet Engineering Task Force (IETF), RFC 8300, Jan. 2018, 29 pages.

"Deterministic Networking Architecture," Internet Engineering Task Force (IETF) 8655, Oct. 2019, 38 pages.

3rd Generation Partnership Project; Technical Specification Group Services and System Aspects; Study on support of the 5GMSG Service; (Release 17), 3GPP TR 23.700-24 V1.1.0, Oct. 2020.

Network 2030 Architecture Framework; ITU-T FG NET-2030 Technical Specification, Focus Group at Itu T for SG13, Nov. 27, 2019.

Halpern, et al., "Internet Engineering Task Force (IETF) RFC: 7665, Service Function Chaining (SFC) Architecture", Oct. 2015, 32 pages.

* cited by examiner

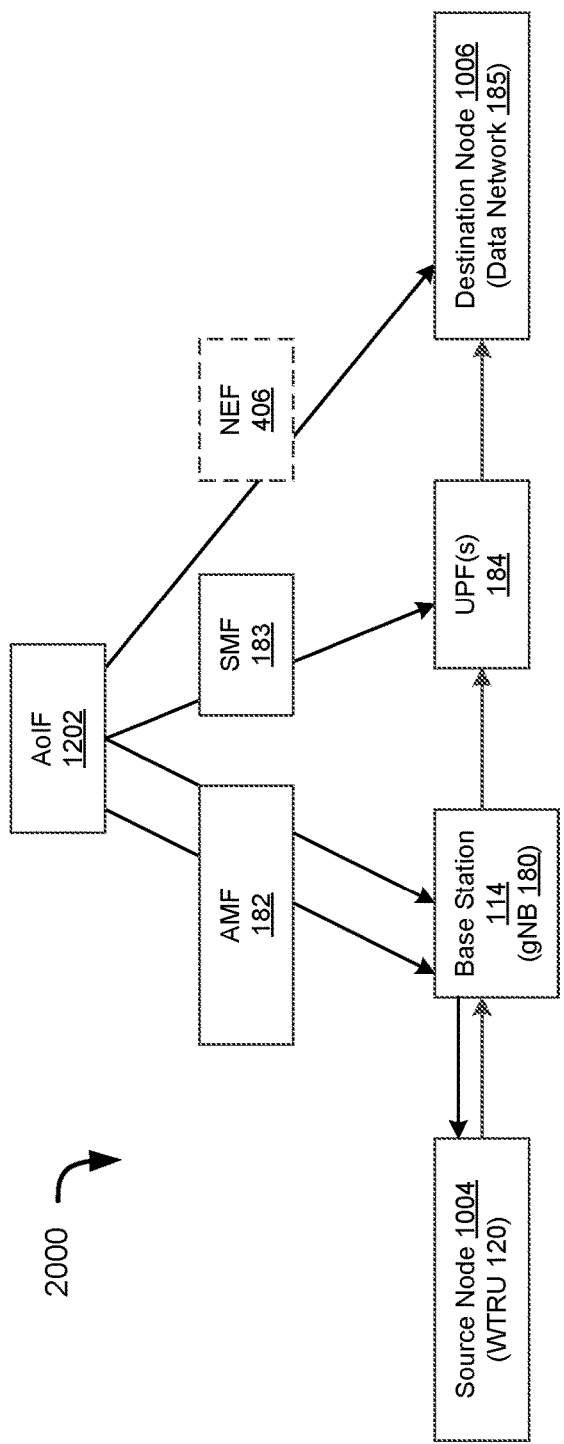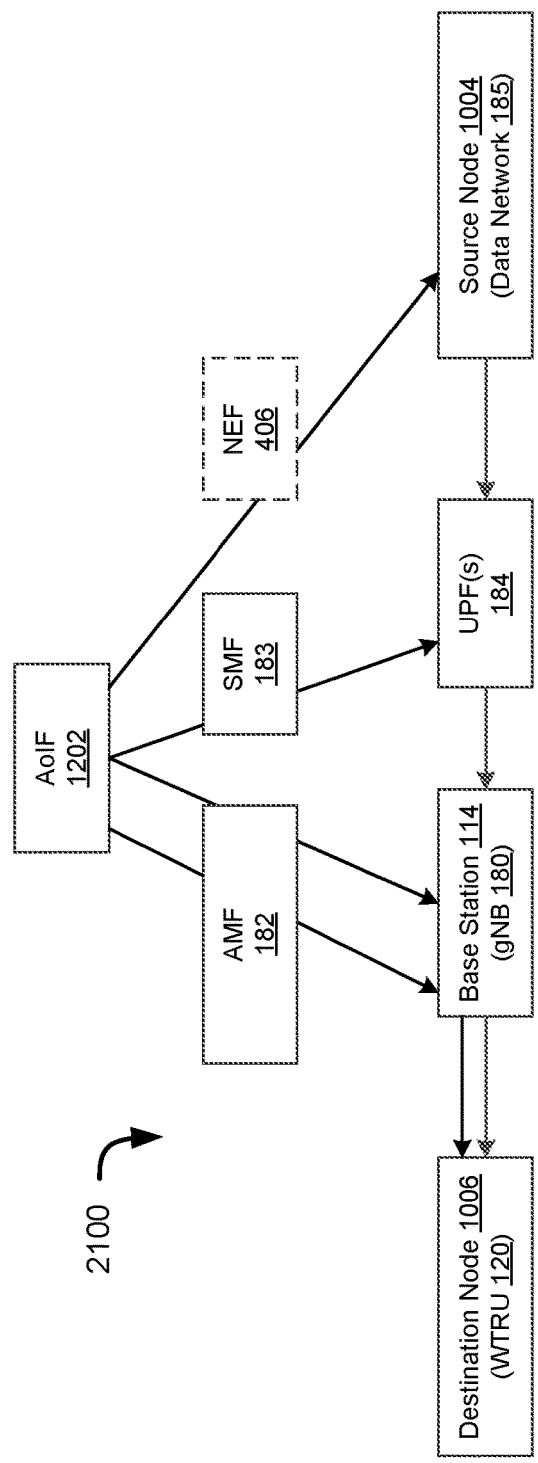

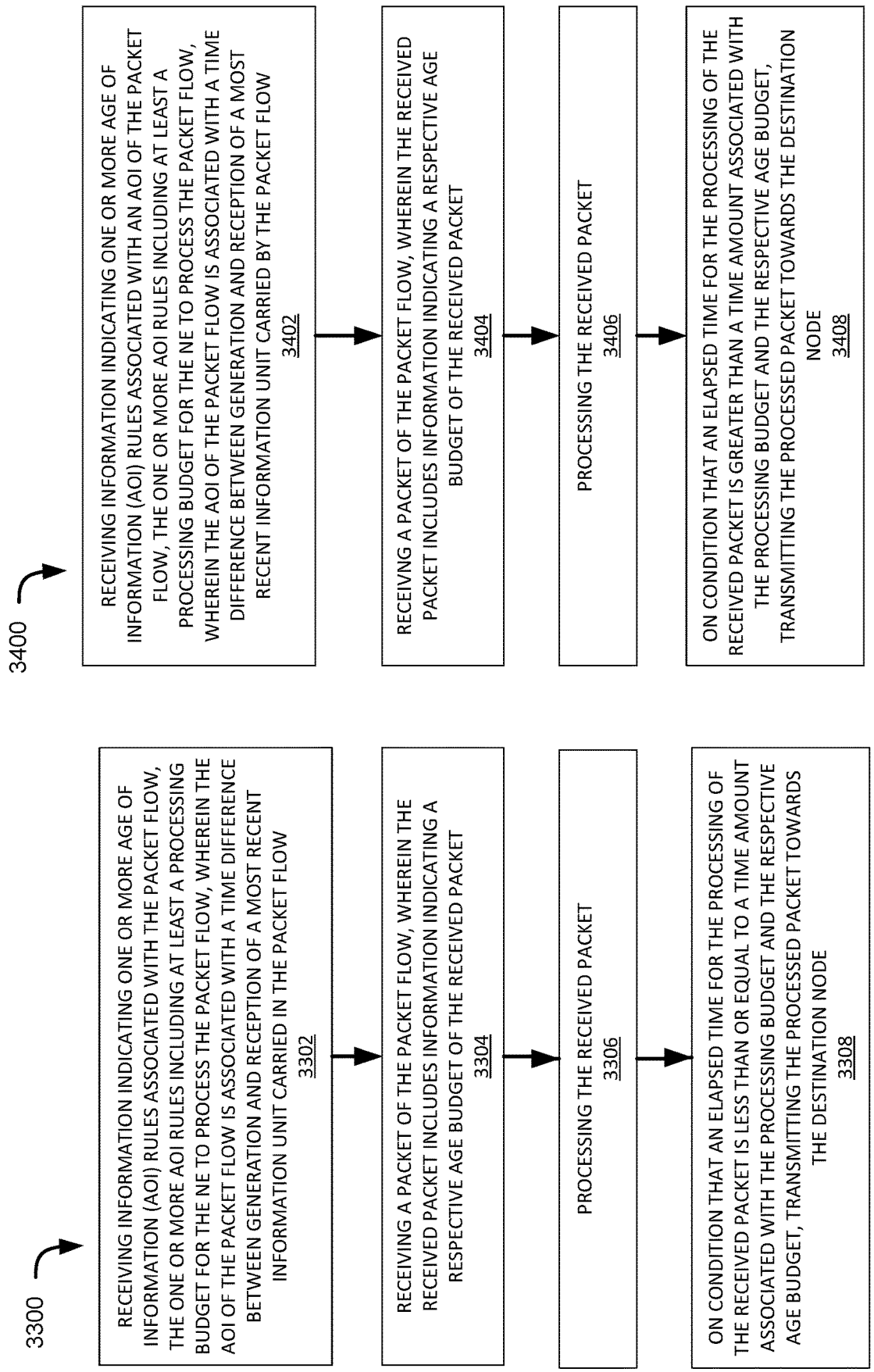

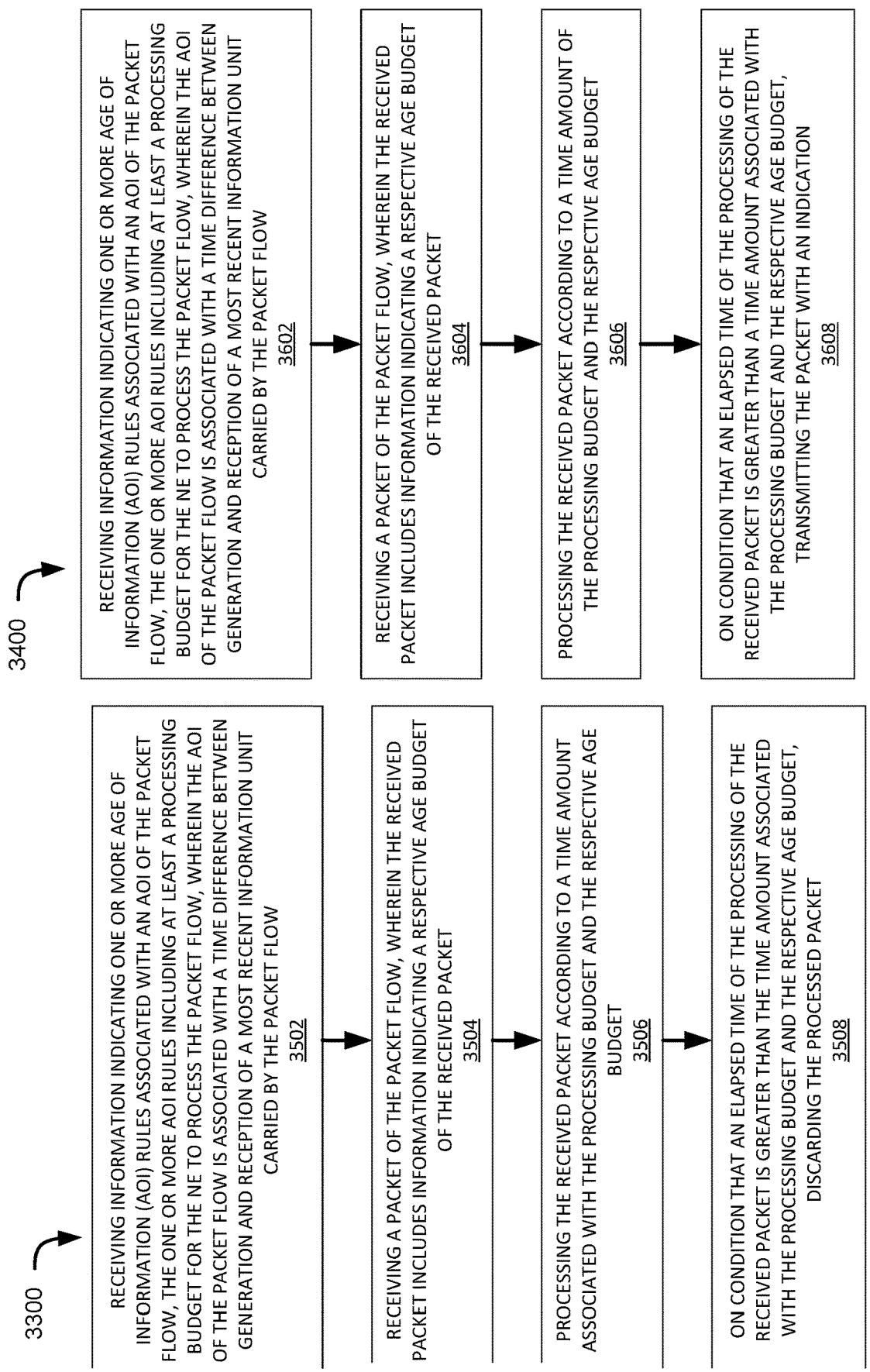

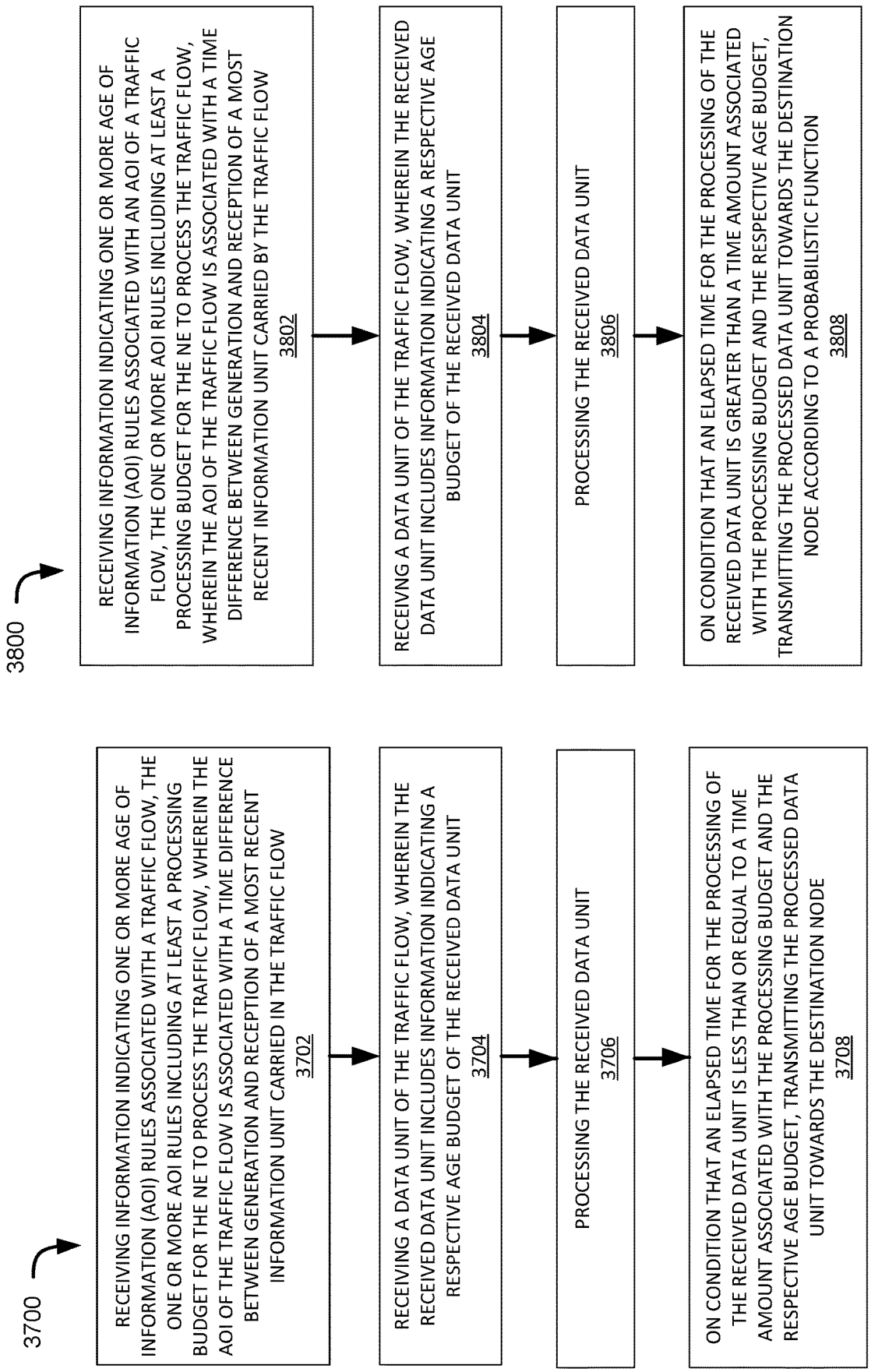

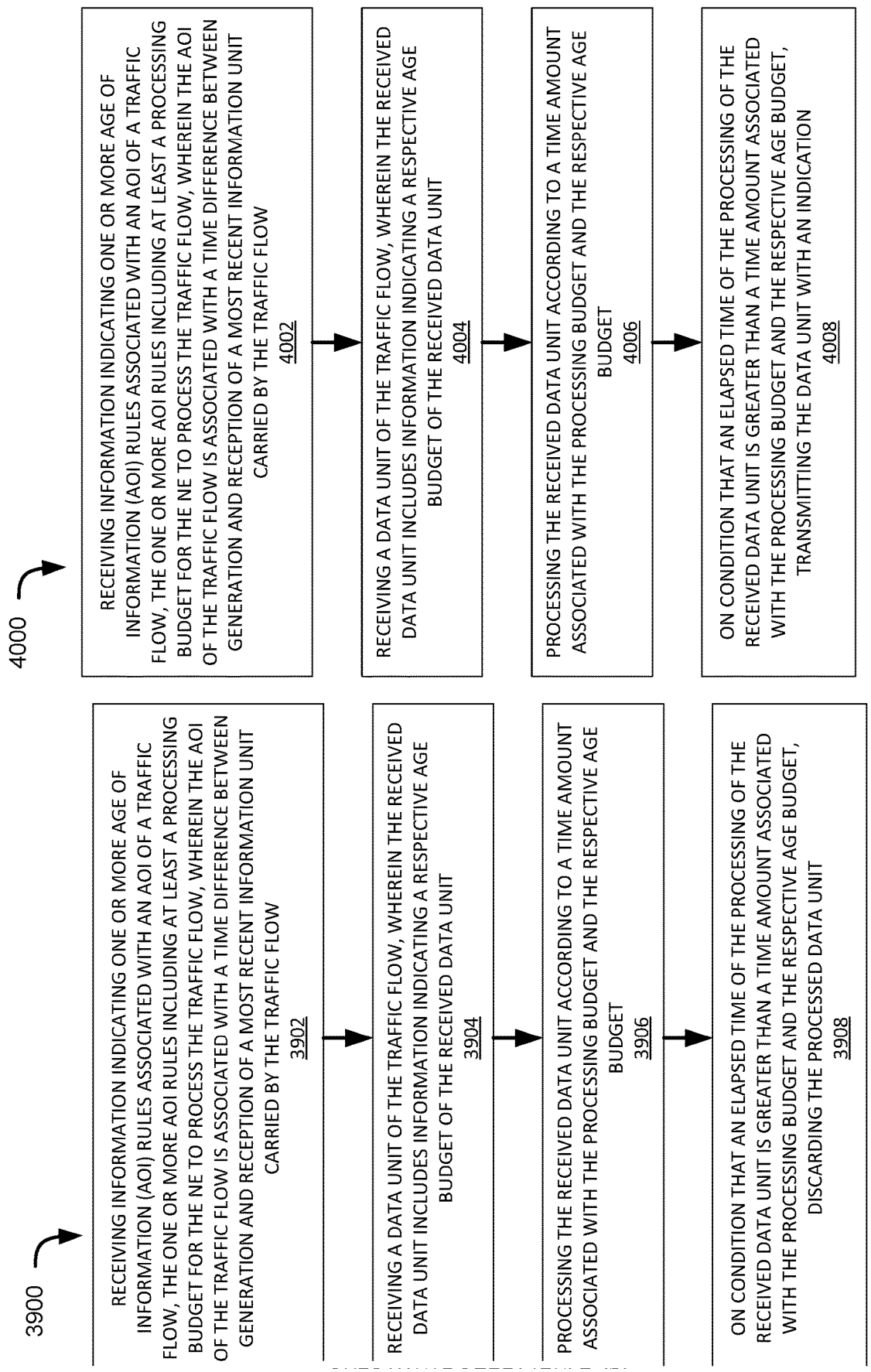

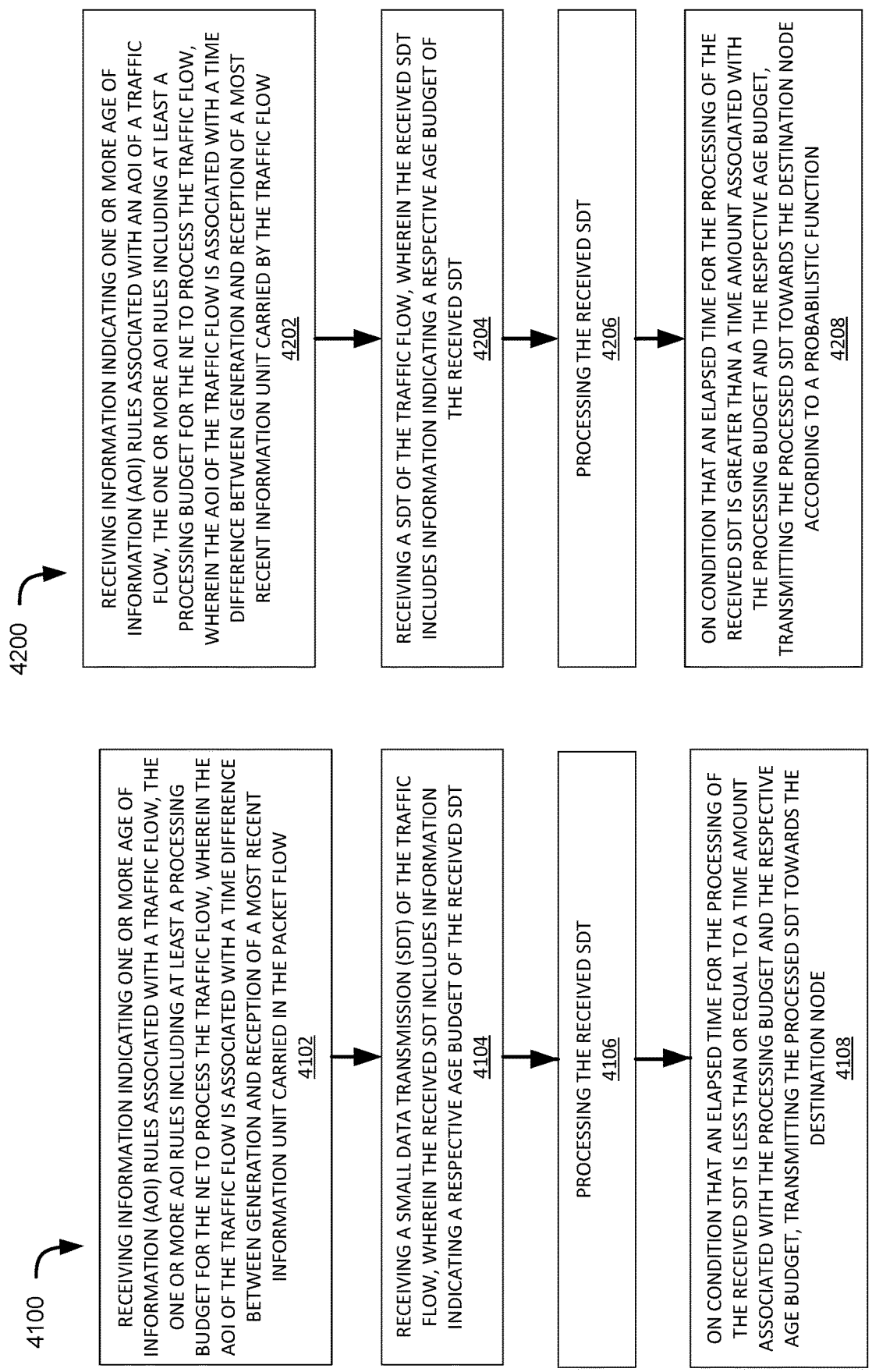

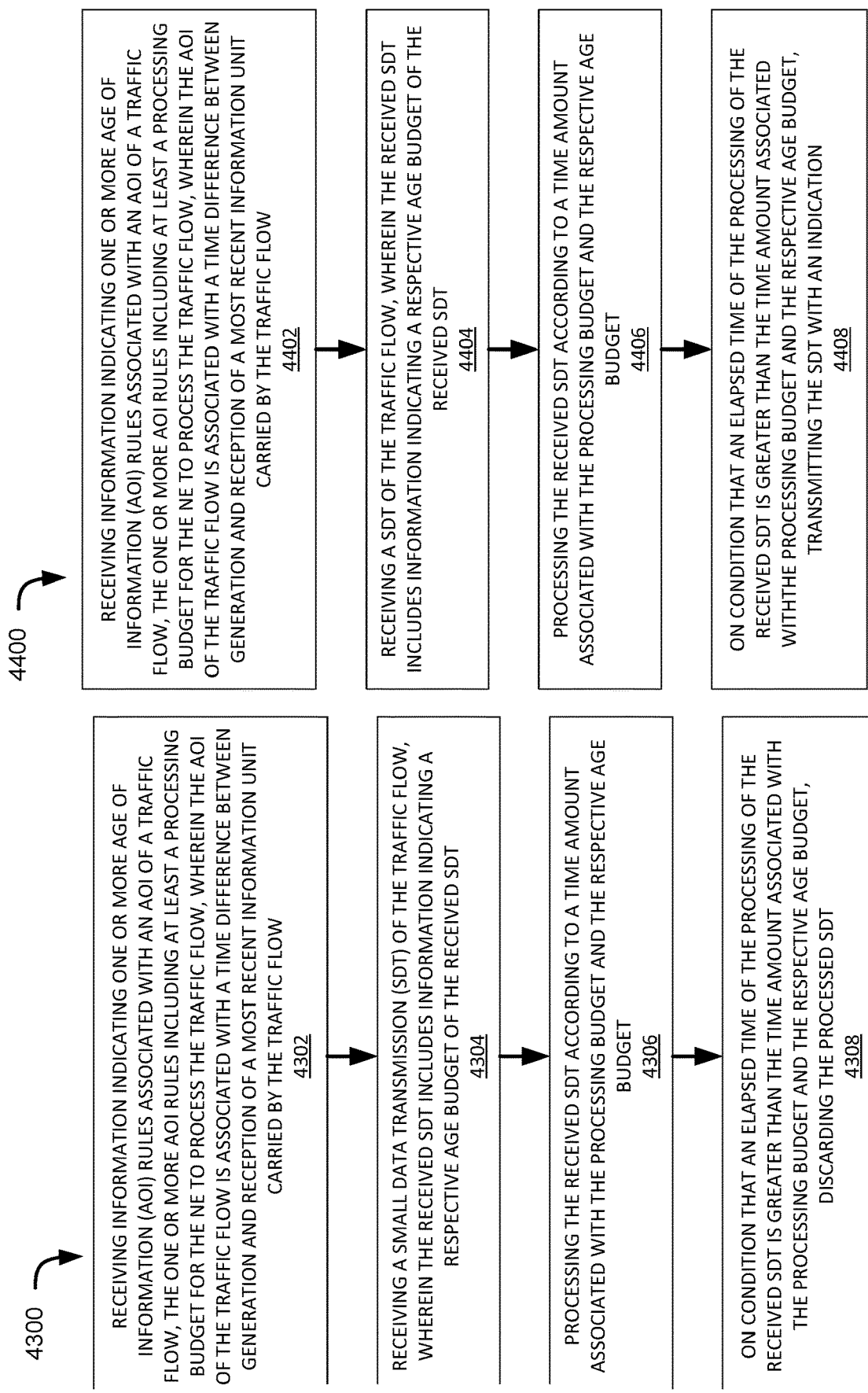

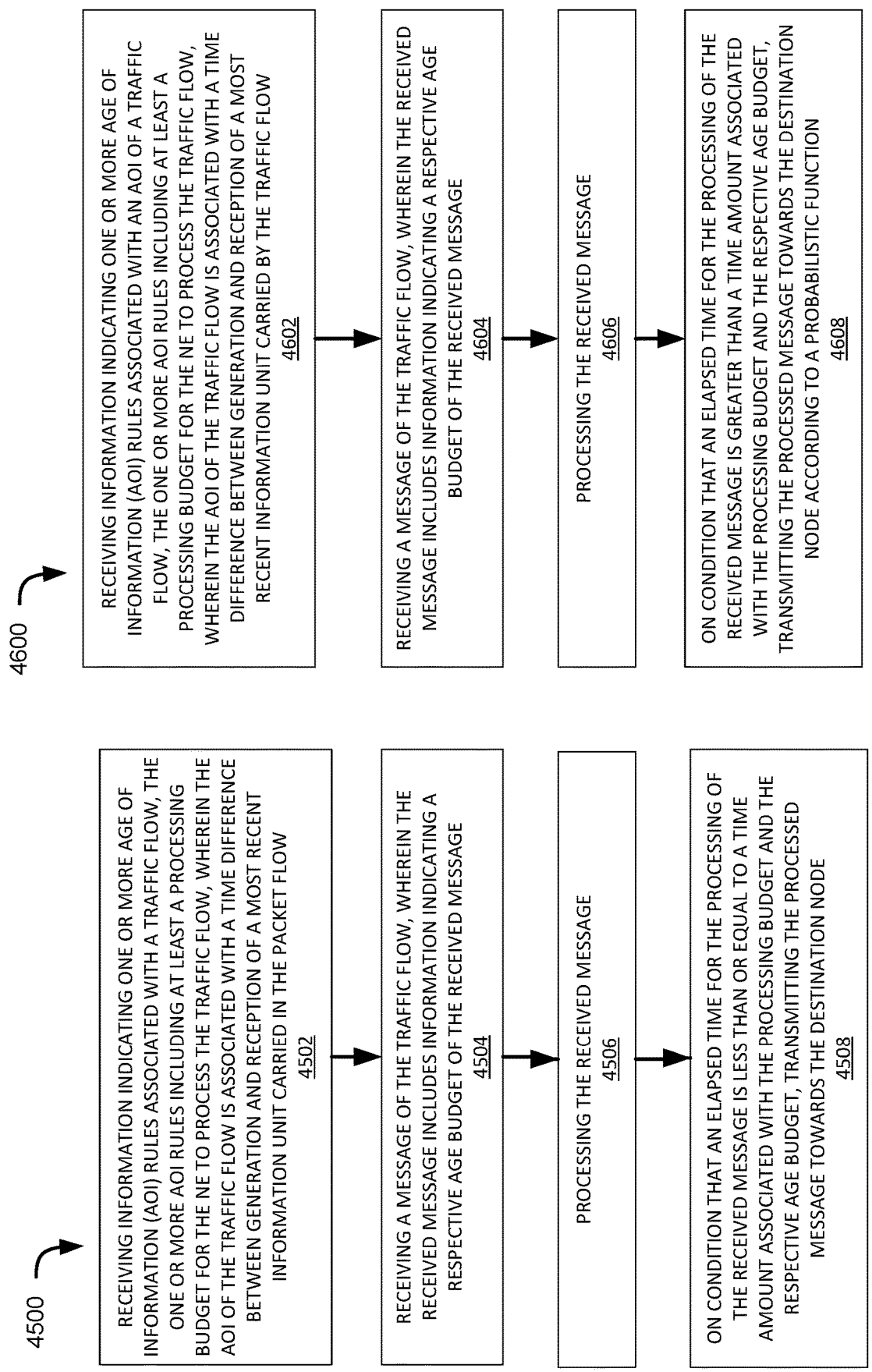

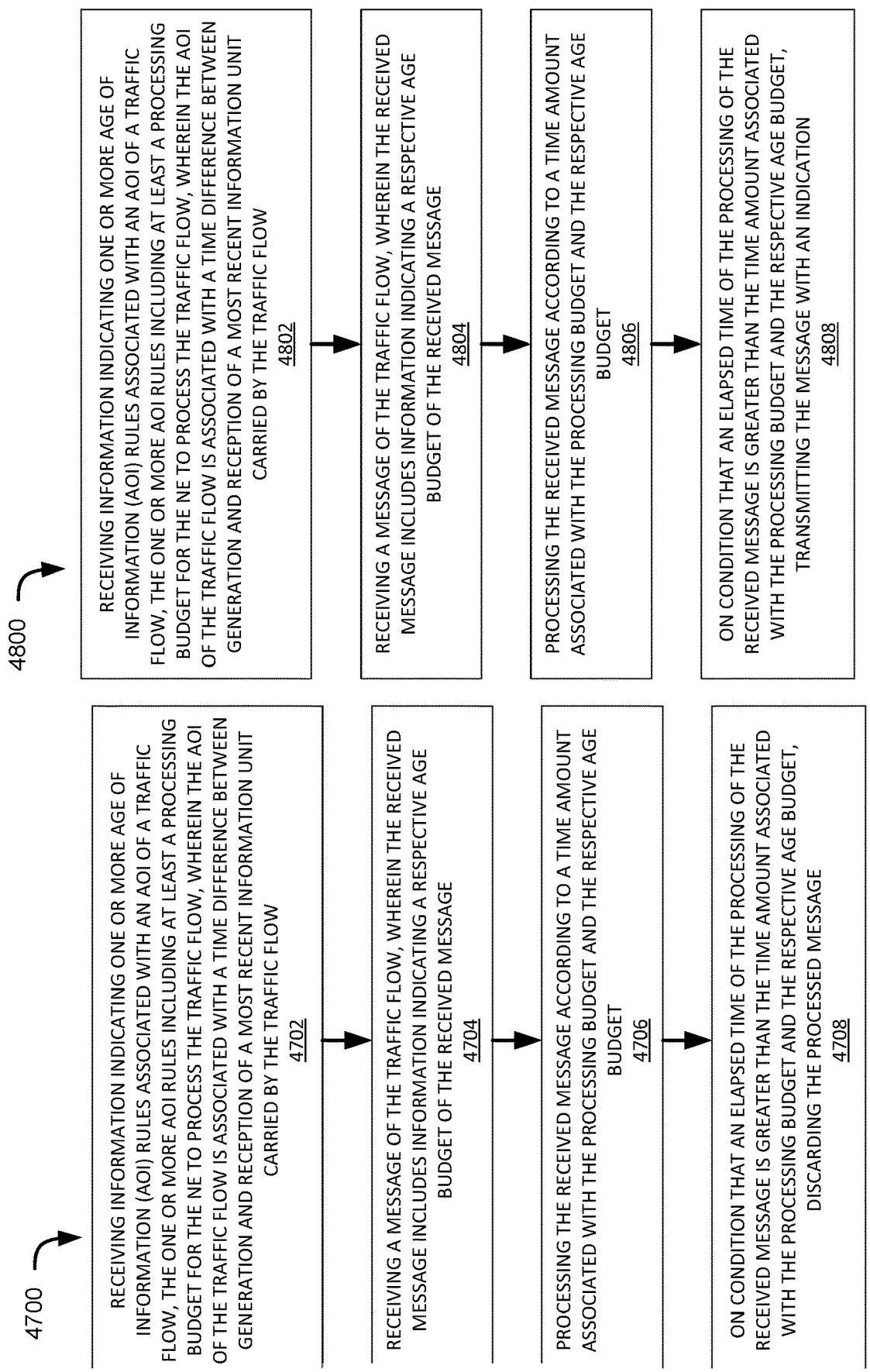

METHODS, ARCHITECTURES, APPARATUSES AND SYSTEMS FOR AGE AWARE SERVICES

CROSS-REFERENCE TO RELATED APPLICATIONS

This application is a U.S. National Stage Application under 35 U.S.C. § 371 of International Patent Application No. PCT/US2021/058902, filed 11 Nov. 2021, which claims the benefit of U.S. Provisional Patent Application No. 63/113,305 filed 13 Nov. 2020, the contents of which is incorporated herein by reference.

BACKGROUND

The present disclosure is generally directed to the fields of communications, software and encoding, including, for example, to methods, architectures, apparatuses, systems directed to age-aware services for traffic flows to a destination node 1006 and/or from a source node.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref.") in the FIGs. indicate like elements, and wherein:

FIG. 20 is a diagram illustrating a representative age-aware mobile-originated traffic flow in a 5G and/or 6G data plane;

FIG. 21 is a diagram illustrating a representative age-aware mobile-terminated traffic flow in a 5G and/or 6G data plane;

FIG. 33 is a diagram illustrating a representative procedure for processing a packet flow;

FIG. 34 is a diagram illustrating another representative procedure for processing a packet flow;

FIG. 35 is a diagram illustrating another representative procedure for processing a packet flow;

FIG. 36 is a diagram illustrating another representative procedure for processing a packet flow;

FIG. 37 is a diagram illustrating a representative procedure for processing a traffic flow;

FIG. 38 is a diagram illustrating another representative procedure for processing a traffic flow;

FIG. 39 is a diagram illustrating another representative procedure for processing a traffic flow;

FIG. 40 is a diagram illustrating another representative procedure for processing a traffic flow;

FIG. 41 is a diagram illustrating a representative procedure for processing a traffic flow;

FIG. 42 is a diagram illustrating another representative procedure for processing a traffic flow;

FIG. 43 is a diagram illustrating another representative procedure for processing a traffic flow;

FIG. 44 is a diagram illustrating another representative procedure for processing a traffic flow;

FIG. 45 is a diagram illustrating a representative procedure for processing a traffic flow;

FIG. 46 is a diagram illustrating another representative procedure for processing a traffic flow;

FIG. 47 is a diagram illustrating another representative procedure for processing a traffic flow; and FIG. 48 is a diagram illustrating another representative procedure for processing a traffic flow.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
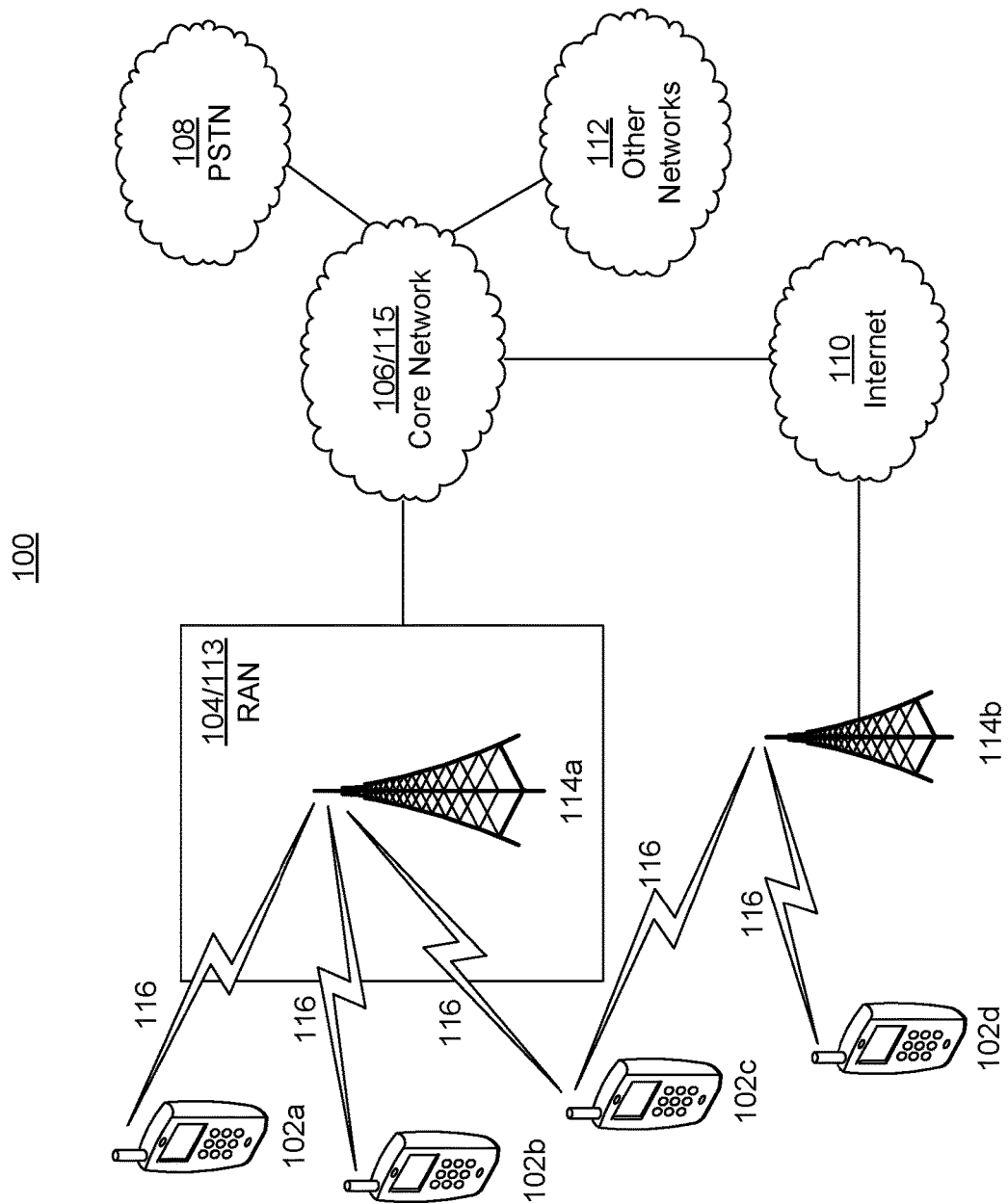
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (Vol P) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
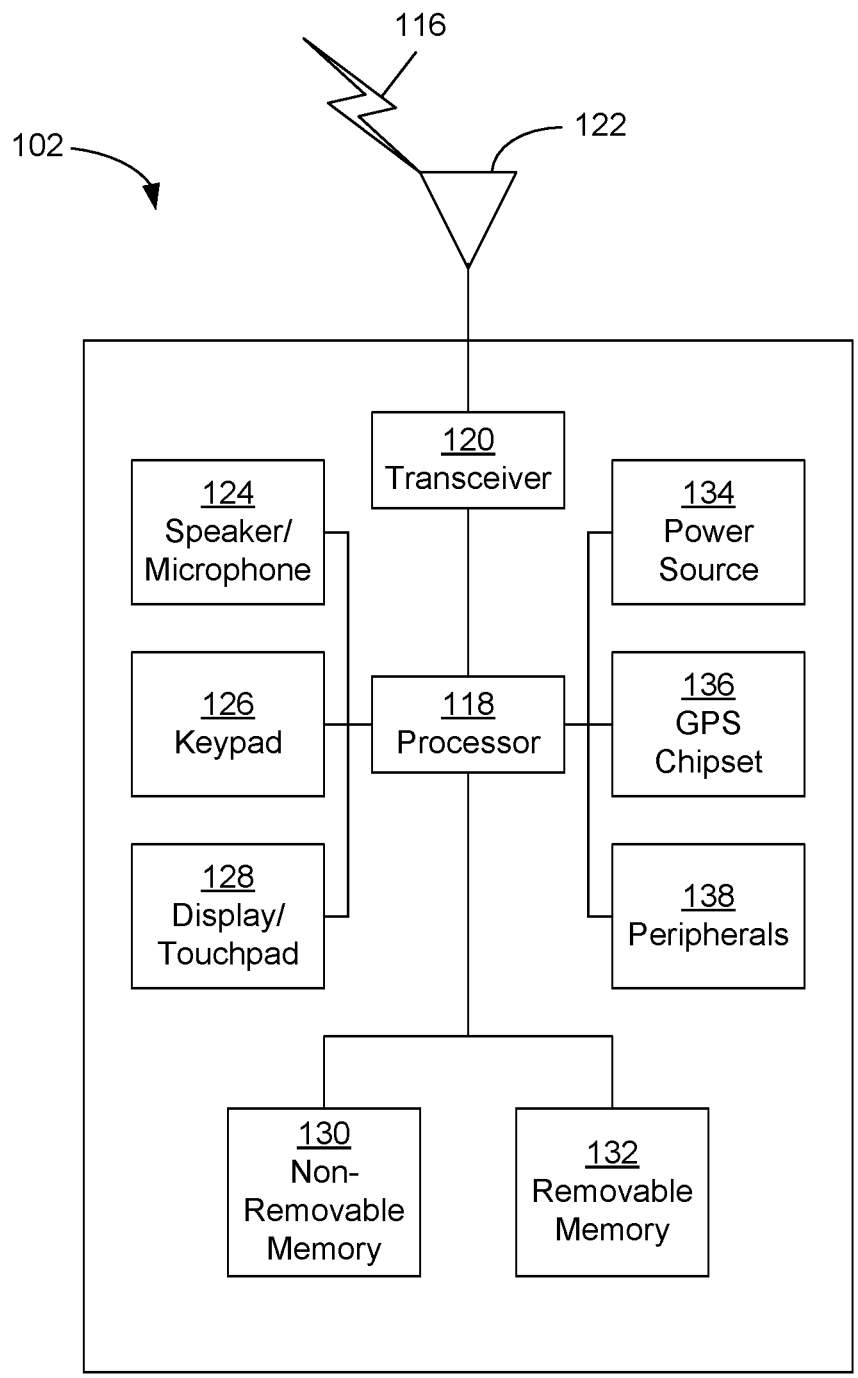
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (10), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
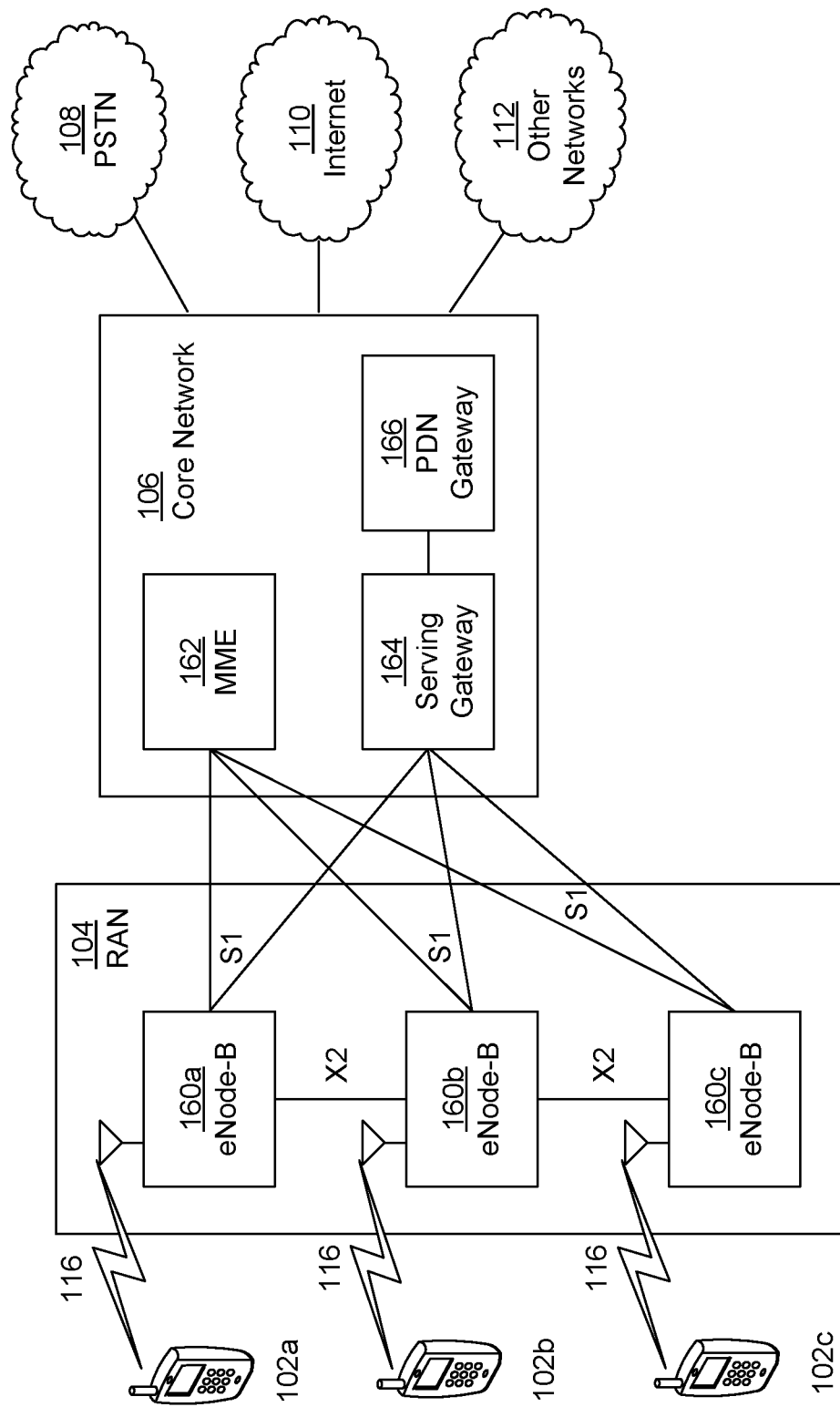
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL)

and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
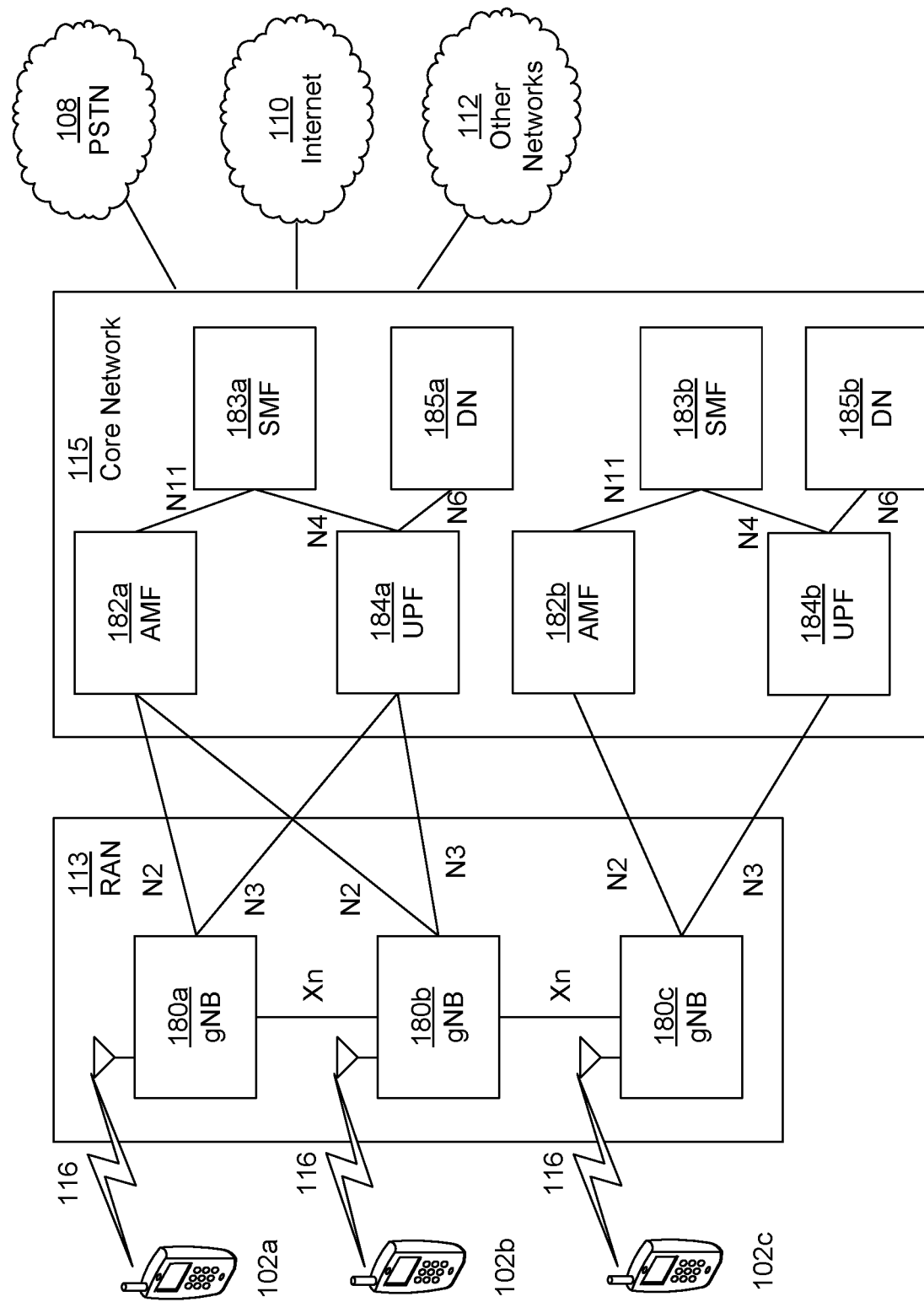
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c ). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c . For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a -b, eNode-Bs 160a -c, MME 162, SGW 164, PGW 166, gNBs 180a -c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although, a Network Access Point (NAP) is shown to be a base station, an eNB and/or a gNB, among others, in FIGS. 1A to 1D, it should be understood other network access points are contemplated including 5G and beyond NAPs. For example, a NAP may include a distributed stack (e.g., set of layers) virtualized over any number of devices (e.g., hardware modules) which, in operation, may act as a NAP. In the following description NAP, eNB, gNB and BS may be used interchangeably.

The following terminology may be used throughout this disclosure: Fifth Generation (5G); 5G Core Network (5GC); 5G System (5GS); Sixth Generation (6G); Application Function (AF); Access and Mobility Management Function (AMF); Age of Information (AoI); Age of Information Function (AoIF); Beyond 5G (B5G); Data Network (DN); Internet of Vehicles (IoV); Network Exposure Function (NEF); Network Function (NF); Network Repository Function (NRF); Policy Control Function (PCF); Radio Access Network (RAN); Session Management Function (SMF); Service or Network Function (SNF); SNF Repository (SNFR); Unified Data Management (UDM); Unified Data Repository (UDR); Unstructured Data Storage Function (UDSF); User Plane Function (UPF); and User Equipment (UE).

Overview

Age of Information (AoI)

Age of Information (AoI) is a proposed performance metric which may measure the freshness of a traffic flow as received at a destination node. Compared to traditional latency that measures the delay of an individual packet, AoI may not be constrained to being about the delay of a single packet or a single information unit and may rather reflect the evolving freshness of information units contained in the overall (e.g., whole) traffic flow (also referred to herein as "freshness of the traffic flow"). An information unit, in general, may be an application-layer information unit (e.g., a temperature, speed, pressure, image and/or sound sample and/or reading) that may be transported in a traffic flow. A packet may contain one, more than one, or less than one information unit.

Latency could be a one-hop delay or an end-to-end delay. In contrast, AoI is generally not about a single hop, but a measurement of changing freshness of the traffic flow at a destination node or a proxy node of the destination node). For example, AoI may be measured as a maximum and/or average value of the freshness (e.g., the amount of time between generation and reception/usage) of any (e.g., all) information units in a traffic flow, such as over a sliding time window. There is no direct relationship between AoI and latency. In other words, a lower latency does not necessarily lead to a lower AoI. For example, if two packets belonging to a same traffic flow are received at a destination node with a low latency, the AoI of the traffic flow may be growing to a large value in a case where the second packet is generated and sent to the destination node with a long time interval after the first packet.

Figure 2:
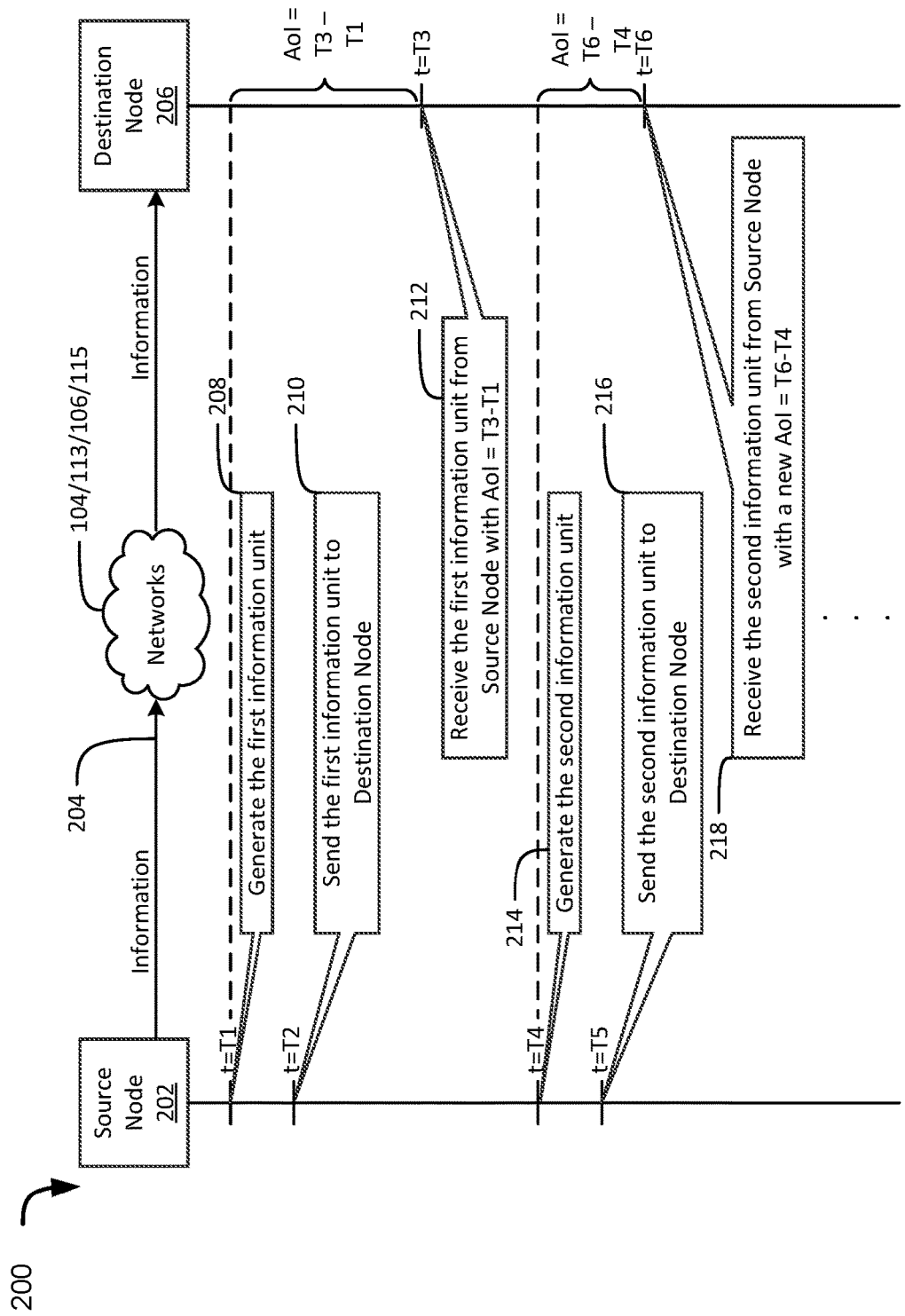
FIG. 2 is a diagram illustrating a representative communication flow and Age of Information (AoI) measurement.

FIG. 2 is a diagram illustrating a representative communication flow 200 and Age of Information measurement. In FIG. 2, a source node 202 sends packets or information units belonging to a (e.g., same) traffic flow 204 to a destination node 206 through one or more networks 104/113/106/115. The networks may introduce some transmission and queuing delay to the traffic flow 204. At a time T1 (e.g., t=T1), the source node 202 may generate a first information element at 208. The source node may send the first information element to the destination node 206 at a time T2 (e.g., t=T2) in one or more packets included in the traffic flow 204 at 210. The destination node 206 may receive (e.g., completely receive) the first information element at a time T3 (e.g., t=T3) at 212. Upon reception, the destination node 206 may calculate the (e.g., instantaneous) AoI of the traffic flow as a difference between times T3 and T1 (e.g., AoI=T3− T1). After the time T3, the AoI of the traffic flow 204 may be calculated as increasing linearly until a new (e.g., more recent) information unit is received at the destination node 206.

At the time T4 (e.g., t=T4), the source node 202 may generate a second information unit at 214. The source node 202 may send the second information unit to the destination node 206 at a time T5 (e.g., t=T5) in one or more packets included in the traffic flow 204 at 216. The destination node 206 may receive (e.g., completely receive) the second information unit at a time T6 (e.g., t=T6) at 218. Upon reception, the destination node 206 may calculate the (e.g., instantaneous) AoI of the traffic flow 204 as a difference between times T6 and T4 (e.g., AoI=T6−T4). It should be understood that at the time T6 in FIG. 2, the AoI of the traffic flow 204 increases (e.g., linearly increases) from T3-T1 to (T3−T1) +(T6−T3) (e.g., T6−T1). Then, the destination node 206 updates or resets the AoI of the traffic flow 204 from T6-T1 to T6-T4, which is the instantaneous AoI calculated as a result of receiving (e.g., completely receiving) the second information unit at 218.

Figure 3:
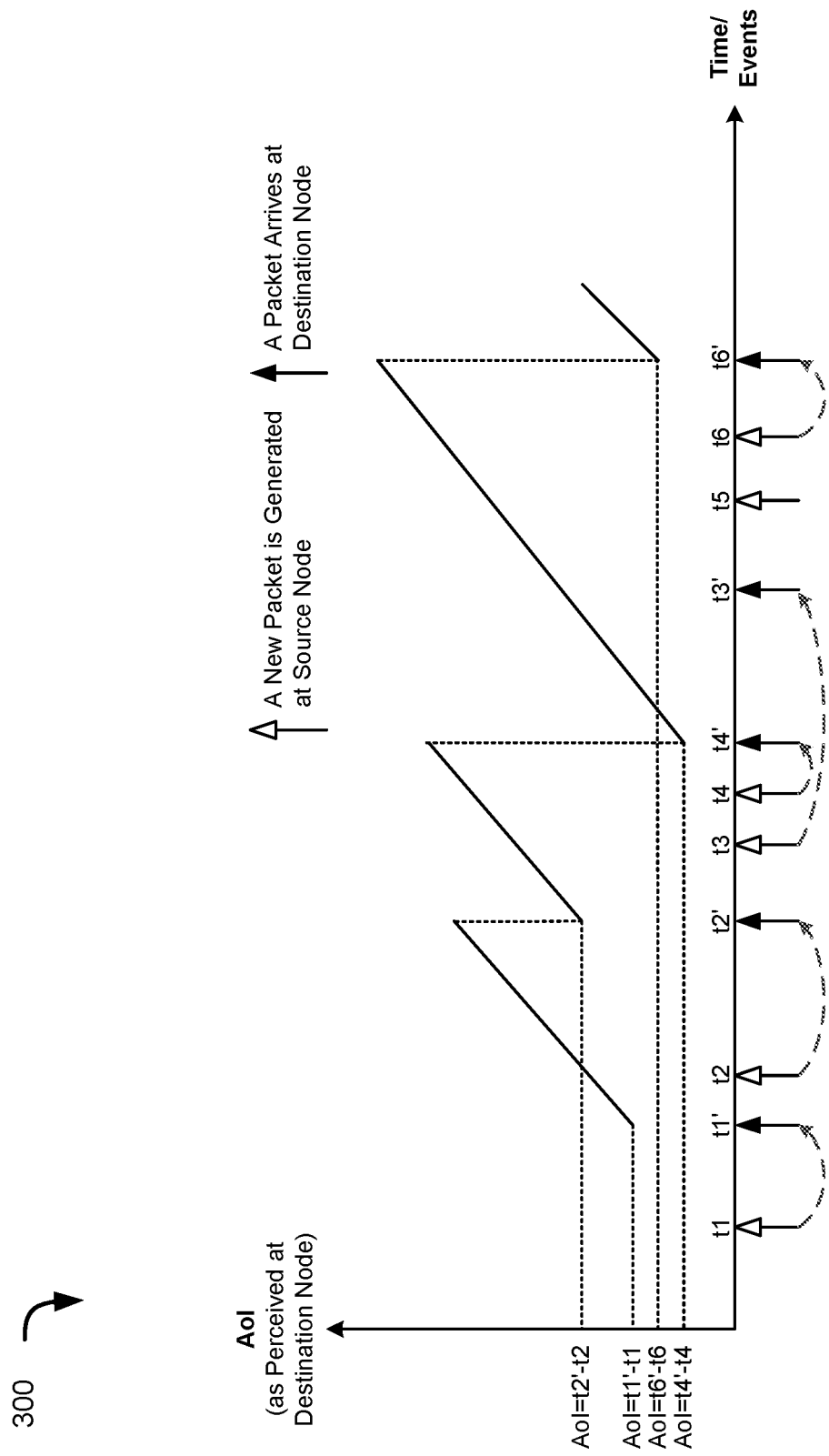
FIG. 3 is a diagram illustrating a representative relationship of AoI to a plurality of event timings.

FIG. 3 is a diagram illustrating a representative relationship 300 of AoI to a plurality of event timings (e.g., times t1, t2, t3, t4, t5, t6, t1', t2', t3', t4', t5', t6') associated with the generation and reception of six packets (e.g., a traffic flow 204). For example, each received packet of the traffic flow may contain fresh (e.g., relative to a prior packet) information and may trigger the destination node 206 to update the current AoI for the traffic flow 204. In some cases, a packet may arrive at the destination node without fresh information, and the destination node 206 may keep increasing the AoI of the traffic flow 204 which corresponds to information of the traffic flow 204 becoming less fresh (e.g., aging). The AoI of the traffic flow 204 may keep evolving (e.g., updating or increasing) no matter whether there is a new packet arriving at the destination node 206 or not.

As shown in FIG. 3, an information unit (e.g., a sensor reading and/or measurement data) may be transmitted in one packet or over multiple packets. The AoI of the traffic flow 204 may be updated when an information unit is received in full at the destination node 206. However, for the sake of simplicity one packet per information unit is represented in FIG. 3 (or, equivalently, AoI may be updated only considering reception of a last packet transporting or completing an information unit). Arrival of a new packet in a traffic flow 204 may generally lead to the resetting or reduction of AoI for the traffic flow in cases where the new packet contains more fresh information and has a lower instantaneous AoI. Lower latency of a single packet may lead to a lower instantaneous AoI, but may not guarantee a lower average or overall AoI.

In FIG. 3, representative packets (e.g., of a traffic flow 204) may be generated sequentially at a source node 202. Any of the generated packets (e.g., of the traffic flow) may be received sequentially, non-sequentially and/or not received a destination node 206. A first packet may be generated at (e.g., by) the source node 202 at time t1 and may be received at the destination node 206 at a time t1'. The AoI of the traffic flow 204 based on the first packet may calculated as t1'−t1. After t1', the AoI may be increased (e.g., linearly) after t1' such as until fresh information is received. A second packet may be generated at (e.g., by) the source node 202 at time t2 and may be received at the destination node 206 at a time t2'. The AoI of the traffic flow 204 may increase from t1' until fresh information is received at t2'. The AoI of the traffic flow based on the second packet may calculated as t2'−t2. As seen in FIG. 3, the AoI of the traffic flow 204 may be decreased to t2'-t2 upon reception of the second packet and may increase (e.g., linearly) thereafter such as until fresh information is received. A third packet may be generated at (e.g., by) the source node 202 at time t3 and a fourth packet may be generated at the source node 202 at a time t4. The fourth packet may be received at the destination node 206 at a time t4' and the third packet may be received after the fourth packet at a time t3'. The fourth packet (e.g., generated at t4) has a lower latency (e.g., t4'44), but AoI for the traffic flow may continue increasing (e.g., linearly) from the time t4' due to the third packet arriving at time t3' which is later than the arrival time t4' of the fourth packet at the destination node 206. Hence, a new packet arriving at the destination node out of order (e.g., less fresh information unit than a previously received information unit) may not reduce or reset the AoI. For example, the third packet is received at the time t3', after the fourth packet is received at t4', and the third packet may be considered to bring less fresh information than the fourth packet and may not cause to reduce or reset AoI. The AoI updated at time t4' may continue to increase (e.g., linearly) until fresh information is received. A fifth packet may be generated at time t5 and a sixth packet may be generated at a time t6. The fifth packet may not be received at the destination node 206. At time t6', the sixth packet may be received at the destination node 206. The AoI of the traffic flow 204 may continue to increase from time t4' until t6'. At time t6', the AoI of the traffic flow may be reduced or reset according to t6−t6' as the sixth packet is considered to be information which is more fresh than the fourth packet from which the AoI was last calculated.

In general, the AoI may be calculated to increase (e.g., linearly) between two arrivals of new (e.g., fresher) packets. For example, packet loss, such as the fifth packet generated at the time t5, may cause the AoI to increase until fresh information (e.g., for the traffic flow) is received. The AoI may continue to increase after t6' until fresh information (e.g., a seventh or later) packet is received at the destination node 206.

In general, a higher packet generation rate and/or transmission rate may not necessarily lead to lower AoI since packets may potentially be dropped and/or lost during transmission (e.g., along the path) and/or arrive at the destination node 206 out of order. A lower packet generation rate and/or transmission rate may imply that information contained in each packet has quite different freshness and may not necessarily bring about a lower AoI as well.

5G System Architecture

Figure 4:
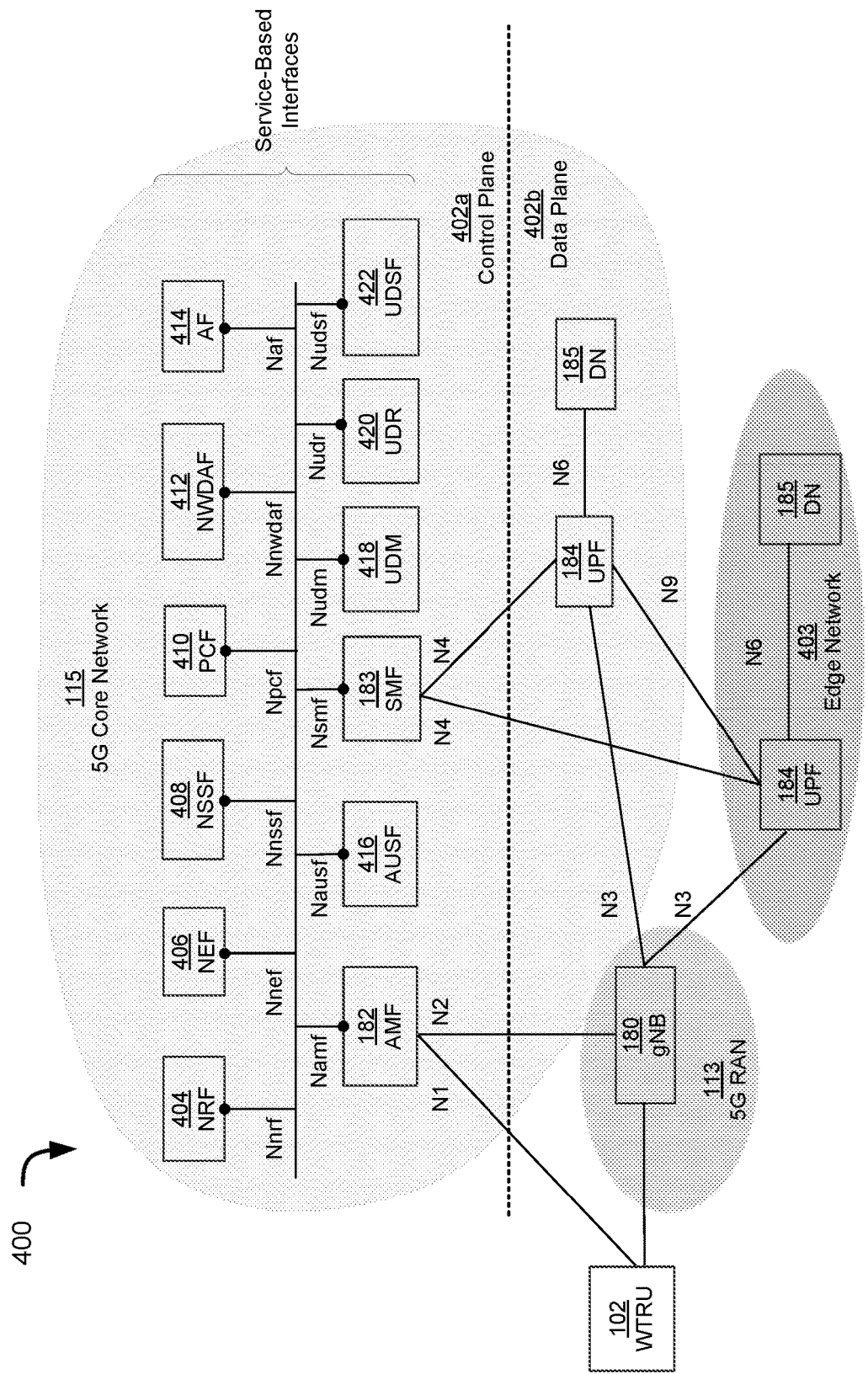
FIG. 4 is a diagram illustrating a representative fifth generation (5G) system architecture.
Figure 5:
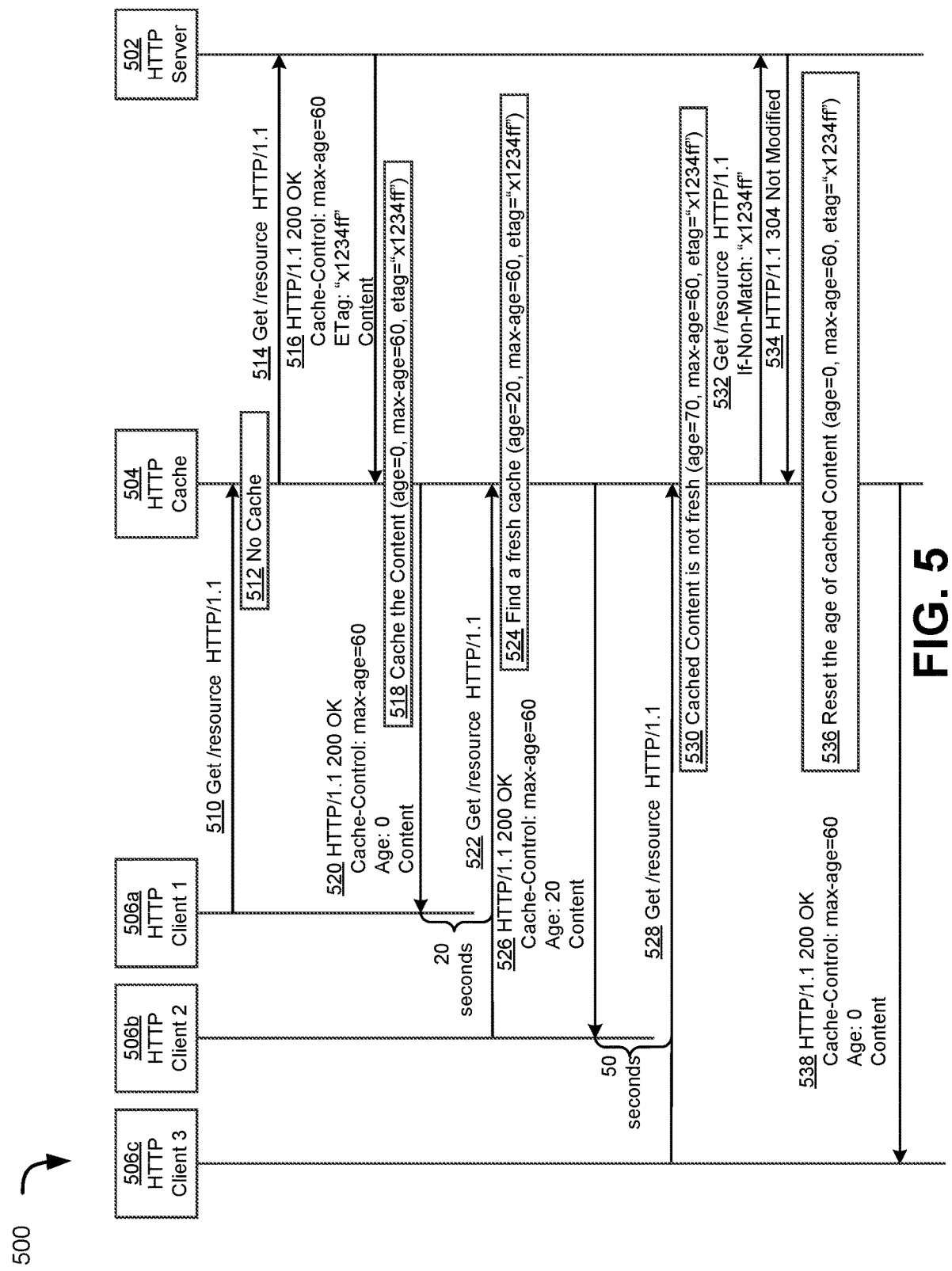
FIG. 5 is a diagram illustrating a representative communication flow for Hypertext Transfer Protocol (HTTP) caching.

FIG. 4 is a diagram illustrating a representative fifth generation (5G) system (5GS) architecture 400. In FIG. 5, the 5G system is represented as a service-based architecture. The 5G core network (5GC) 115 may be represented as a service-centric arrangement and may include a number of network functions and/or network function entities. Each network function entity may provide one or more respective services to other network function entities and may also access respective services provided by other network function entities. In other words, each network function entity may be a service provider and/or a service consumer. Each network function entity may interact with other network function entities through service-based interfaces. Service-based interfaces could be as a simple as a request/response model or a subscription/notification model. Most network function entities may be associated with control plane functionalities and few network function entities may be associated with user plane functionalities. With a service-centric 5G core network, the latency of inter-network-function communications may be greatly reduced and/or the scalability of the system may be improved. In addition, it may also be possible to introduce new network functions to the system. Among the existing network functions as defined in the 5G system architecture, none are directly related to AoI.

In FIG. 4, the 5GC 115 may include a control plane 402a and a data plane 402b. The control plane 402a may have a Network Repository Function (NRF) 404, a Network Exposure Function (NEF) 406, a Network Slice Selection Function (NSSF) 408, a Policy Control Function (PCF) 410, a Network Data Analytics Function (NWDAF) 412, an Application Function (AF) 414, an Access and Mobility Management Function (AM F) 182, an Authentication Server Function (AUSF) 416, a Session Management Function (SMF) 183, a Unified Data Management Function (UDM) 418, a Unified Data Repository (UDR) 420, and/or a Unified Data Storage Function (UDSF) 422 which are connected by respective service-based interfaces (e.g., Nnrf, Nnef, etc.). The data plane 402b may include a User Plane Function (UPF) 184 which may respectively connect by an N6 interface to a data network (DN) 185. An edge network 403 may include a UPF 184 which may respectively connect by an N6 interface to a data network (DN) 185. A 5G RAN may have at least one gNB 180 which connects by an N2 interface to the AMF 182, connects by respective N3 interfaces to UPFs 184 in the 5GC 115 and/or edge network 403. The SMF 183 may connect by respective N4 interfaces to the UPFs 184 in the 5GC 115 and/or edge network 403. A WTRU 102 may connect to the 5G RAN 113 and to the AMF 182 by an N1 interface 3GPP TS 23.502 specifies procedures for transmitting user traffic flows, but none of the procedures are aware of AoI metrics and may not be considered to guarantee AoI for a user traffic flow. For example, with Mobile-Originated Data Transmission via the Data Plane, a WTRU 102 may generate and send uplink data to a data network 185. In some instances, the WTRU 102 may need to initiate a control plane session management procedure to establish a PDU session with a UPF 184. A serving AMF 182 and a selected SMF 183 are two control plane functions involved in the session establishment. Once the PDU session is established, the WTRU 102 may start to send data to the data network 185 via the data plane, where uplink data may sequentially travel through the RAN 113, one or multiple UPFs 184, and the data network 185.

As another example, with Mobile-Terminated Data Transmission via the Data Plane, a WTRU 102 may receive downlink data from a data network 185. When the 5GC 115 receives downlink data from the data network, it may trigger the WTRU 102 to perform a service request and eventually establish a PDU session with a UPF 184. After, downlink data may be transmitted to the WTRU 102 sequentially through the data network 185, one or multiple UPFs 184, the RAN 113, and the WTRU 102.

As another example, with Mobile-Originated Small Data Transmission via the Control Plane, a WTRU 102 may generate and send uplink small data to a data network 185 or an Application Function (AF) 414. There are two approaches for using the control plane to transmit such small data. In a first approach, the WTRU 102 needs to establish a PDU session with a UPF, then the WTRU 102 leverages control plane protocols to transmit uplink small data along the following entities sequentially: the WTRU 102, the serving AMF 182, an SMF 183, the UPF 184, and the data network 185. In a second approach, the WTRU 102 does not need to establish a PDU session but directly sends uplink small data along the following entities sequentially: the WTRU 102, the serving AMF 182, an SMF 183, a NEF 406, and the data network 185.

As another example, with Mobile-Terminated Small Data Transmission via the Control Plane, a WTRU 102 may receive downlink small data from a data network or an AF. First, the WTRU 102 needs to establish a PDU session with a UPF 184, then the WTRU 102 leverages control plane protocols to receive the downlink small data through the following entities sequentially: the data network 185, the UPF 184, an SMF 183, the serving AMF 182, RAN 113, and the WTRU 102.

HTTP Caching

FIG. 5 is a diagram illustrating a representative communication flow 500 for HTTP caching. In the HTTP caching of FIG. 5, a HTTP response from a HTTP server 502 within the network is placed in an HTTP cache 504 which is located to closer to HTTP clients 506a, 506b, 506c. As a result, the cached HTTP response may be leveraged to serve future HTTP requests from HTTP clients without going to the HTTP server on the condition that the content contained in the cached HTTP response is still fresh.

As shown in FIG. 5, an HTTP cache process generally works as follows. A first HTTP client (e.g., Client 1) sends a first HTTP request to a resource hosted by an HTTP server. HTTP server receives the first request and generates a first HTTP response containing a content. For facilitating HTTP caching, the first response may contain metadata such as "max-age" and "Etag" where "max-age" is used to designate a maximum time (e.g., 60 seconds) the content is to be considered available to be leveraged by HTTP clients, and "Etag" is a hash of the content and can be used to check if the content has been changed or not. The HTTP cache, as a logical node, receives the first HTTP response and caches it locally and also forwards it to the first HTTP client. The age of the cached content will be linearly increased. After some time (e.g., 20 seconds), a second HTTP client (e.g., Client 2) sends a second HTTP request for the resource. HTTP cache receives the second request and finds there is a cached response (i.e., the first response), which can be used to serve the second request. Instead of forwarding the second request to HTTP server, the HTTP cache simply sends the cached response to the second HTTP client. The HTTP cache may also indicate the age of the cached content in the response being sent to the second HTTP client. After another time (e.g., 50 seconds), a third HTTP client (e.g., Client 3) sends a third HTTP request for the resource. The HTTP cache receives the third request and may find the cached response contains the resource being requested by the third request. However, the age of the content in the cached response exceeds "max-age", which means the cached response becomes outdated cannot be leveraged any more for serving HTTP requests. As a result, the HTTP cache forwards the third request to the HTTP server. The HTTP server receives the third request and generates a second new HTTP response. The HTTP server sends the second response to the third HTTP client. The HTTP cache may cache the second response locally, and forwards the same to the third HTTP client. The cached second response contains a refreshed version of the resource which may be leveraged to serve future HTTP requests.

HTTP caching aims to reduce the latency for a HTTP client to retrieve a resource with the assumption that the resource does not change frequently and/or HTTP clients are tolerable to receiving a previously cached resource. The HTTP caching procedure provides no mechanism to improve AoI. In fact, HTTP caching is likely to lead to increases in the AoI of cached content. In other words, the AoI of a traffic flow as received by a HTTP client under HTTP caching is likely to be larger (e.g., older) than a case where HTTP caching is not implemented.

CoAP Observe

Figure 6:
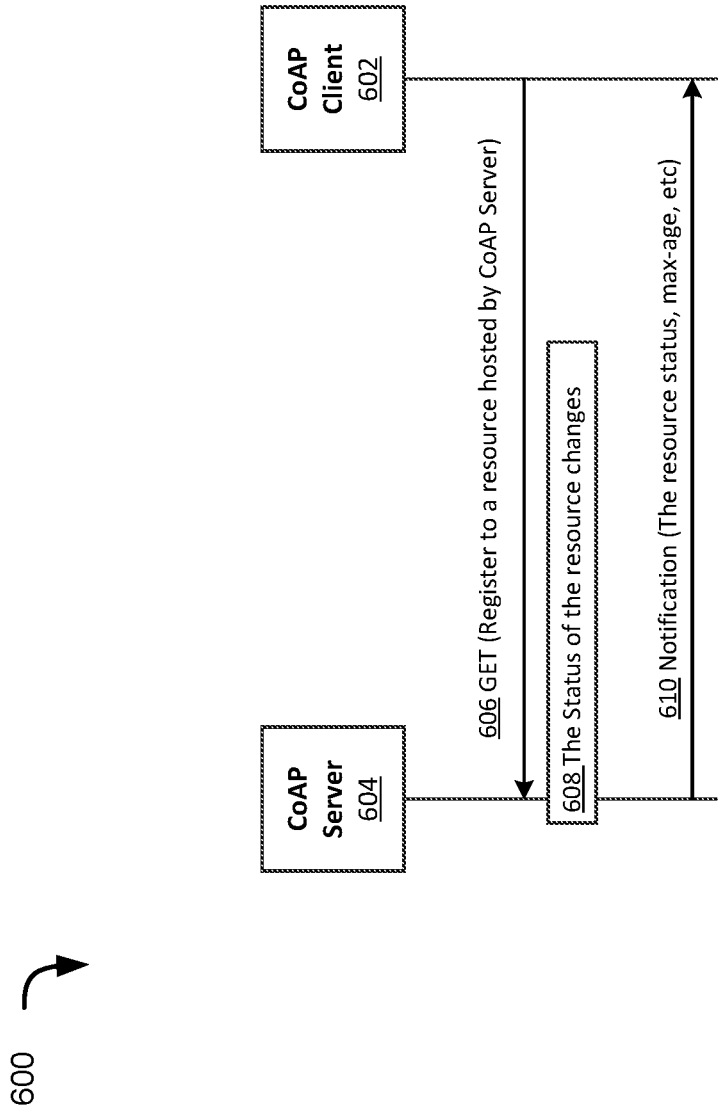
FIG. 6 is a diagram illustrating a representative procedure for Constrained Application Protocol (CoAP) Observe.

FIG. 6 is a diagram illustrating a representative procedure 600 for Constrained Application Protocol (CoAP) Observe. In FIG. 6, CoAP observe enables a CoAP client 602 to register or subscribe at 606 to a target resource, by indicating some subscription conditions, which is hosted by a CoAP server 604. After, the CoAP server 604 will send automatic notifications at 610 to the CoAP client 602 when a status of the subscribed resource changes at 608 and satisfies the subscription condition.

As shown in FIG. 6, there is no direct correlation between CoAP observe procedure and AoI. The subscription condition could lead to more frequent or less frequent notifications to the CoAP client 602. For example, the CoAP client 602 could request notification(s) at certain time intervals (e.g., more frequent notification) or could request notification(s) if and only if the value of the target resource exceeds a threshold (e.g., less frequent notification). An AoI of a traffic flow as received by the CoAP client 602 is not only related to the frequency of the notifications, but is also dependent on how each and every notification is transmitted within the network between the CoAP server 604 and the CoAP client 602. In addition, the CoAP observe and/or subscription conditions are not based on or driven by AoI at all, which means they could lead to a higher or lower AoI under various scenarios but have no direct relationship with AoI.

Deadline-Aware Transport Protocol

Figure 7:
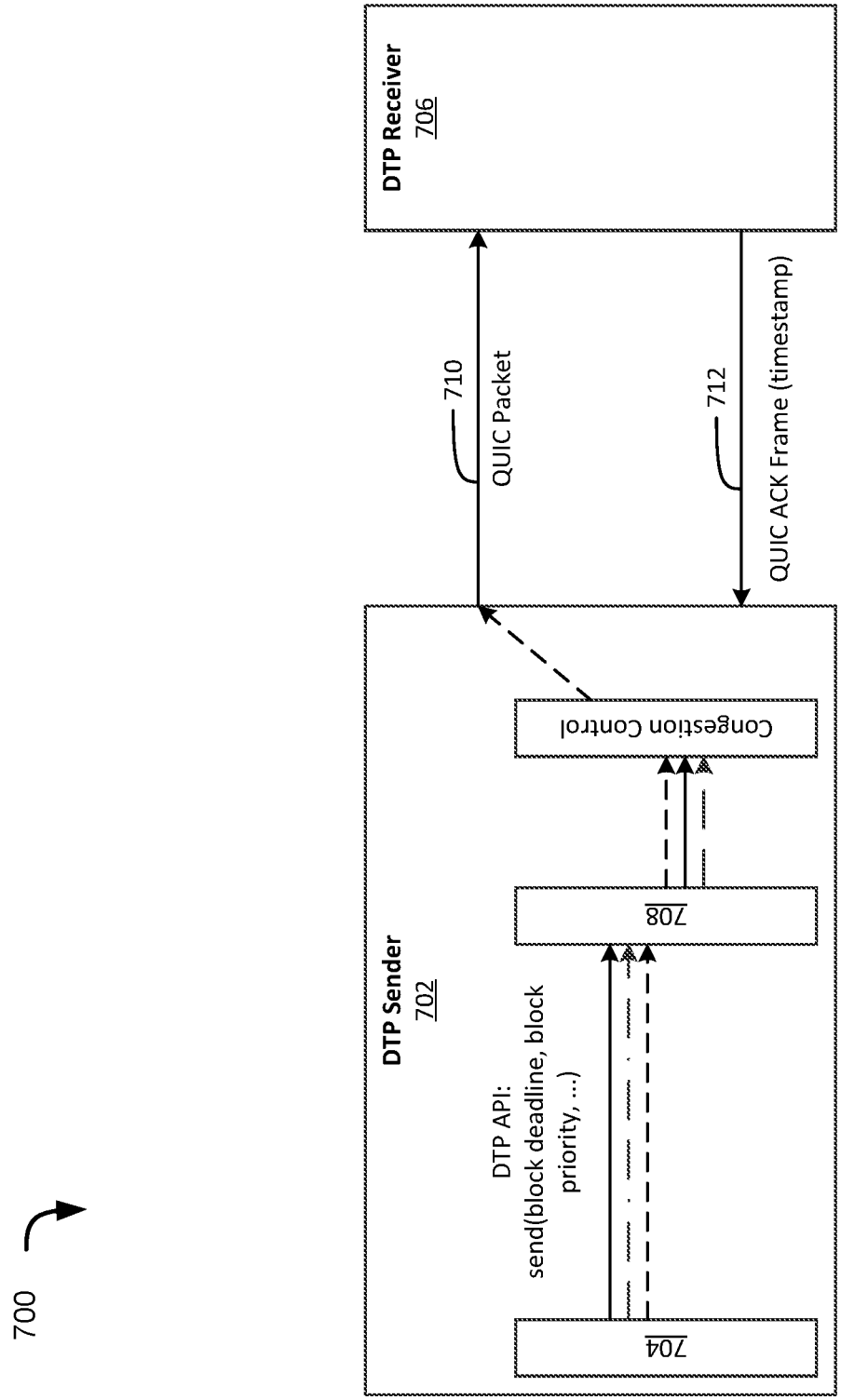
FIG. 7 is a diagram illustrating a representative procedure for Deadline-Aware Transport Protocol (DTP)

FIG. 7 is a diagram illustrating a representative procedure for Deadline-Aware Transport Protocol (DTP). DTP is a transport layer protocol based on and extending Quick Internet UDP Connections (QUIC) protocol. As shown in FIG. 7, DTP is implemented as an internal mechanism within a DTP sender 702. DTP allows an application 704 to indicate a deadline and priority of each packet to be sent from the DTP sender 702 to a DTP receiver 706. A scheduler 708 takes such deadline and priority as inputs to determine an order of QUIC packets to be sent out. Generally, a packet with an urgent deadline and higher priority will be transmitted ahead of any packets with later deadline and/or lower priority. The DTP receiver may send a QUIC ACK frame 712 including a timestamp to the DTP sender 702. The DTP mechanism may achieve earlier and quicker transmission of more important packets, but it does not have any correlation with AoI.

Deterministic Networking Architecture

IETF RFC 8655 describes a Deterministic Networking (DetNet) architecture, which may provide extremely low data loss rates and bounded end-to-end latency within a network domain. The DetNet architecture is not designed for AoI and cannot guarantee AoI for traffic flows. The DetNet architecture does not allow any collection of AoI requirements of a traffic flow, does not support any generation of AoI rules based on AoI requirements, and does not support the configuration of any AoI rules to on-route service or network functions and/or source nodes. In the DetNet architecture, intermediate nodes on the data plane do not support packet handling based on AoI rules and do not support (e.g., any) age budgeting to control and/or guarantee AoI.

Protocols and Mechanisms Based on AoI

For example, "Age of Information with Packet Management" by M. Costa et al. propose to improve traditional M/M/1 queuing by discarding any incoming packet when the queue is busy (e.g., M/M/1/1) or only allowing one waiting packet at maximum (e.g., M/M/1/2). Such a packet management strategy may help to reduce AoI especially when an amount of arriving traffic rate is high, but only works for one hop. "ACP: An End-to-End Transport Protocol for Delivering Fresh Updates in the Internet-of-Things" by R. Shreedhar et al. propose Age Control Protocol (ACP) which has an age control algorithm and is designed to run on top of User Datagram Protocol (UDP). In ACP, a source node receives acknowledge feedback with time information from a destination node, and based on the feedback the source node may periodically estimate AoI as perceived at the destination node. The source node may then adjust a sending rate based on the estimated AoI. In general, ACP provides an end-to-end approach which relies on periodic feedback from the destination node and AoI estimation at the source node.

Internet of Vehicles

Figure 8:
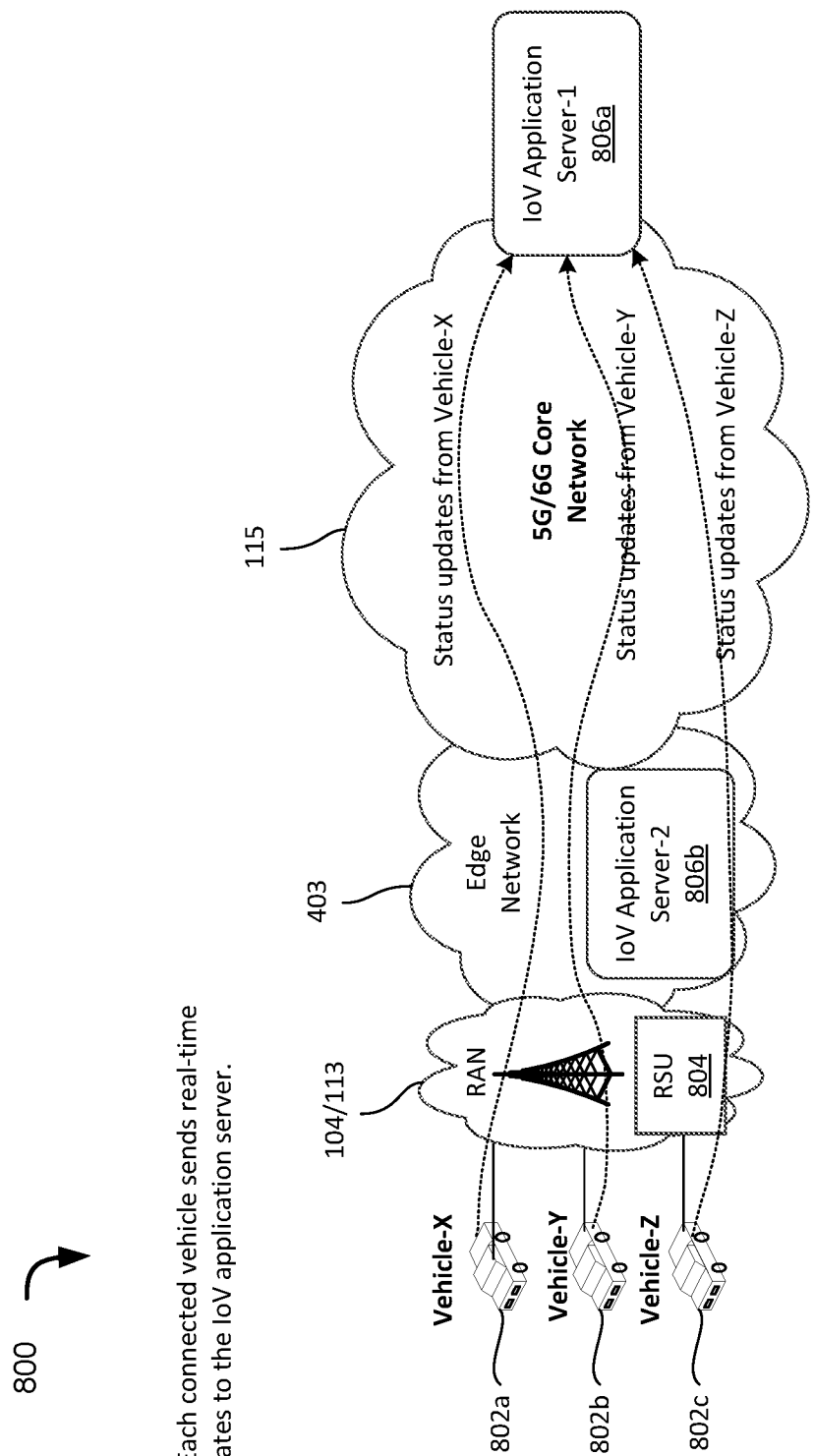
FIG. 8 is a diagram illustrating a representative Internet of Vehicles (IoV) system.

FIG. 8 is a diagram illustrating a representative Internet of Vehicles (IoV) system 800. In the IoV system of FIG. 8, a number of vehicles (e.g., Vehicle-X 802a, Vehicle-Y 802b, and Vehicle-Z 802c) are connected to a RAN 104/113 and/or a roadside unit (RSU) 804. The RAN may serve to connect the vehicles to one or more IoV application servers (e.g., server-1 806a and server-2 806b) via 5G/6G systems, which may include RANs 104/113, edge networks 403, and 5G/6G core networks 115. For example, each connected vehicle 802a, 802b, 802c may send respective real-time status updates on vehicle conditions (e.g., tire pressure, speed, direction, etc.) to the IoV application server 806a and/or 806b. These status updates may form a traffic flow from a connected vehicle 802 to the IoT application server 806. In this case, the IoV application server 806 may requires an average AoI of the traffic flow to be below a threshold, referred to as an AoI requirement, such that the vehicle conditions as received at the IoT application server 806 are fresh (e.g., not older than a threshold value) and reflect a latest status of a vehicle 802.

Mobile Cloud Gaming

Figure 9:
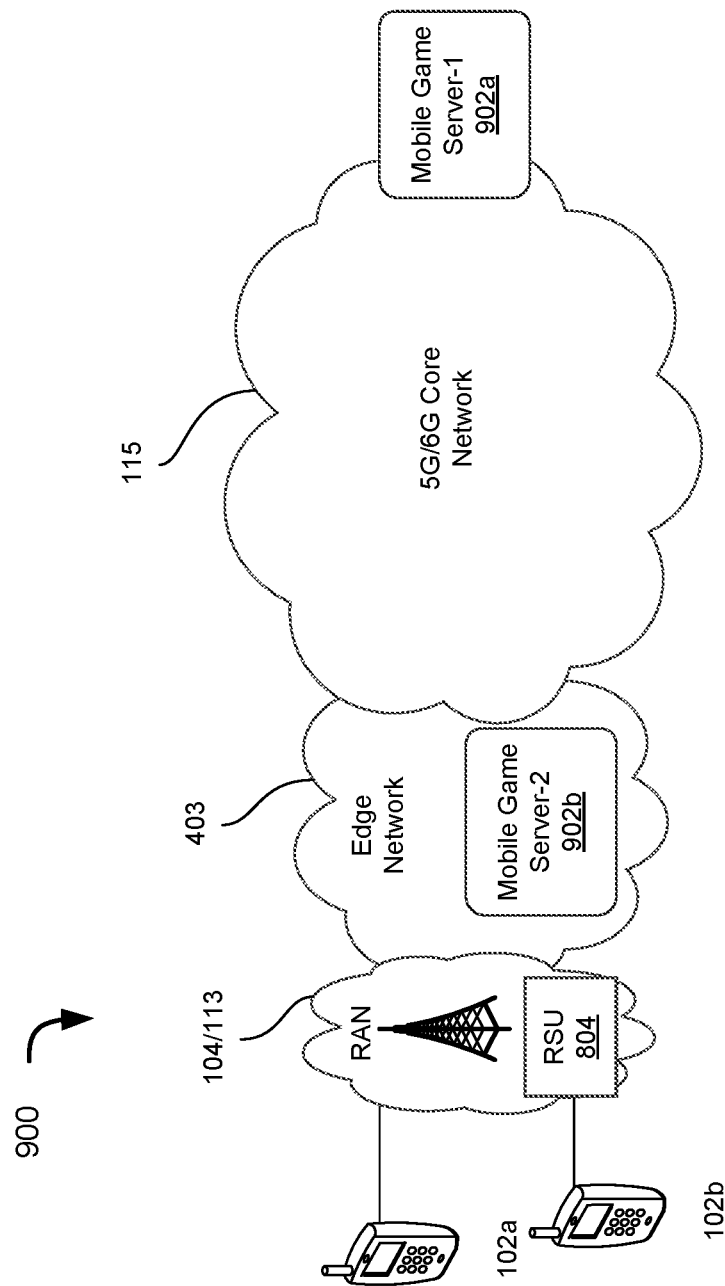
FIG. 9 is a diagram illustrating a representative mobile cloud gaming system.

FIG. 9 is a diagram illustrating a representative mobile cloud gaming system 900. In the mobile cloud gaming system of FIG. 9, a mobile game client(s) operating on smart phone(s), such as WTRUs 102a and 102b, may need to send user inputs and actions to mobile game servers 902a and/or 902b hosted in the cloud. The mobile game server 902 may connect inputs from all users involved in a mobile game instance and may generate new game statuses. The mobile game server 902 may need to send new game status updates to the mobile game clients at the WTRUs 102*a*, 102*b*. Such game status updates may need to be received by the mobile game clients in a real-time manner otherwise a game user may generate new inputs and actions, which may outdate the game status updates in transit. In other words, the game status updates as received by a mobile client at a WTRU 102 may need to have an average AoI below a threshold as an AoI requirement.

As described in the foregoing representative use cases shown in FIGS. 8 and 9, a traffic flow for real-time applications (e.g., vehicle condition updates, game status updates) in next generation networks (e.g., future internet and 5G/6G systems) may be expected to require low average AoI so that the information as received from the traffic flow maintains an adequate freshness for applications. Although there are some existing mechanisms which may impact and/or reduce AoI, there is a need to provide next generation networks such as future internet and 5G/6G systems with network service functions and protocols which can effectively guarantee AoI of traffic flows for various applications based on specific requirements (e.g., per application). For example, although 5GS can support ultra-reliable low-latency communication (e.g., URLLC), as explained previously, ultra-low latency does not necessary lead to lower AoI for a traffic flow. Namely, 5GS does not provide any mechanism for an application to indicate any AoI requirements and thus cannot guarantee AoI for traffic flow for the application. For example, 3GPP 5G messaging services (MSGin5G) are described in TR 23.700-24 which defines methods for point-to-point messaging (e.g., among WTRU 102*s*) and application-to-point messaging (e.g., between application server and WTRU 102*s*), but without any consideration on AoI of such messages. As a result, 5GS may be unable to currently support use cases where an AoI requirement may be or may become useful and/or necessary, such as IoV and mobile cloud gaming systems.

Age-of-Information Function

In certain representative embodiments, an Age-of-Information Function (AoIF) is provided in a communication system. For example, an AoIF may be configured to provide service functions and/or protocols which may guarantee AoI of a traffic flow, such as in 5G and/or 6G systems. A system provided with an AoIF may be configured to: 1) collect and/or manage (e.g., at the AoIF) AoI requirements of a traffic flow; 2) generate AoI rules based on the AoI requirements; 3) distribute and/or install AoI rules to a source node and/or on-route Service or Network Functions (SNFs) of the traffic flow; 4) generate (e.g., at a source node or proxy thereof) packets as specified by the installed AoI rules; 5) any (e.g., each) on-route SNF may process packets according to the installed AoI rules; and/or 6) any (e.g., each) on-route SNF may exchange AoI related information (e.g., residual age budget, accumulated unused age budget, etc.). To this end, AoIF provides the following new services or features.

In certain representative embodiments, the AoIF can solicit one or more AoI requirements, such as from a source node, a destination node and/or proxy nodes thereof. The AoI requirements may include a new type of traffic performance requirement about a traffic flow from a destination node (e.g., a WTRU 102) of the traffic flow. The destination node and/or a destination proxy node 1106, which may be provided to function on behalf of the destination node, may send (e.g., actively send) AoI requirements of a traffic flow to the AoIF. The AoIF may be configured to maintain correspondence (e.g., associations) between the collected or reported AoI requirements and respective traffic flows. AoI requirements may associate AoI metrics (e.g., a maximum AoI during a sliding time window) with an application type, an application information identifier, traffic path information, etc. For example, an AoIF in a 5GS, or other future systems, may advantageously provide for collection and management of any of AoI related information, AoI requirements and/or AoI rules.

In certain representative embodiments, an AoIF may generate one or more AoI rules which may be based, at least in part, on one or more AoI requirements. The generated AoI rules may be configured in a communication system as a new type of traffic flow handling rules. The AoI rules may be used by the source node and/or on-route SNFs of a traffic flow, such as for traffic flow management. One example of an AoI rule is to evenly allocate an age budget for a traffic flow to any (e.g., each) on-route SNF and/or proportionally allocate the age budget based on projected processing complexity and/or time at the SNFs (e.g., respective projected processing complexity and time at each SNF). For example, an AoIF in a 5GS, or other future systems, may advantageously translate application AoI requirements to AoI rules, which may then be leveraged in and/or across the system to adjust packet processing behaviors in any network functions of the system.

In certain representative embodiments, an AoIF can configure respective AoI rules to a source node and any (e.g., each) on-route SNFs on a traffic path and/or traffic flow. The source node and on-route SNFs may adjust how any packets on the traffic path and/or flow may be processed, routed, and/or forwarded towards a destination node based on the AoI rules (e.g., in order to meet AoI requirements for the traffic path and/or traffic flow). As an example, any remaining (e.g., residual) age budget at a respective SNF may be accumulated and leveraged by other SNFs on the path and/or flow (e.g., downstream SNFs) towards a destination node and/or proxy thereof. As another example, any (e.g., each) packet with a smaller remaining age budget (e.g., smaller than a configured and/or dynamic threshold) may be dropped at a higher probability (e.g., rate) than other packets with a larger remaining (e.g., residual) age budget (e.g., larger than a configured and/or dynamic threshold). An AoIF in a 5GS may advantageously provide for AoI rules to be installed at network functions of the 5GS.

In certain representative embodiments, AoI rules may be used by any (e.g., each) on-route SNFs and a source node to implement AoI related actions and/or processing operations on a traffic flow and/or traffic path. For example, an SNF may be configured, such as by an AoIF, to drop an incoming and/or a buffered packet upon determining that a respective processing time of the packet is estimated and/or predicted to overrun the age budget (e.g., the estimated processing time is greater than the age budget). As another example, upon determining the age budget of a packet is used up, the SNF may still forward it to a next SNF but may mark the packet (e.g., insert or toggle a one bit flag) to indicate that the packet has used up its age budget (e.g., at the SNF). Any marked packets may then be dropped at a downstream on-route SNF with a higher probability than unmarked packets (e.g., of a same or different traffic flow). As another example, any remaining (e.g., unused) age budget of a packet could be accumulated and leveraged by downstream on-route SNFs as the packet towards the destination node. It may be advantageous for the remaining and/or unused age budget to be known by (e.g., communicated to) any downstream SNFs. For example, out-of-band signaling may be used to transmit an indication of the age budget (e.g., the remaining and/or unused age budget) to any downstream SNFs, such as in a separate packet, or another transmission, which is separate from the packet carrying the corresponding information unit. As another example, an indication of the age budget (e.g., the remaining and/or unused age budget) may be encapsulated and/or embedded in the packet carrying the corresponding information unit to be sent to any downstream SNFs (e.g., in the packet header or in the packet payload). Such age budget signaling may advantageously provide 5GS, or other future systems, data and/or control planes with age-awareness enhancements. Such age budget signaling may also advantageously provide 5G messaging services, or other messaging services, with age-awareness enhancements.

In certain representative embodiments, an AoIF may be implemented to manage the respective AoIs of one or more traffic flows and may enable age-aware service function chaining. A chain of on-route SNFs connecting a source node to a destination node may manage and/or process a traffic flow and/or packets along a traffic path. Examples of SNFs include service functions as defined in I ETF Service Function Chaining and/or network functions as defined in 5GS. Any of the source node, the destination node and/or proxies thereof may also be a SNF or an application. The AoIF may be configured to collect and maintain AoI requirements of any traffic flows. The AoIF may be configured to generate AoI rules for any (e.g., each) traffic flows based at least in part on the AoI requirements. The AoIF distribute and/or install AoI rules to any of the SNFs which a respective traffic flow will pass through (e.g., on-route SNFs). For example, the on-route SNFs may forward packets belonging to the traffic flow according to the configured AoI rules for the traffic flow.

As another example, the AoIF may instruct an on-route SNF to redirect packets to the AoIF, and the AoIF may processes any redirected packets according to AoI requirements and rules of the traffic flow to which the redirected packet belongs. The AoIF may then forward processed redirected packets to another on-route SNF towards the destination node.

In certain representative embodiments, the AoIF may be configured as a logical entity. The AoIF may be disposed in a source node, in a source proxy node, in a SNF, in a destination proxy node 1106, and/or in a destination node.

Figure 10:
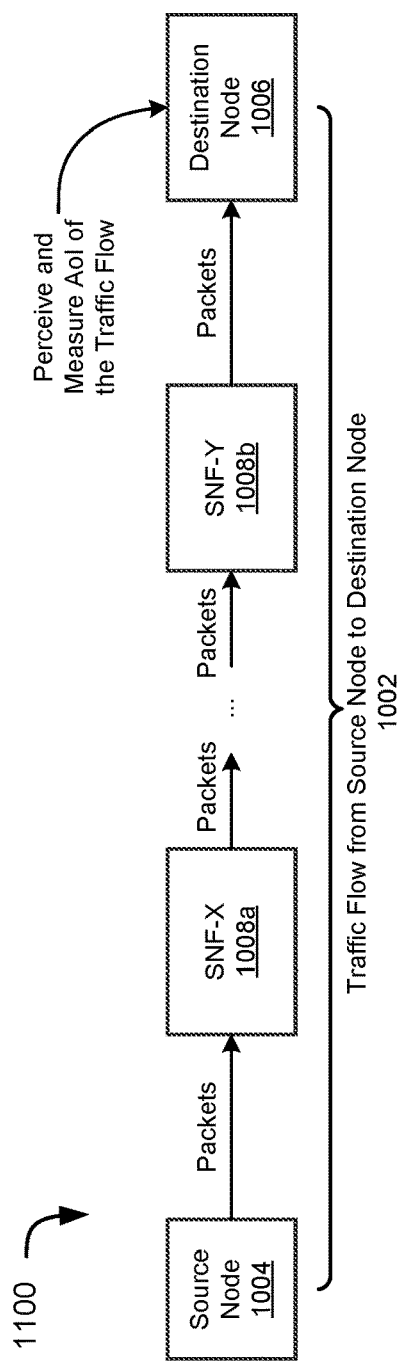
FIG. 10 is a diagram illustrating a representative traffic flow from a source node to a destination node.

FIG. 10 is a diagram illustrating a representative system 1100 having a traffic flow from a source node to a destination node. A traffic flow 1002 from a source node 1004 to a destination node 1006 travels through a traffic path that may include a plurality of On-Route Service or Network Functions (SNFs 1008) 1008 which are communicatively coupled (e.g., chained together). The SNFs 1008 may be referred to as a chain of SNFs 1008. Any number of SNFs 1008 may connect the source node and destination node. FIG. 10 includes a first on-route SNF 1008 (e.g., SNF-X 1008*a*) that the source node 1004 connects to and a last on-route SNF 1008 (e.g., SNF-Y 1008*b*) that connects to the destination node 1006, but omits any intermediate SNFs 1008 therebetween for simplicity. The source node 1004 1004 may be configured to periodically and/or aperiodically generate information (e.g., measurements) and send the information as packets to the destination node 1006 or multiple destination nodes. The packets will be received first by the SNF-X 1008*a* and may then be forwarded from one SNF 1008 to downstream to a next SNF 1008SNF 1008 along the traffic path. Eventually, SNF-Y 1008*b* may receive the packets and forward them to the destination node(s) 1006. For a respective on-route SNF 1008SNF, any neighboring SNFs 1008 closer to the destination node 1006 may referred to as downstream SNFs 1008, and any neighboring SNFs 1008 closer to the source node 1004 1004 may be referred to as upstream SNFs 1008. Generally, any (e.g., each) SNF 1008SNF 1008 on the traffic path may be configured to receive, process and then forward packets to a next (e.g., downstream) SNF 1008SNF. Packet processing may include any operations such as packet queuing, packet marking, packet dropping, packet redirecting, etc. The destination node 1006 may be configured to perceive and measure the AoI of any (e.g., each) of the packets belonging to the traffic flow 1002.

In certain representative embodiments, the SNFs 1008 may be distinguished as application-layer SNFs 1008 and packet-processing SNFs 1008. An application-layer SNF 1008 may be configured to access any of the information units of the flow as contained in a packet payload and may apply specific processing to them (e.g., transcoding). A packet processing SNF 1008 may not have access to any of the information units contained in a packet payload yet may be configured to use metadata contained in the packet header to process the packet in a way to ensure end-to-end AoI requirements. For example, an application-layer SNF 1008 may decide to apply a lower resolution algorithm (e.g., processing on sub-sampled information flow, such as images or sounds) to expedite packet processing and meet AoI requirements.

Figure 11:
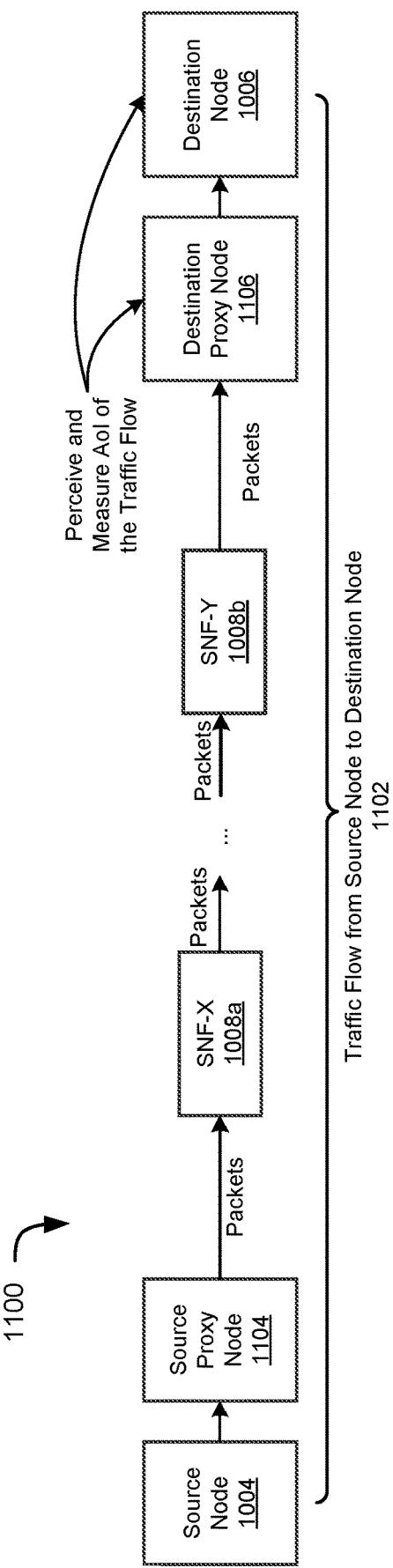
FIG. 11 is a diagram illustrating another representative traffic flow from a source node to a destination node with proxy nodes.

FIG. 11 is a diagram illustrating another representative system 1100 having a traffic flow from a source node 1004 to a destination node 1006 with proxy nodes. In certain representative embodiments, a source proxy node 1104 may be provided to represent one or multiple source nodes 1004 and may be configured to connect any traffic flows 1102 from the one or more source nodes 1004 to the first on-route SNF 1008 (e.g., SNF-X 1008*a*) as shown in FIG. 11. In certain representative embodiments, a destination proxy node 1106 may be provided to represent one or more destination nodes 1006 and may be configured to forward any traffic flows 1102 from the last on-route SNF 1008 to the destination nodes 1006. In certain representative embodiments, respective proxy nodes 1104, 1106 may be provided for both of any source nodes 1004 and any destination nodes 1006.

In FIG. 11, any respective traffic flow 1102 from any source nodes 1004 to any destination nodes 1006 may have AoI requirements. For example, each traffic flow 1102 may have specific AoI requirements. As another example, a set of traffic flows may share AoI requirements. For example, AoI requirements may be represented as one or more AoI requirement items. Each AoI requirement item may specify one or more AoI requirements for a traffic flow 1102 and may include any of the following information: (1) Destination Node Identifier (DNID) to identify and/or indicate a destination node 1006; (2) Source Node Identifier (SNID) to identify and/or indicate a source node 1004 1004; (3) Traffic Flow Identifier (TFID) to identify and/or indicate a traffic flow 1102; (4) Traffic Path Identifier (TPID) to identify and/or indicate a traffic path for a traffic flow 1102; (5) Application Category (AppCat) to identify and/or indicate a category and/or a type of an application that a traffic flow 1102 belongs to; (6) Application Information Identifier (AppinfoID) to identify and/or indicate application information (e.g., application information type) that a traffic flow 1102 belongs to; (7) Traffic Path Parameters (TPP) to provide and/or indicate detailed information about a traffic path, such as denoted by TPI; (8) Maximum AoI Threshold (MAT) to identify and/or indicate a instantaneous AoI amount; (9) Time Window for Maximum AoI (TWMA) to identify and/or indicate a time window used to calculate the maximum AoI; (10) Average AoI Threshold (AAT) to identify and/or indicate an average AoI; and (11) Time Window for Average AoI (TWAA) to identify and/or indicate a time window used to calculate the average AoI.

For example, when a destination node 1006 is an application server, a DNI of the destination node 1006 may be the address of the application server.

For example, when the source node 1004 1004 is a WTRU 102, a SNI may be a WTRU 102 identifier and/or a corresponding application identifier of an application operating on and/or by the WTRU 102.

For example, a TFID may identify a unique traffic flow. A TFID may be a combination of any of a destination node 1006 identifier, a source node 1004 identifier, a SNF 1008 identifier, a unique number and/or a random (or pseudo-random) number. A traffic flow 1002, 1102 may leverage and travel through multiple traffic paths and a TFID may be associated with multiple traffic path identifiers.

For example, a TPID may identify a unique traffic path for a traffic flow 1002, 1102, such as denoted by a TFID. A TPID may be a combination of any of a destination node 1006 identifier, a source node 1004 identifier, a SNF 1008 identifier, a unique number, a random (or pseudo-random) number, and/or a TFID. A traffic path may accommodate multiple traffic flows 1002, 1102, which belong to a same or different sets of source/destination nodes 1104/1006.

For example, "AppCat=VehicleMonitoring" may represent that a traffic flow 1002, 1102 is for monitoring the status of a vehicle (e.g., speed, direction, tire pressure, etc.).

For example, each AppinfoID can represent a different type of an application information flow (e.g., AppinfoID-1 for car speed, AppinfoID-2 for car direction, AppinfoID-3 for car tire pressure). AppinfoID may indicate one or multiple identifiers.

For example, TPP may include a number of hops along the traffic path, respective identifiers of each SNF 1008 along a traffic path, and/or any AoI-related functions of each SNF 1008 (e.g., if a SNF 1008 supports an AoI function or not).

For example, MAT may indicate the maximum instantaneous AoI, such as the AoI perceived by the destination node 1006 for the traffic path as identified by the traffic path identifier. The MAT may be indicated with respect to measurement during the lifetime of any the traffic flow, traffic path and/or for a specific time window. The MAT may be indicated as any of a threshold value and/or a range of values. In certain representative embodiments, the MAT for a traffic flow 1002, 1102 and/or traffic path may be distributed (e.g., divided) among any (e.g., all) of the on-route SNFs 1008 1008 as an age budget. The distribution of the NAT may be uniform or may be non-uniform among the on-route SNFs 1008. For example, a MAT may be set to 60 seconds and there may be six on-route SNFs 1008 in total, assuming a uniform distribution, the age budget for each on-route SNF 1008SNF 1008 is 10 seconds (e.g., divide MAT by the number of on-route SNFs 1008). In this example, a 10-second age budget means that each on-route SNF 1008SNF 1008 has 10 seconds (e.g., on average) to process and/or hold (e.g., buffer) a packet before forwarding the packet to the next SNF 1008SNF. The unused age budget may be accumulated as the packet is forwarded and leveraged by downstream on-route SNFs 1008 towards the destination node 1006. for this purpose, the unused age budget by an on-route SNF 1008SNF 1008 needs to be known by its downstream SNF 1008SNF. Downstream signaling of the unused age budget may be performed out-of-band and/or may be performed by in-band appending of the unused age budget to the packet.

For example, the TWMA may indicate a time window (e.g., interval or period) used to calculate the maximum AoI. The TWMA may be associated with a MAT.

For example, the AAT may indicate an average AoI amount, such as perceived by the destination node 1006. The MT may be indicated for a traffic path as identified by traffic path identifier. The MT may be indicated with respect to measurement during the lifetime of the traffic flow and/or for a specific time window. The MT may be indicated as any of a threshold value and/or a range of values.

For example, the Time Window for Average AoI (TWAA): The time window used to calculate the average AoI. The TWAA may be associated with an MT.

Figure 12:
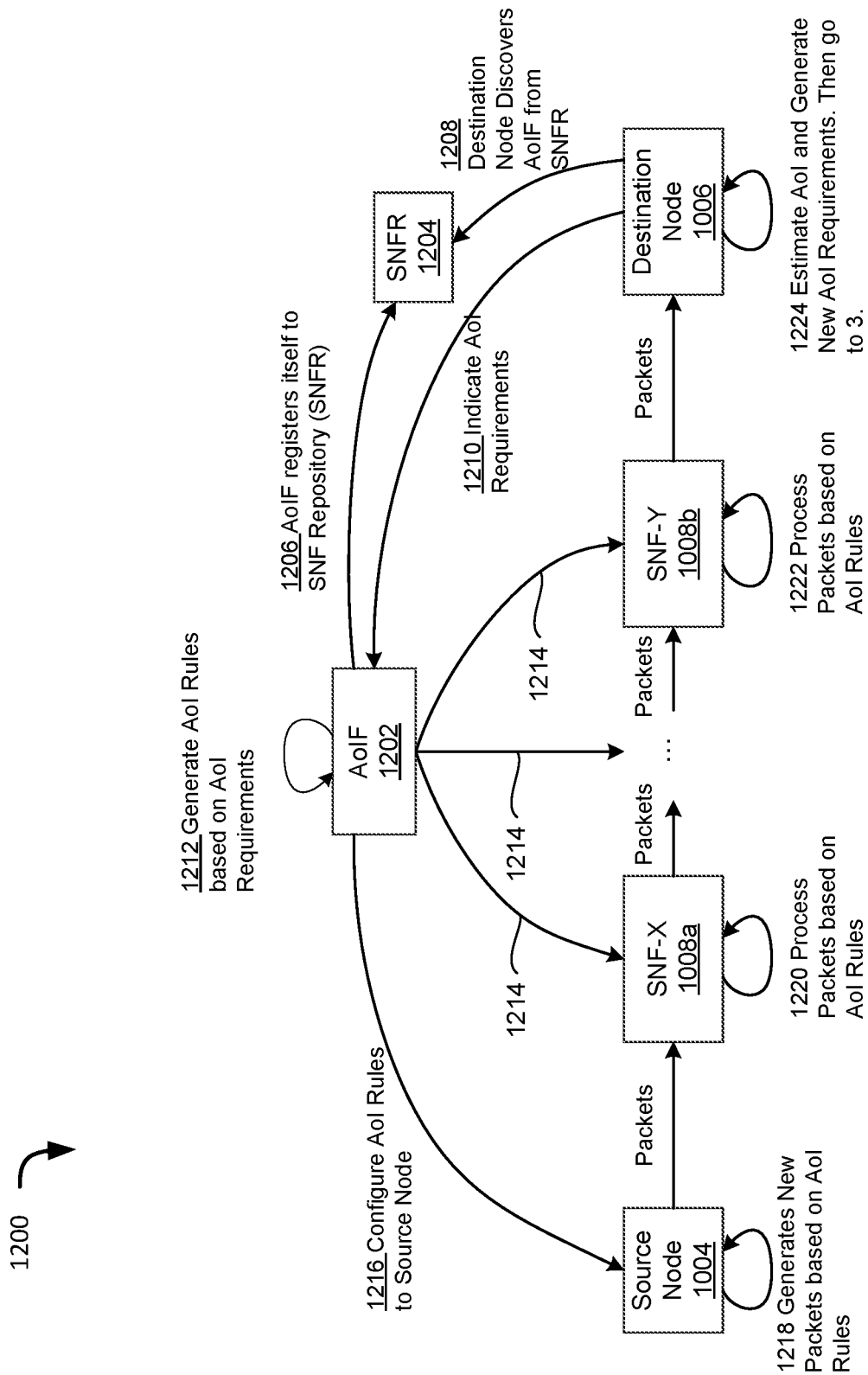
FIG. 12 is a diagram illustrating a representative configuration for age-aware service function chaining.

FIG. 12 is a diagram illustrating a representative configuration 1200 for age-aware service function chaining. In certain representative embodiments, an AoIF 1202 may be deployed to collect AoI requirements of any traffic flows (e.g., from destination nodes 1006), generate AoI rules based on the AoI requirements, and install the AoI rules at source nodes 1004 and any on-route SNFs 1008. The installed AoI rules may be used to manage AoI generation related information at source nodes 1004 and packet forwarding at on-route SNFs 1008 in order to satisfy and/or meet corresponding AoI requirements.

At 1206 in FIG. 12, an AoIF 1202 registers itself with a SNF Repository (SNFR) 1204. The SNFR 1204 may be a 3GPP Network Repository Function (NRF). The AoIF 1202 may send a registration request to the SNFR 1204 indicating a list of any (e.g., each) AoI services it supports. For each AoI service, the AoIF 1202 may indicate information on how to access it such as its API. For example, an AoI service may collect AoI requirements from a destination node 1006 and/or other nodes, referred to as an AoI requirement collection service. As another example, an AoI service may be an AoI rule query service which allows any SNF 1008 and/or other nodes to query AoI rules for a traffic flow. In a registration request, the AoIF 1202 may indicate a list of SNFs 1008 and/or nodes that may and/or may not (e.g., can and/or cannot) discover the AoIF 1202 from the SNFR 1204. In the registration request, the AoIF 1202 may indicate a list of SNFs 1008 at which the AoIF 1202 may and/or may not (e.g., can and/or cannot) install AoI rules. In the registration request, the AoIF 1202 may indicate a list of any packet operations that it may (e.g., can) influence. For example, the packet operations may include any of packet generation, packet queuing, packet marking, packet dropping, packet forwarding, etc. The SNFR 1204 may create a new AoIF 1202 record to maintain all indications from the AoIF 1202, based on which the destination node 1006 and/or other nodes can search for an appropriate AoIF 1202.

At 1208, a destination node 1006 may send an AoI discovery request to the SNFR 1204 in order to discover any available AoIF 1202. The AoI discovery request may indicate and/or include some query conditions and/or information that describes the properties of target AoIF 1202s, such as the list of packet operations that target AoIF 1202s can impact. The SNFR 1204 may authenticates and/or authorize the AoI discovery request. Upon any of reception, authentication and/or authorization, the SNFR 1204 may search its AoIF 1202 records against the query conditions and/or information of the AoI discovery request to search for any AoIF 1202s requested by the destination node. The SNFR 1204 may return a list of any discovered AoIF 1202s to the destination node 1006 in an AoI discovery response. If an AoIF 1202 has indicated in 1206 that it may not be discoverable by the destination node, the SNFR 1204 may omit the respective AoIF 1202 in the AoI discovery response. If the destination node 1006 is provisioned with an AoIF 1202, the destination node 1006 may not need to discover any additional AoIF 1202s. For example, the destination node 1006 may skip 1208 and proceed to 1210 to report AoI requirements to the AoIF 1202.

At 1210, the destination node 1006 may select an AoIF 1202 from the list received from the SNFR 1204 in 1208. For example, the destination node 1006 may send an AoI requirement indication request to the selected AoIF 1202. The AoI requirement indication request may contain one or multiple AoI requirement items. The destination node 1006 may inform the AoIF 1202 of any AoI requirements relating to one or more traffic flows. As another example, the AoIF 1202 may detect (e.g., intelligently detect) an ongoing traffic flow between a source node 1004 and a destination node 1006 with the aid of on-route SNFs 1008, and then the AoIF 1202 may send an AoI requirement solicitation request to the destination node 1006 and/or the source node. In response to the AoI requirement solicitation request, the AoIF 1202 may receive AoI requirements from the destination node 1006 and/or the source node 1004 and/or proxies thereof.

As another example, a destination node 1006 and/or proxy thereof may establish a session and/or a connection with a source node 1004 and/or proxy thereof prior to receiving packets from the source node. The destination node 1006 may encapsulate and/or embed any AoI requirements during the session and/or connection establishment phase. As a result, the source node 1004 and/or on-route SNFs 1008 may know the AoI requirements of the destination node, which can be directly reported to the AoIF 1202 or sent to the AoIF 1202 under its solicitation. After the source node 1004 and/or the source proxy node 1104 receive any AoI requirements, the source node 1004 and/or the source proxy node 1104 may generate one or more AoI rules based on the AoI requirements and send the generated AoI rules back to the destination node, such as via on-route SNFs 1008 which may advantageously allow the on-route SNFs 1008 to receive the AoI rules during the session and/or connection establishment between the source node 1004 and the destination node. This may also take place after (e.g., immediately after) a session and/or connection is established. In some circumstances where a session and/or connection is to be or is established, 1210 may be skipped. 1210 may also take place before or after the session and/or connection is established.

In certain representative embodiments, a separate SNF 1008 (e.g., a software-defined network controller) may manage traffic flows and their routing between the source node 1004 and the destination. This SNF 1008 may send AoI requirements of one or multiple traffic flows to the AoIF 1202, such as on behalf of any destination nodes and/or proxies thereof.

In certain representative embodiments, the destination node 1006 may already have traffic path information (e.g., TPID and TPP), such as when 1210 happens after session establishment, the traffic path information may be included in AoI requirement items and reported to the AoIF 1202. The AoIF 1202 may send an AoI requirement indication response to the destination node. When the destination node 1006 is an Application Function (AF), the AF may report and register its AoI requirements to the SNFR 1204. The AoIF 1202 may then query and retrieve the AoI requirements from the SNFR 1204.

In certain representative embodiments, a destination proxy node 1106 and/or the source proxy node 1104 may perform Steps 1206-1210 to indicate AoI requirements on behalf of any destination nodes and/or source nodes. For example, a destination node 1006 (e.g., a drone controlled by a controller WTRU 102 or a controller vehicle) may be behind a gateway (e.g., a controller WTRU 102, a controller vehicle), and the gateway, acting as proxy, may send the destination node's AoI requirements to AoIF 1202 using steps 1206-1210.

At 1212, the AoIF 1202 may maintain the AoIF 1202 requirements as received from 1210. The AoIF 1202 may generate AoI rules for any (e.g., each) of the source node 1004 and each on-route SNF 1008 of a traffic flow, such as based on the corresponding AoI requirements. For example, the AoI requirements may not contain any of a TFID, TPID and/or TPP, and the AoIF 1202 1202 may search and retrieve them from other SNFs 1008 (e.g., an SMF in 5GC), such as by providing any of respective addresses of any of the destination nodes 1006 and/or the source nodes 1004. The generated AoI rules may be available to be queried and retrieved by the destination node 1006, the source node 1004 1004, the proxies 1106, 1104 thereof and/or the on-route SNFs 1008. The AoIF 1202 may install (e.g., actively install) the generated AoI rules to the source node 1004 and on-route SNFs 1008. The AoIF 1202 may send AoI rules to the destination node 1006 and/or the source node, such as when AoI requirements do not contain on-route SNF 1008 information. The destination node 1006 may then distribute AoI rules to the source node 1004 (or vice versa) and each on-route SNFs 1008.

Any (e.g., each) of the on-route SNFs 1008 may provide and/or enforce different packet operations which may lead to different processing times. The on-route SNFs 1008 may need different age budgets to account for the different packet operations at different SNFs 1008. For example, the AoIF 1202 may allocate a different age budget to each respective on-route SNF 1008SNF 1008 based on any of functionality, estimated packet processing time, congestion and/or traffic load situation (e.g., at the respective on-route SNF).

Any (e.g., each) of the on-route SNF 1008 may have certain freedom in selecting different packet operations to perform. For example, a SNF 1008 may be configured to transcode images and/or video frames contained in received packets, and may determine to use a fast transcoding scheme in order to meet an AoI requirement although the fast transcoding scheme may reduce the image and/or video quality (e.g., at the destination). The SNF 1008 may be configured to choose an advanced transcoding scheme to meet both image and/or video quality and any AoI requirement, upon condition that the allocated age budget and/or the accumulated used age budget is adequate.

As an example, an AoI rule for a source node 1004 may be as simple as a packet generation rate, which specifies the frequency for generating new packets. As another example, an AoI rule may indicate to the source node 1004 when (e.g., under which conditions) and/or how a packet generate rate should be increased and/or decreased.

As an example, when calculating respective age budgets for each of the on-route SNFs 1008, the AoIF 1202 may skip any SNFs 1008, such as those performing packet operations which are optional, in order to allocate more age budget to other SNFs 1008, such as those SNFs 1008 which perform mandatory packet operations. Any optional and/or skipped SNF 1008SNF 1008 may be bypassed or removed from the respective traffic path from the source node 1004 1004 to the destination node 1006, such as in order to meet an AoI requirement.

The AoIF 1202 may prioritize different traffic flows based on their respective AoI requirements (e.g., MAT and AAT) and may assign an AoI priority level for each respective traffic flow. The priority level can be indicated and/or included as a part of the AoI rules. Any on-route SNF 1008SNF, after receiving any AoI rules, may perform differentiated packet handling (e.g., queuing, forwarding, dropping, marking, etc.) for different traffic flows based on the respective AoI priority levels of the different traffic flows.

Parameters of AoI Rules

In certain representative embodiments, the AoI rules may include, but are not limited to, any combination of the following parameters as shown below in Table 1.

TABLE 1

| Parameters of an AoI Rule | Description |
|---|---|
| Rule Identifier (RID) | Identifier of an AoI rule. |
| Rule Lifetime (RL) | Lifetime of an AoI rule. For example, RL = "120 Seconds". |
| Rule Waiting Time (RWT) | Waiting time of an AoI rule before a recipient can activate the AoI rule. For example, RWT = "0 seconds" means that the recipient should activate the AoI rule immediately, or as soon as possible, after it receives the AoI rule. In another example, if RWT = "60 seconds" indicates that the recipient should not activate the AoI rule until after 60 seconds have passed since the AoI rule was received/transmitted. |
| Flow Identifier (FID) | Identifier of a traffic flow that an AoI rule is to be applied to or associated with. |
| Source Node Address (SNA) | Address of a source node of a traffic flow as denoted by FID. |
| Destination Node Address (DNA) | Address of a destination node of a traffic flow as denoted by FID. |
| Recipient Address (RA) | Address of a recipient that should receive an AoI rule. For example, RA may be an IP address and/or a URI. |
| Recipient Type (RT) | Type of a recipient. A recipient could be any of a source node, a source proxy node, a SNF, a destination proxy node, or a destination node. For example, RT = "Source Node", RT = "Source Proxy Node", RT = "SNF", RT = "Destination Proxy Node", or RT = "Destination Node" |
| Total Age Budget (TAB) | Total end-to-end age budget allocated to a traffic flow as denoted by FID. |
| Rule Category (RCat) | Category of an AoI rule. The following rule categories may be supported: RCat = "PacketGeneration" indicates that the AoI rule specifies policies for packet generation, such as for a source node. RCat = "FlowPriority" indicates that the AoI rule specifies flow priorities. RCat = "AgeBudgetAllocation" indicates that the AoI rule specifies the age budget allocated for the recipient. RCat = "AgeBudgetControl" indicates that the AoI rule specifies a policy for controlling age among SNFs (e.g., to accumulate unused age budget). RCat = "PacketEnque" indicates that the AoI rule specifies a policy for enqueuing packets from the traffic flow, such as denoted by FID. RCat = "PacketDrop" indicates that the AoI rule specifies a policy for dropping packets from the traffic flow, such as denoted by FID. RCat = "PacketDeque" indicates that the AoI rule specifies a policy for forwarding packets from the traffic flow, such as denoted by FID to a next node (e.g., a source proxy node, a SNF, a destination proxy node, or a destination node). |
| Rule Content (RC) | Content of the AoI rule. May depend on and/or vary according to a category of the AoI rule. For example, if RCat = "PacketGeneration", RC may contain any one or any combination of the following parameters: Absolute Packet Generation Rate (APGR): indicates a rate or frequency of generating a new packet at the source node. For example, APGR = "1 Packet/Second". Packet Generation Rate Increase Amount (PGRIA): indicates an amount with that the packet generation rate may or shall be increased at the source rate. Packet Generation Rate Decrease Amount (PGRDA): indicates an amount with that the packet generation rate may or shall be decreased at the source rate. Packet Generation Rate Increase Condition (PGRIC): indicates a condition for which packet generation rate at the source node may or will be increased by PGRIA. For example, PGRIC = "Increase PGR by PGRIA Every 120 Seconds". Packet Generation Rate Decrease Condition (PGRDC): indicates a condition for which packet generation rate at the source node may or will be decreased by PGRIA. For example, PGRDC = "Decrease PGR by PGRDA Every 120 Seconds". If RCat = "FlowPriority", RC may contain one or any combination of the following parameters: Age Priority Level (APL): indicates a priority level in terms of AoI. The values of APL may be "HIGH", "MEDIUM", or "LOW". The value of APL may be integers, such as from 1 (lowest priority) to 10 (highest priority). Age Priority Control Base (APCB): indicates a list of parameters based on any of which the recipient may prioritize different traffic flows. For example, APCB may contain one or more of these parameters: APL, AAB, TAB. If RCat = "AgeBudgetAllocation", RC may contain the following parameter: |

TABLE 1-continued

| Parameters of an AoI Rule | Description |
|---|---|
| | Allocated Age Budget (AAB): indicates an allocated age budget for the recipient. For example, AAB = "60 Seconds" may mean that the recipient has 60 seconds, at maximum, to process a (e.g., one) packet from the traffic flow as denoted by FID. If the processing time exceeds AAB, the recipient may or shall drop the packet with a probability. The probability could be configured, such as a value of 1 (e.g., 100%) or as ActualProcessingTime/(Num*AAB), where Num may be a number equal to or smaller than a total number of hops from the source node to the destination node.<br>If RCat = "AgeBudgetControl", RC may contain the following parameter:<br>Unused Age Accumulation Indicator (UAAI): UAAI = "true" indicates that a recipient may or will calculate the used age budget and accumulate it with the unused age budget to generate a total unused age budget. The recipient may inform the total unused age budget to a next entity, which could be any of a SNF, a source proxy node, or a destination proxy node. UAAI = "false" indicates that the recipient may not forward any used age budget.<br>If RCat = "PacketDrop", RC may contain the following parameter:<br>Packet Drop Policy (PDP): indicates a packet drop policy. For example, PDP = "Absolute" indicates any packet may be dropped if its total processing time exceeds AAB. For example, PDP = "Probability" indicates to drop a packet with a probability. The probability may be calculated in various ways (e.g., the drop probability can be set to a ratio of "total process time"/AAB. For example, PDP = "DropIfOverflow" indicates that the recipient may start to drop any packets with relatively lower age budget and/or relatively lower priority, such as when a buffer at the recipient is above a threshold, is full and/or is overflowed.<br>If RCat = "PacketEnque", RC may contain one or more of the following parameters:<br>Packet Enque Policy (PEP): indicates a packet enque policy to be applied to any incoming new packet of the traffic flow as denoted by FID. For example, PEP = "ReplaceOldPacket" indicates the recipient may replace any old packet in a queue with the incoming new packet of the same traffic flow as denoted by FID. PEP = "ReplaceAge" indicates the recipient may replace the age of an old packet in a queue with the age of an incoming new packet of the same traffic flow as denoted by FID. PEP = "Preempt" indicates that the recipient may take the incoming new packet to preempt other packets of other traffic flows in the queue, such as when there is a forthcoming congestion at the recipient.<br>If RCat = "PacketDeque", RC may contain the following parameter:<br>Packet Deque Policy (PDeP): indicates a packet deque policy to be applied to any packets in a buffer. For example, PDeP = "WaitForFresh" indicates that the recipient may delay to forward a packet to a next entity (e.g., a SNF or a source/destination proxy node) upon condition that a new packet of the same flow with less age (e.g., younger) is expected to arrive at the recipient, such as within a configured time interval. |

The AoIF 1202 may store generated AoI rules to a separate AoI rule repository. Then, for example, any (e.g., all) other entities such as source nodes, source proxy nodes, SNFs 1008, destination proxy node 1106s, and/or destination nodes may retrieve AoI rules from the AoI rule repository. 3GPP network functions, such as a policy control function (PCF) and/or an unstructured data storage function (UDSF), may be implemented as AoI rule repositories.

Figure 13:
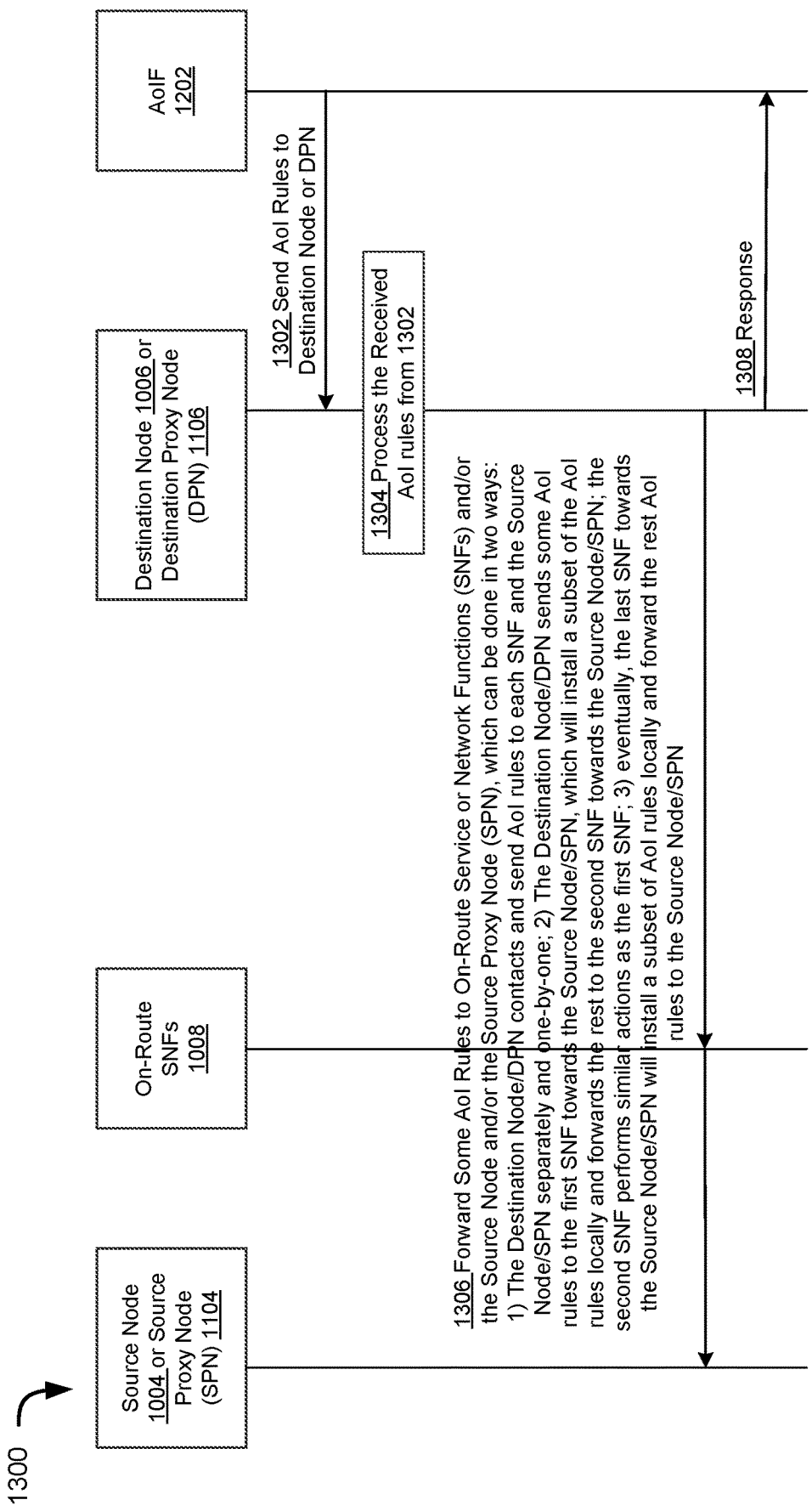
FIG. 13 is a diagram illustrating a representative procedure for configuring AoI rules via a destination node or a destination proxy node.

FIG. 13 is a diagram illustrating a representative procedure 1300 for configuring AoI rules via a destination node 1006 or a destination proxy node 1106. After generating AoI rules, the AoIF 1202 may configure (e.g., send) the AoI rules to any of the destination node 1006 and/or the destination proxy node 1106 at 1302 in FIG. 13 (e.g., as a response to 1210 in FIG. 12). For example, the destination node 1006 and/or the destination proxy node 1106 may process the received AoI rules at 1304 in FIG. 13. Thereafter, the destination node 1006 and/or the destination proxy node 1106 may proceed to contact any (e.g., each) SNF, the source node 1004 and/or the source proxy node 1104 and configure them with any (e.g., some or all) AoI rules at 1306 in FIG. 13. In some configurations, the AoIF 1202 may not need to contact the source node, any source proxy node 1104 and/or the on-route SNFs 1008. If the destination node 1006 receives AoI rules, it may forward some rules to the destination proxy node 1106. If the destination proxy node 1106 receives AoI rules from the AoIF 1202 or from the destination node, it may install some of the received AoI rules locally and forward the remaining AoI rules to any of the on-route SNFs 1008, the source node, and/or the source proxy node 1104 at 1306 in FIG. 13. At 1302 in FIG. 13 the AoIF 1202 may send any combination of: 1) an address of any destination proxy node 1106; 2) an address of any source proxy node; 3) a set of AoI rules; 4) a set (e.g., each) of the on-route SNFs 1008 from the destination node 1006 to the source node 1004 (or the source proxy node); 5) any indications about which AoI rules should be applied to the destination proxy node 1106, the source node, the source proxy node, and/or SNFs 1008; 6) any indication that the destination node 1006 or the destination proxy node 1106 may forward some AoI rules to the source node 1004 and/or the source proxy node 1104 (e.g., address indicators); and/or 7) any indication that the destination node 1006 and/or the destination proxy node 1106 may forward some or all of the AoI rules to the set of SNFs 1008 (e.g., address indicators).

After receiving AoI rules (e.g., in a message), the destination node 1006 and/or destination proxy node 1106 may decide to process the received AoI rules and perform any of the following actions based on the information contained in the request and/or its local decision: 1) forward some or all of the AoI rules to any (e.g., each) of the on-route SNFs 1008 towards the source node 1004 and/or the source proxy node, such as those that may have been indicated by the AoIF 1202 or determined by the destination node 1006 or the destination proxy node 1106; and/or 2) forward some or all of the AoI rules to the source node 1004 and/or the source proxy node, such as those that may have been indicated by the AoIF 1202 or determined by the destination node 1006 or destination proxy node 1106. Further, a destination proxy node 1106 may, such as when the destination proxy node 1106 receives any packets from a SNF, process packets and forward them to the destination node 1006 according to corresponding AoI rules as configured by the AoIF 1202 (e.g., similar to 1220 of FIG. 12).

At 1214 of FIG. 12, the AoIF 1202 may install any of the AoI rules to any (e.g., each) of the on-route SNFs 1008. For example, the AoIF 1202 may inform each on-route SNF 1008 of an age budget and specify that the total time the respective SNF 1008 will use to process a packet from the source node 1004 to the destination node 1006 shall not exceed the age budget. Upon condition that the age budget is exceeded, the packet may be dropped. 1214 may be repeated anytime later, such as when new AoI rules for the on-route SNFs 1008 are produced by the AoIF 1202 (e.g., when the AoIF 1202 receives new AoI requirements from the destination node 1006 after 1224 in FIG. 12). The AoIF 1202 may find any addresses of the on-route SNFs 1008 from the AoI requirements, an SNFR 1204, and/or other SNFs 1008. Upon condition that the AoIF 1202 cannot find the address of on-route SNFs 1008, it may send generated AoI rules to the destination node 1006 which may then distribute the AoI rules to any (e.g., each) on-route SNF 1008 individually. Each on-route SNF, upon receiving any AoI rules (e.g., from the AoIF 1202) may maintain locally (e.g., at the SNF). The AoIF 1202 may send age budgets of all on-route SNFs 1008 to one SNF, which may then distribute the respective age budgets to the on-route SNFs 1008 separately. In configurations where any optional SNF 1008 is selected and skipped by the AoIF 1202 in Step 4, the AoIF 1202 may inform each on-route SNF 1008 of a next (e.g., immediate) downstream SNF 1008 towards the destination node. An on-route SNF 1008 may reject an AoI rule, such as in configurations where the SNF 1008 does not have enough resources to enforce the AoI rule and/or where the AoI rule conflicts with any previously installed and/or active AoI rules. For example, the on-route SNF 1008 (e.g., SNF-X 1008A) may reject any AoI rule and may send a rejection notification to the AoIF 1202 and the AoIF 1202 may choose another SNF 1008 to replace this SNF, adjust the AoI rule and re-install to this SNF, and/or send a rejection notification to the destination node 1006 to inform the destination node 1006 that its AoI requirements may not be guaranteed. The AoIF 1202 may also use 1214 to: 1) delete one or multiple existing AoI rules at a SNF; 2) deactivate one or multiple existing AoI rules at a SNF; and/or 3) update one or multiple existing AoI rules at a SNF. At 1308 in FIG. 13, the destination node 1006 and/or destination proxy node 1106 may send a response (e.g., to 1306) to the AoIF 1202.

At 1216 in FIG. 12, the AoIF 1202 send some or all of the AoI rules to the source node. 1216 may be repeated anytime later, such as when new AoI rules for the source node 1004 are produced by the AoIF 1202 (e.g., when the AoIF 1202 receives new AoI requirements from the destination node 1006 after 1224). In certain representative embodiments, the source node 1004 may send a response to the AoIF 1202 to indicate whether the received AoI rules are accepted or rejected. For example, the source node 1004 may reject some AoI rules and propose new ones, which may be sent with and/or included in the response message. The source node 1004 may reject an AoI rule, such as where it does not have enough resources to enforce the AoI rule and/or if the AoI rule conflicts with any previously installed and/or active AoI rules. As another example, the source node 1004 may reject any AoI rule and may send a rejection notification to the AoIF 1202. After, the AoIF 1202 may be configured to choose a new source node 1004 for the destination node, adjust any AoI rules and re-install the adjusted AoI rules to the new source node, and/or send a rejection notification to the destination node 1006 to inform the AoI requirements cannot be guaranteed (e.g., by the source node).

Figure 14:
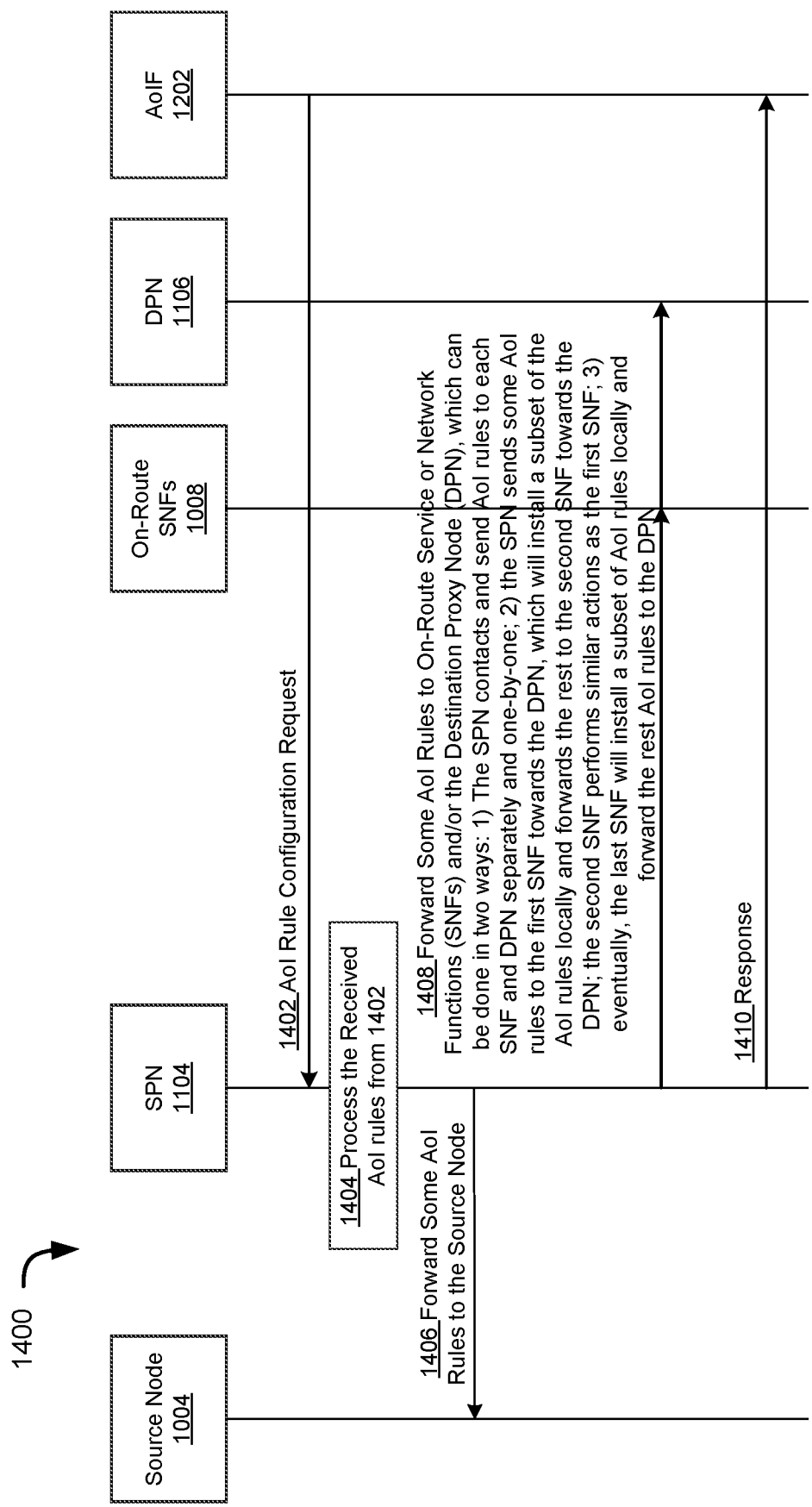
FIG. 14 is a diagram illustrating a representative procedure for configuring AoI rules via a source proxy node.

FIG. 14 is a diagram illustrating a representative procedure 1400 for configuring AoI rules via a source proxy node. In certain representative embodiments, the AoIF 1202 may install AoI rules to a source proxy node, which may be configured to act on behalf of one or multiple source node 1004 as in FIG. 14, for example. The source proxy node 1104 may register or be registered with the AoIF 1202 and may inform the AoIF 1202 of a list of source nodes, which the source proxy node 1104 represents. The destination node 1006 and/or the destination proxy node 1106 may know (e.g., have the address of) the source proxy node. The destination node 1006 and/or the destination proxy node 1106 may inform the AoIF 1202 by containing the address of the source proxy node 1104 in 1306 of FIG. 13. The source node 1004 may send the address of its source proxy node 1104 to the AoIF 1202.

As another example, the AoIF 1202 may configure any selected AoIF 1202 rules to the source proxy node, such as by sending an AoI rule configuration request to the source proxy node 1104 as in 1402 of FIG. 14. The AoI rule configuration request may include any of: 1) an address of the source proxy node; 2) any addresses of any of the corresponding source nodes; 3) a set of any AoI rules; 4) a set of any (e.g., each) on-route SNFs 1008 from the source proxy node 1104 to the destination node 1006 and/or the destination proxy node 1106; 5) any indications about which AoI rules may be applied to the source proxy node, the source nodes, and/or the SNFs 1008; 6) any indications that the source proxy node 1104 may forward some or all of the AoI rules to the source node 1004 and/or any addresses needed to do so; 7) any indications that the source proxy node 1104 may forward some or all of the AoI rules to the set of SNFs 1008 and/or any addresses needed to do so; 8) any indications that the source proxy node 1104 may forward some or all of the AoI rules to the destination proxy node 1106 and any addresses needed to do so. After receiving the AoI rule configuration request containing any AoI rules, the source proxy node 1104 may process the received request at 1404 in FIG. 14 and may determine to perform any of the following actions, such as based on the information contained in the request and/or a local decision: 1) forward some or all of the AoI rules to the source node 1004 as in 1406 of FIG. 14, which may have been indicated by the AoIF 1202 and/or determined by the source proxy node; 2) forward some or all of the AoI rules to one or more of the on-route SNFs 1008 towards the destination node 1006 and/or the destination proxy node 1106 as in 1408 of FIG. 14, which may have been indicated by the AoIF 1202 and/or determined by the source proxy node; 3) forward some or all of the AoI rules to the destination proxy node 1106, which may have been indicated by the AoIF 1202 and/or determined by the source proxy node; 4) for any packets sent for the source node 1004 to the source proxy node, the source proxy node 1104 may perform processing on these packets and forward them to the next on-route SNF 1008 according to corresponding AoI rules as configured by the AoIF 1202, which may be similar to 1220 in FIG. 12. Thereafter, the source proxy node 1104 may send a response to the AoIF 1202 as in FIG. 14, which may acknowledge the AoI rule configuration request. At 1410, the source proxy node 1104 may send a response to the AoIF 1202.

At 1216 of FIG. 12, the AoIF 1202 may also be configured to: 1) delete one or multiple existing AoI rules at any source node 1004 and/or any source proxy node; 2) deactivate one or multiple existing AoI rules at any source node 1004 and/or any source proxy node; and/or 3) update one or multiple existing AoI rules at any source node 1004 and/or any source proxy node.

At 1218 of FIG. 12, the source node 1004 may proceed to generate packets (e.g., new packets) for a traffic flow according to the configured AoI rules for the traffic flow as were received from the AoIF 1202. In some representative embodiments, the AoI rules may be configured to the source node 1004 by a corresponding source proxy node. If the source node 1004 has not been configured with any AoI rules, such as when the source node 1004 is connected to a source proxy node, the source node 1004 may generate packets according to a local process and send the packets to the source proxy node 1104 (e.g., without referring to the configured AoI rules). The source proxy node 1104 may be configured to forward the packets to the next on-route SNF. The source proxy node 1104 may also be configured to perform processing operations on the packets (e.g., similar to 1220) and forward the processed packets to the next on-route SNF.

At 1220 of FIG. 12, an SNF 1008(e.g., SNF-X 1008A) receives any incoming packets from the source node. The SNF 1008 may then process the received packets according to the AoI rules (e.g., age budget) as configured by the AoIF 1202. The SNF 1008 may enforce any one or more of the following actions according to configured AoI rules for the traffic flow that the incoming packets belong to. For example, the SNF 1008(e.g., SNF-X 1008A) may be configured to prioritize packets from different traffic flows according to their respective age budgets. Any packets from a traffic flow with a smaller age budget (e.g., below a threshold or lower than other traffic flows) may be given a higher queuing priority such that they may be forwarded to a next SNF 1008 sooner. Any packets with a smaller age budget may preempt other buffered packets with a higher age budget.

As another example, the SNF 1008 (e.g., SNF-X 1008A) may be configured to drop any incoming packets or any buffered packets upon condition that a determined (e.g., predicted) processing time expects to overrun the age budget (e.g., the age budget is used up by the processing on the packet).

As still another example, upon condition the age budget of a packet is used up, the SNF 1008(e.g., SNF-X 1008A) may forward the packet to a next SNF. Before forwarding, the SNF 1008 may mark the packet (e.g., add or toggle a one bit field) to indicate that the packet has used up its age budget at the SNF. Any packets marked in this manner may be dropped at a downstream on-route SNF, such as with a higher probability than other unmarked packets.

As yet another example, the unused age budget at the SNF 1008 (e.g., SNF-X 1008A) may be accumulated and indicated to a next downstream on-route SNFs 1008 and on towards the destination node. Any unused age budget may be made known (e.g., transmitted) to a downstream SNF 1008 by out-of-band signaling of the unused age budget and/or in-band encapsulating and/or embedding of the unused age budget in the packet (e.g., in the header and/or body of the packet). For instance, when the SNF 1008 forwards a packet to a next downstream SNF, a header of the packet may be extended to include a combination of parameters such as "accumulated age budget unused by or remaining from SNF-X 1008A and its upstream SNFs 1008 towards the source node", "total residual age budget of this packet towards the destination node", etc. After receiving a packet, the downstream SNF 1008 may inspect the packet header to determine how much unused age budget for the packet is available. A Network Service Header (NSH) as defined in IETF RFC 8300 may be extended to support the exchange of AoI-related parameters (e.g., accumulated unused age budget) between on-route SNFs 1008. Further, a GPRS Tunneling Protocol (GTP) header may be extended to include new fields for AoI-related information (e.g., accumulated unused age budget) between on-route SNFs 1008.

As another example, any SNF 1008 may receive a packet with an extended packet header (e.g., containing accumulated unused age budget). The SNF 1008 may adds its own initial age budget as configured by the AoIF 1202 to the accumulated unused age budget as indicated in the packet header together as a total age budget. The SNF 1008 may then proceed to process the received packet using the sum of the initial age budget and the accumulated unused age budget. After completing processing for the packet, any remaining age budget may be inserted back to the packet header as an updated accumulated unused age budget and the packet with this updated header may be forwarded to a next SNF 1008 and/or destination node 1006 and/or destination proxy node 1106.

As still another example, upon receiving a new packet (or a predetermined number of packets of a same traffic flow) from the source node, the SNF 1008 (e.g., SNF-X 1008A) may send a request to the AoIF 1202 to check whether any new AoI rules for the new packet have been generated. After receiving the request from SNF-X 1008A, the AoIF 1202 may contact the destination node 1006 and/or other SNFs 1008 (e.g., the SNFR 1204) to get the latest AoI requirements and may then generate new AoI rules using the latest AoI requirements. The AoIF 1202 may then send the latest generated AoI rules to any of the SNFs 1008 (e.g., the requesting SNF).

At 1220, the SNF 1008 may prioritize a traffic flow over another traffic flow based on any of the AoI rules for the traffic flows, AoI priority levels of the traffic flows, requirements or constraints for the traffic flows, etc.

At 1222 in FIG. 12, each on-route SNF 1008 may be configured to repeats which may be the same as or similar to those described in 1220. For example, the SNF-Y 1008B, as the last on-route SNF, may receive packets from its upstream SNF, process them according to the configured AoI rules, and/or forward the packets to the destination node 1006 or a destination proxy node 1106.

At 1224 in FIG. 12, the destination node 1006 may receive packets from the SNF-Y 1008B. Upon reception, the destination node 1006 may observe and/or measure the actual AoI of the packet. Based on the observed/measured AoI and/or other information (e.g., any new application requirements and/or intention on AoI, a new and/or modified subscription contract with the network operator, etc.), the destination node 1006 may generate new AoI requirements. After, the destination node 1006 may repeat step 3 to report any new AoI requirements to the AoIF 1202. As another example, using previously configured AoI rules, the destination node 1006 may trigger (e.g., automatically trigger)

other actions, such as to send a signal and/or indication to any of the source node, source proxy node 1104 and/or any on-route SNFs 1008 to speed up or slow down packet generation or processing based on the latest AoI measurement.

Figure 15:
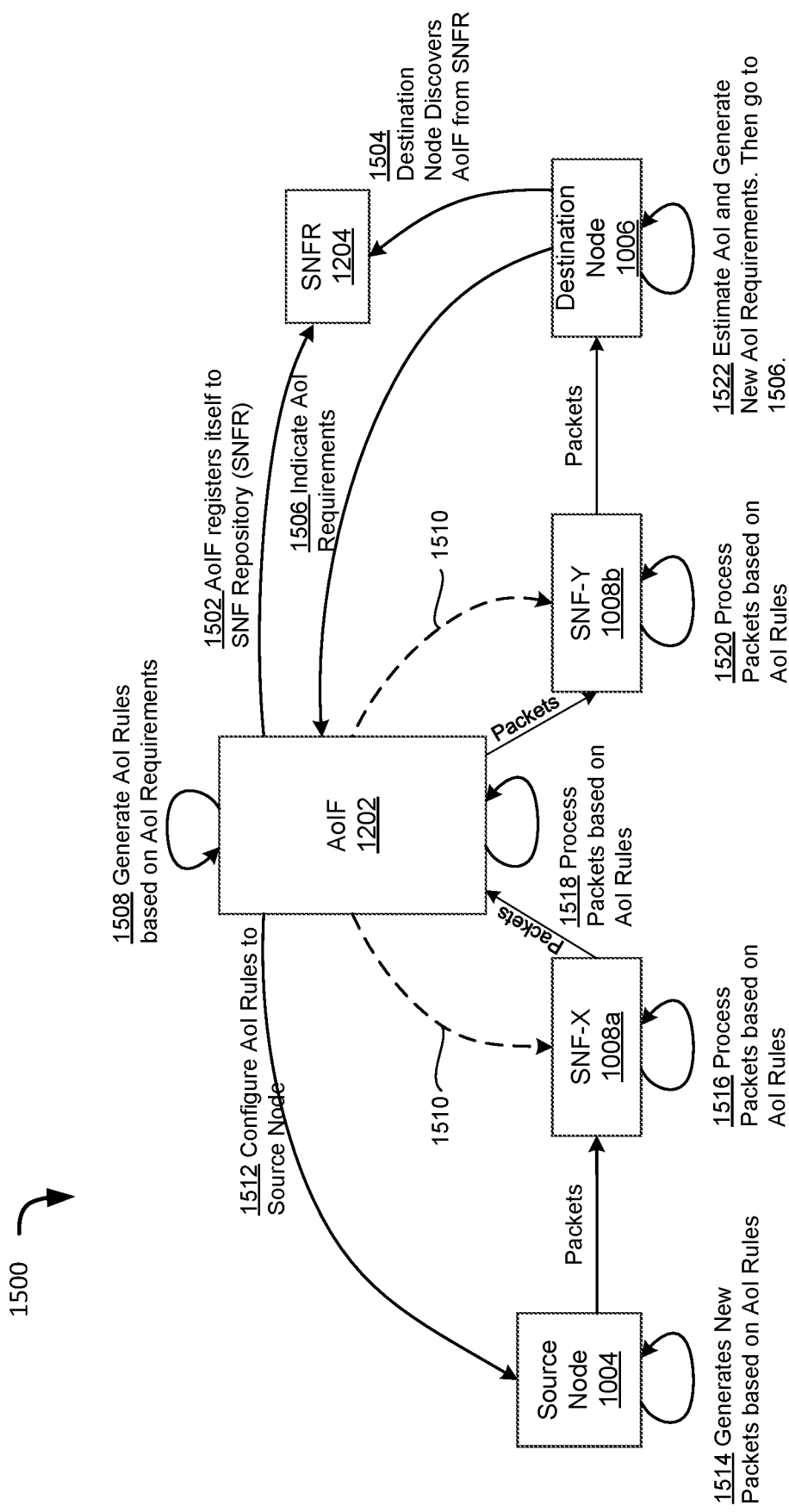
FIG. 15 is a diagram illustrating another representative configuration for age-aware service function chaining.

FIG. 15 is a diagram illustrating another representative configuration 1500 for age-aware service function chaining. In the configuration shown in FIG. 15, the AoIF 1202 not only maintains AoI requirements and generate AoI rules, but may also be configured to participate in packet processing (e.g., forwarding of a traffic flow) as needed.

For brevity, steps 1502, 1504 and 1506 of FIG. 15 may be performed similarly to, or the same as, steps 1206, 1208, and 1210 of FIG. 12. It should be noted that a destination proxy node 1106 and/or the source node 1004 may perform steps 1206-1210 to indicate AoI requirements on behalf of the destination node. For example, a destination node, such as a drone controlled by a controller WTRU 102 or a controller vehicle, may be behind a gateway, such as the controller WTRU 102 and/or the controller vehicle, the gateway may send the AoI requirements of the destination node 1006 to AoIF 1202 using steps 1206-1210.

At 1508 of FIG. 15, the AoIF 1202 may generate one or multiple AoI rules based on the AoI requirements. At 1510, the AoIF 1202 may install and/or configure the AoI rules to any one or more (e.g., each) of the SNFs 1008 which are on the way (e.g., on-route) from the source node 1004 to the destination node 1006 (e.g., for the traffic flow). 1508 of FIG. 15 may be performed similarly to, or the same as, step 1212 of FIG. 12. As shown in FIG. 15, the configured AoI rules for any of the SNFs 1008 may instruct that packets (e.g., selected packets) of a traffic flow be forwarded (e.g., redirected) to the AoIF 1202. The configured AoI rules may specify conditions under which an SNF 1008 (e.g., SNF-X 1008A) may forward packets (e.g., of a particular traffic flow) to the AoIF 1202.

1512 and 1514 of FIG. 15 may be performed similarly to, or the same as, steps 1216 and 1218 of FIG. 12.

1516 of FIG. 15 may be performed similarly to, or the same as, 1220 of FIG. 12. Any SNF 1008 (e.g., SNF-X 1008A) may forward some or all packets to the AoIF 1202, such as when specified conditions of the packets or traffic flow are met. The SNF 1008 may forward packets to the AoIF 1202 instead of forwarding to the next downstream SNF. Any SNF 1008 may determine to perform packet redirection to the AoIF 1202 according to AoI rules as configured by the AoIF 1202 at Step 5. For example, the AoIF 1202 may indicate that any packets with an age budget less than a threshold may be forwarded (e.g., redirected) to the AoIF 1202. In another example, any packets with an overused age budget which belong to a high-priority traffic flow may be redirected to the AoIF 1202 (e.g., instead of being discarded).

At 1518 of FIG. 15, the AoIF 1202 may receive any redirected packets from any of the SNFs 1008. For example, the AoIF 1202 may process a received packet according to the generated AoI rules which may be similar to, or the same as, 1220 of FIG. 12. Upon receiving any packets, the AoIF 1202 may forward the packets directly to any downstream SNF 1008 (e.g., SNF-Y 1008B). Performing such redirection may advantageously reduce a total processing time of a respective packets and/or meet the AoI requirements of the traffic flow.

1520 and 1522 of FIG. 15 may be performed similarly to, or the same as, steps 1222 and 1224 of FIG. 12.

Figure 16:
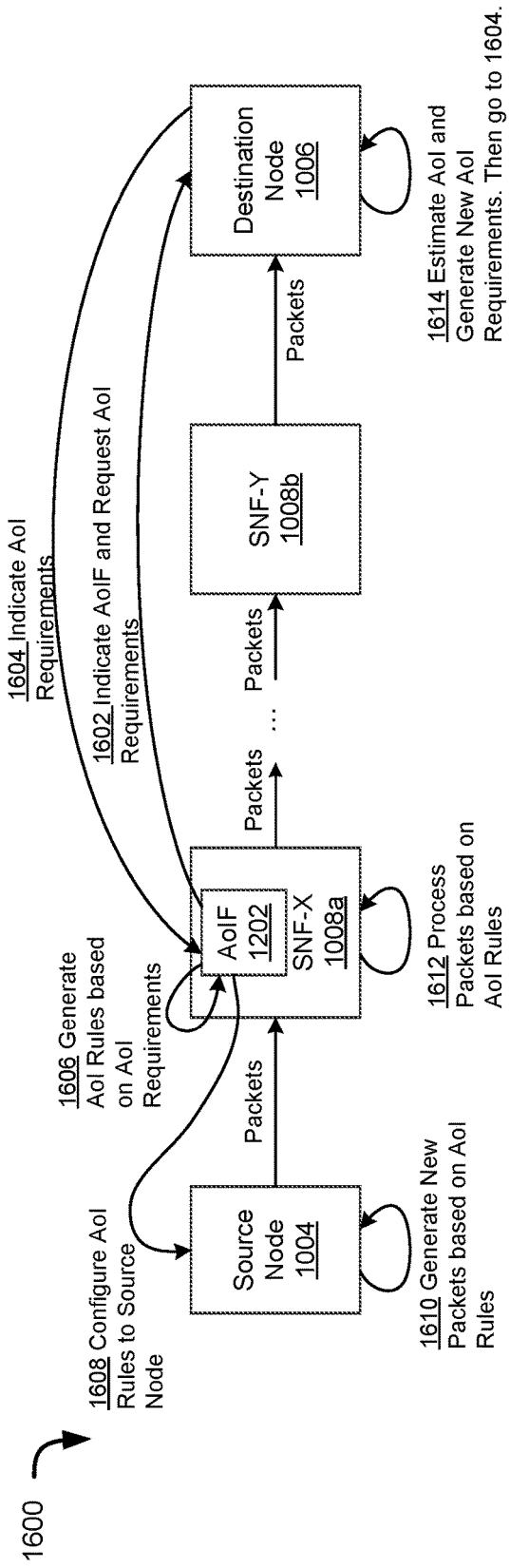
FIG. 16 is a diagram illustrating an additional representative configuration for age-aware service function chaining.

FIG. 16 is a diagram illustrating an additional representative configuration 1600 for age-aware service function chaining. As shown in FIG. 16, the AoIF 1202 may be provided at and/or in any one of the SNFs 1008 or in multiple SNFs 1008.

At 1602 of FIG. 16, the AoIF 1202 in and/or at any SNF 1008 (e.g., SNF-X 1008A) may send a request to the destination node 1006 to indicate that the SNF 1008 has an embedded AoIF 1202 and/or request for the destination node's AoI requirements for one or multiple traffic flows. After, the destination node 1006 send AoI requirements to the AoIF 1202.

1604 of FIG. 16 may be performed similarly to, or the same as, 1210 of FIG. 12. In 1604, a destination proxy node 1106 and/or a source node 1004 could perform this step to indicate AoI requirements on behalf of the destination node. For example, a destination node, such as a drone controlled by a controller WTRU 102 or a controller vehicle, may be behind a gateway, such as the controller WTRU 102 and/or the controller vehicle, the gateway may send the AoI requirements of the destination node 1006 to AoIF 1202.

1606 of FIG. 16 may be performed similarly to, or the same as, 1212 of FIG. 12.

1608 of FIG. 16 may be performed similarly to, or the same as, 1216 of FIG. 12.

1610 of FIG. 16 may be performed similarly to, or the same as, 1218 of FIG. 12.

1612 of FIG. 16 may be performed similarly to, or the same as, 1220 of FIG. 12.

1614 of FIG. 16 may be performed similarly to, or the same as, 1224 of FIG. 12. Based on the estimated and/or measured new AoI, the destination node 1006 may repeat 1604 to indicate any new AoI requirements to the AoIF 1202.

Figure 17:
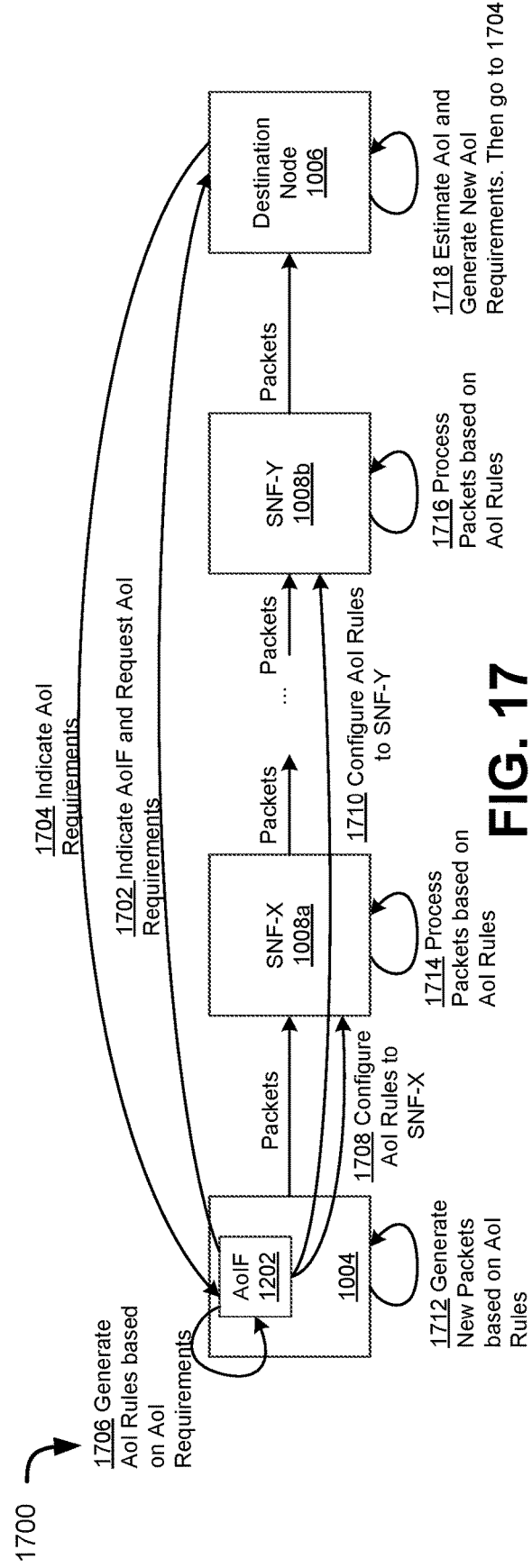
FIG. 17 is a diagram illustrating another additional representative configuration for age-aware service function chaining.

FIG. 17 is a diagram illustrating another additional representative configuration 1700 for age-aware service function chaining. As shown in FIG. 17, the AoIF 1202 may be co-located (e.g., embedded) with and/or in a source node.

At 1702 of FIG. 17, the AoIF 1202 may cause the source node 1004 to send a request to the destination node 1006 and/or destination proxy node 1106 to indicate that the source node 1004 has an embedded AoIF 1202 (e.g., indicate the AoIF 1202 is embedded in the source node) and/or request for AoI requirements from the destination node 1006 for one or multiple traffic flows.

At 1704 of FIG. 17, the destination node 1006 may send any AoI requirements to the AoIF 1202. 1704 may be performed similarly to, or the same as, 1210 of FIG. 12. In 1704, a destination proxy node 1106 may perform this step to indicate AoI requirements on behalf of the destination node. For example, a destination node, such as a drone controlled by a controller WTRU 102 or a controller vehicle, may be behind a gateway, such as the controller WTRU 102 and/or the controller vehicle, the gateway may send the AoI requirements of the destination node 1006 to AoIF 1202.

1706 of FIG. 17 may be performed similarly to, or the same as 1212 of FIGS. 12.

1708 and 1710 of FIG. 17 may be performed similarly to, or the same as, 1214 of FIG. 12. The AoIF 1202 may cause the source node 1004 to configure any AoI rules to any of the on-route SNFs 1008. For example, the AoIF 1202 may send a separate request to each SNF 1008 to configure AoI rules for each SNF 1008 (e.g., 1708 for SNF-X 1008A and 1710 for SNF-Y 1008B). As another example, the AoIF 1202 may send one (e.g., single) request to configure AoI rules for all of the on-route SNFs 1008. The one request may contain the AoI rules for each of the SNFs 1008 and may be relayed by each on-route SNF 1008 to a next on-route SNF 1008 towards the destination node. In this manner, all of the on-route SNFs 1008 will receive the one request and receive corresponding AoI rules.

1712 of FIG. 17 may be performed similarly to, or the same as, 1218 of FIG. 12.

1714 of FIG. 17 may be performed similarly to, or the same as, 1220 of FIG. 12.

1716 of FIG. 17 may be performed similarly to, or the same as, 1222 of FIG. 12.

1718 of FIG. 17 may be performed similarly to, or the same as, 1224 of FIG. 12. Based on the estimated and/or measured new AoI, the destination node 1006 may repeat 1704 to indicate any new AoI requirements to the AoIF 1202.

Figure 18:
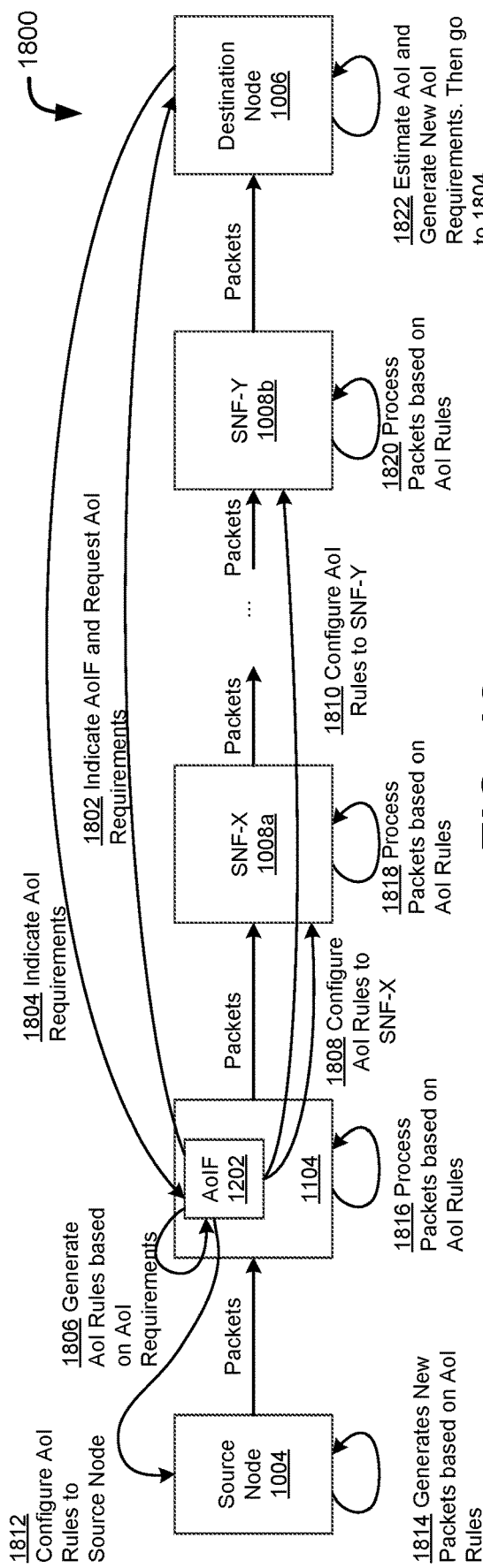
FIG. 18 is a diagram illustrating yet another representative configuration for age-aware service function chaining.

FIG. 18 is a diagram illustrating yet another representative configuration 1800 for age-aware service function chaining. As shown in FIG. 18, the AoIF 1202 may be co-located with a source proxy node.

At 1802 of FIG. 18, the AoIF 1202 may cause the source proxy node 1104 to send a request to the destination node 1006 to indicate that the source proxy node 1104 has an embedded AoIF 1202 and/or request for the AoI requirements of the destination node 1006 for one or multiple traffic flows.

1804 of FIG. 18 may be performed similarly to, or the same as, 1210 of FIG. 12. It is worth noting that a destination proxy node 1106 may indicate any AoI requirements on behalf of the destination node. For example, a destination node, such as a drone controlled by a controller WTRU 102 or a controller vehicle, may be behind a gateway, such as the controller WTRU 102 and/or the controller vehicle, the gateway may send the AoI requirements of the destination node 1006 to AoIF 1202.

1806 of FIG. 18 may be performed similarly to, or the same as, 1212 of FIG. 12.

1808, 1810, and/or 1812 of FIG. 18 may be performed similarly to, or the same as, 1214 of FIG. 12. The AoIF 1202 within the source proxy node 1104 may configure AoI rules to any of the on-route SNFs 1008. The AoIF 1202 may send a separate request to each SNF 1008 to configure respective AoI rules for each SNF 1008(e.g., 1808 for SNF-X 1008A and 1810 for SNF-Y 1008B). As another example, the AoIF 1202 may send one (e.g., single) request to configure AoI rules for each (e.g., all) of the on-route SNFs 1008. The one request may contain the respective AoI rules for each of the SNFs 1008. The one request may be relayed by each on-route SNF 1008 to a next on-route SNF 1008 towards the destination node. In this manner, all on-route SNF 1008 may receive the one request and receive corresponding AoI rules. The source proxy node 1104 may also send a separate request (e.g., 1812) to configure respective AoI rules to the source node, which may be similar to, or the same as, 1216 of FIG. 12.

1814 of FIG. 18 may be performed similarly to, or the same as, 1218 of FIG. 12.

1816 of FIG. 18 may be performed similarly to, or the same as, 1220 of FIG. 12. In certain representative embodiments, the source proxy node 1104 may perform processing which may include aggregating packets from one or more source nodes (e.g., into new packets) and may then forward the aggregated packets (e.g., new packets) downstream to the next SNF.

1818 of FIG. 18 may be performed similarly to, or the same as, 1220 of FIG. 12.

1820 of FIG. 18 may be performed similarly to, or the same as, 1222 of FIG. 12.

1822 of FIG. 18 may be performed similarly to, or the same as, 1224 of FIG. 12. Based on the estimated and/or measured new AoI, the destination node 1006 may repeat 1804 to indicate any new AoI requirements to the AoIF 1202.

Figure 19:
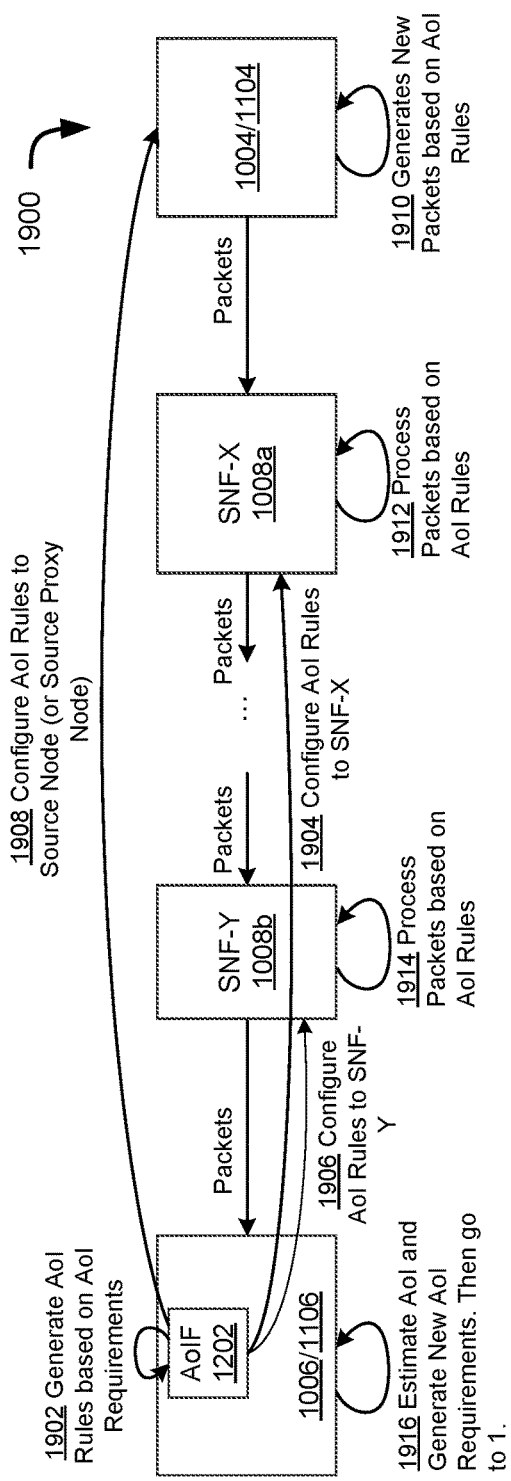
FIG. 19 is a diagram illustrating yet another additional representative configuration for age-aware service function chaining.

FIG. 19 is a diagram illustrating yet another additional representative configuration 1900 for age-aware service function chaining. As shown in FIG. 19, the AoIF 1202 may be co-located with the destination node 1006 and/or the destination proxy node 1106. For example, embedding the AoIF 1202 in the destination node 1006 may advantageously allow the AoIF 1202 to not need the destination node 1006 to externally transmit the AoI requirements to the AoIF 1202. As another example, embedding the AoIF 1202 at (e.g., within) the destination proxy node 1106, the destination node 1006 may be configured to send AoI requirements to the AoIF 1202, which may be similar to 1210 of FIG. 12.

1902 of FIG. 19 may be performed similarly to, or the same as, 1212 FIG. 12. The AoIF 1202 may generate AoI rules based on the AoI requirements from the destination node 1006 and/or the destination proxy node 1106.

1904, 1906, and/or 1908 of FIG. 19 may be performed similarly to, or the same as, 1214 of FIG. 12. The AoIF 1202 within the destination node 1006 and/or the destination proxy node 1106 may configure AoI rules to any (e.g., each) of the on-route SNFs 1008. For example, the AoIF 1202 may send a separate request to each SNF 1008 to configure respective AoI rules for each SNF 1008 (e.g., 1904 for SNF-X 1008A and 1906 for SNF-Y 1008B). As another example, the AoIF 1202 may send one (e.g., single) request to configure AoI rules for all of the on-route SNFs 1008 and/or the source node. The one request may contain respective AoI rules for each SNF 1008 and/or the source node 1004 and may be relayed by each on-route SNF 1008 to a next on-route SNF 1008(e.g., towards the source node) and/or the source node. All of the on-route SNFs 1008 and/or the source node 1004 may receive the one request and receive corresponding AoI rules. The destination node 1006 and/or the destination proxy node 1106 may send a separate request (e.g., 1908) to configure AoI rules to the source node 1004 (or source proxy node), which may be similar to, or the same as, 1216 of FIG. 12.

1910 of FIG. 18 may be performed similarly to, or the same as, 1218 of FIG. 12. In certain representative embodiments, the source proxy node 1104 may perform processing which may include aggregating packets from one or more source nodes (e.g., into new packets) and may then forward the aggregated packets (e.g., new packets) downstream to the next SNF.

1912 of FIG. 18 may be performed similarly to, or the same as, 1220 of FIG. 12.

1914 of FIG. 18 may be performed similarly to, or the same as, 1222 of FIG. 12.

1916 of FIG. 18 may be performed similarly to, or the same as, 1224 of FIG. 12. Based on the estimated and/or measured new AoI, the destination node 1006 may repeat 1904 to indicate any new AoI requirements to the AoIF 1202. Age-Aware Data and Control Plane Transmissions The configurations for age-aware service function chaining as described above, such as in FIGS. 12, 15 and 16, may be implemented in service-centric system (e.g., 5G and/or 6G systems) which may advantageously allow for AoI to be enforced (e.g., guaranteed) for mobile-originating data plane traffic flows and mobile-terminating data plane traffic flows.

FIG. 20 is a diagram illustrating a representative configuration 2000 of an age-aware mobile-originated traffic flow in a 5G and/or 6G data plane. In FIG. 20, a deployment example to enable age-aware mobile-originated traffic flows in a 5G and/or 6G data plane with an AoIF 1202 is shown. For example, one or multiple traffic flows may originate from a source node 1004 and/or a source proxy node 1104 (e.g., a WTRU 102) and be transmitted towards a data network. Any (e.g., each) traffic flow may travel through a base station (e.g., a gNB) and one or multiple User Plane Functions (UPFs). Such deployments may be used to support IoV implementations and/or other use cases to advantageously enable age-aware transmissions.

FIG. 21 is a diagram illustrating a representative configuration 2100 of an age-aware mobile-terminated traffic flow in a 5G and/or 6G data plane. In FIG. 21, a deployment example to enable age-aware mobile-terminated traffic flows in a 5G and/or 6G data plane with an AoIF 1202 is shown. For example, one or multiple traffic flows may be transmitted from a source node 1004 and/or source proxy node 1104 in a data network and be transmitted towards a destination node 1006 (e.g., a WTRU 102). Any (e.g., each) traffic flow may travel through one or multiple UPFs and a base station (e.g., gNB). Such deployments may be used to support mobile cloud gaming implementations and/or other use cases.

In certain representative embodiments, the AoIF 1202 may be implemented as a new network function in a 5G and/or 6G core network, a part of an existing AMF 182, a part of an existing SMF 183, a part of an existing PCF, and/or a part of existing an UDM/UDR. In certain representative embodiments, the AoIF 1202 may be deployed as a part of the base station and/or one or multiple UPFs. For example, the AoIF 1202 may be configured to collect AoI requirements of a traffic flow from any application servers in the data network. As another example, the WTRU 102 may indicate its AoI requirements to the AoIF 1202 via its serving AMF 182 and/or as a part of WTRU 102 subscription data, a WTRU 102 registration procedure (e.g., initial registration, periodical registration and/or mobile registration update), a WTRU 102 service request, and/or a WTRU 102 session management procedure.

In certain representative embodiments, the WTRU 102 may sends its AoI requirements to its serving AMF 182. The serving AMF 182 may select an AoIF 1202 from among multiple AoIF 1202s and may forward the AoI requirements to the selected AoIF 1202. In certain representative embodiments, the WTRU 102 may also be configured with an address of a selected AoIF 1202 during WTRU 102 registration (e.g., initial registration, periodical registration and/or mobile registration update), a WTRU 102 service request, and/or a WTRU 102 session management. After, the WTRU 102 may indicate (e.g., directly report) its AoI requirements to the selected AoIF 1202 and/or retrieve any applicable AoI rules from the selected AoIF 1202.

In certain representative embodiments, the AoIF 1202 may generate AoI rules based on any of AoI requirements, WTRU 102 subscription data and/or policies. For example, the AoIF 1202 may interact with a PCF and/or a UDM 418 to retrieve WTRU 102 subscription data and/or any applicable policies. The generated AoI requirements may be stored (e.g., maintained) in a UDM 418 and/or a UDR. The AoI rules may be stored (e.g., maintained) in a PCF and/or a UDR. For example, the AoI rules may be installed to any UPFs 184, such as a part of session management procedure (e.g., where the AoIF 1202 is implemented as a part of a SMF 183 and/or an AMF 182). The WTRU 102 may receive some or all of the AoI rules from the AMF 182, such as a part of a WTRU 102 registration, a WTRU 102 service request, and/or a 5G mobility management procedure (e.g., where the AoIF 1202 is implemented as a part of an AMF 182).

For any mobile-originated traffic flows as in FIG. 20, for example, the AoIF 1202 may regard the WTRU 102 as the source node 1004 and/or source proxy node, the base station as the first SNF 1008 and/or source proxy node 1104 that the source node 1004 connects to, the UPFs 184 as on-route SNFs 1008, and the data network as the destination node 1006 and/or destination proxy node 1106. Then, the configurations and/or procedures described in FIGS. 12, 15 and/or 16 may be directly applied, such as with minimal modification.

For any mobile-originated traffic flows as in FIG. 21, for example, the AoIF 1202 may regard the WTRU 102 as the destination node 1006 and/or destination proxy node 1106, the base station as the last SNF 1008 and/or the destination proxy node 1106 before reaching the destination node, the UPFs 184 as on-route SNFs 1008, and the data network as the source node 1004 and/or source proxy node. Then, the configurations and/or procedures described in FIGS. 12, 15 and/or 16 may be directly applied, such as with minimal modification.

In certain representative embodiments, the base station may be transparent to any AoI rules and/or may not be regarded as an on-route SNF. For example, any (e.g., only) UPFs may regarded as the on-route SNFs 1008. For example, the AoIF 1202 may configure AoI rules to a WTRU 102 and its base station via its serving AMF 182. The AoIF 1202 may also configure AoI rules to the UPFs 184 via a corresponding SMF 183. The AMF 182 may collect AoI requirements and/or configure AoI rules to an application server in data network via a NEF 406. In FIGS. 20-21, the AoIF 1202 may be implemented as a part of a Policy Control Function (PCF).

Figure 22:
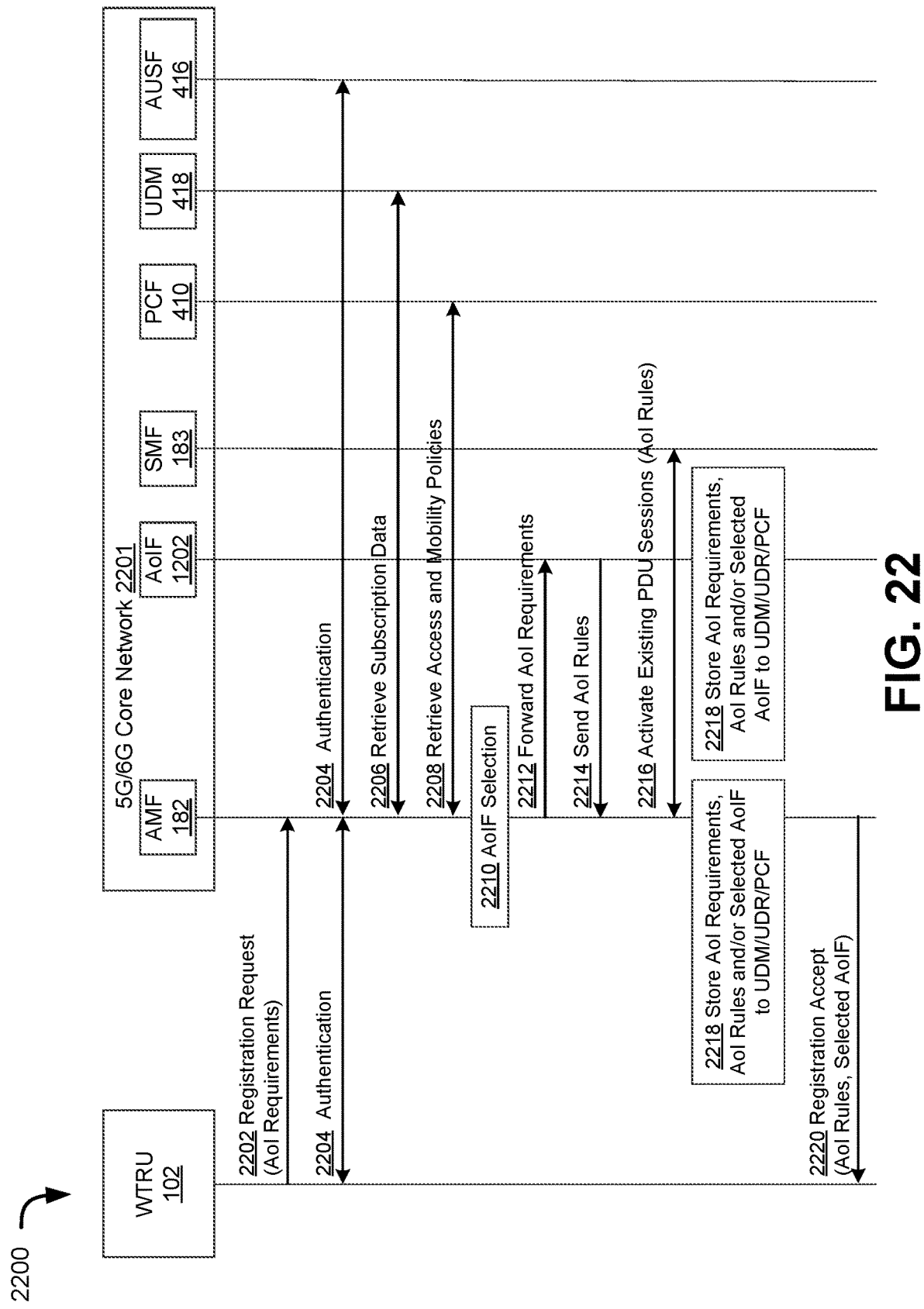
FIG. 22 is a diagram illustrating a representative procedure for a user equipment registration.

FIG. 22 is a diagram illustrating a representative procedure 2200 for a user equipment registration. As shown in FIG. 22, a 5G core (5GC) network and/or a 6G core (6GC) network 2201 may include any of an AMF 182, an AoIF 1202, a SMF 183, a PCF 410, a UDM 418 and/or a AUSF 416 (e.g., as logical entities). In certain representative embodiments, the AoIF 1202 may be implemented as part of the PCF 410. That is, the PCF 410 may be expanded to include the AoIF 1202.

In FIG. 22, at 2202 a WTRU 102 may send a registration request to an AMF 182 (e.g., its serving AMF 182) in the core network. For example, AoI requirements of the WTRU 102 may be included in (e.g., encapsulated and/or embedded) the registration request. The registration request may be associated with one or more PDU sessions, such as in a list of PDU sessions to be activated. If the WTRU 102 is preconfigured with an address of an AoIF 1202, the AoIF 1202 address may be included in (e.g., encapsulated and/or embedded) in the registration request.

At 2204, the AMF 182 may perform authentication procedure with the AUSF 416 to authenticate the WTRU 102. At 2206, the AMF 182 may retrieve any subscription data for the WTRU 102 from the UDM 418. At 2208, the AMF 182 may retrieve any access and mobility policies for the WTRU 102 from the PCF 410.

After receiving AoI requirements from the WTRU 102, the serving AMF 182 may discover and select an AoIF 1202 (e.g., from a NRF) at 2210. The AMF 182 may then forward the AoI requirements to the selected AoIF 1202 at 2212. The AMF 182 may also send any of the subscription data, access policies and/or mobility policies to the AoIF 1202. As another example, the AoIF 1202 may retrieve any of the subscription data, access policies and/or mobility policies from the AMF 182, the UDM 418 and/or the PCF 410. After receiving any of the AoI requirements, the subscription data, access policies and/or mobility policies, the AoIF 1202 may generate AoI rules based at least in part on this received information. The AoIF 1202 may sends the generated AoI rules to the serving AMF 182 at 2214.

Upon condition that the WTRU 102 has indicated in the registration request to activate a PDU session (e.g., existing PDU session), the serving AMF 182 may send a request to the SMF 183 to activate the existing PDU session at 2216. The serving AMF 182 may send some or all of the AoI rules to the SMF 183 in or with the request. After receiving the request, the SMF 183 may configure the AoI rules to a corresponding UPF 184 which serves the WTRU 102. After, when the UPF 184 receives any incoming packet belonging to the (e.g., activated) PDU session, the UPF 184 may process and forward the packet according to corresponding AoI rules, which may be similar to, or the same as, 1220 of FIG. 12. The serving AMF 182 and/or the selected AoIF 1202 may store any AoI requirements, any generated AoI rules and/or the address of the selected AoIF 1202 to any of a UDM 418, a UDR, and/or a PCF 410 at 2218.

When the serving AMF 182 sends the registration acceptance to the WTRU 102 at 2220, some or all of the AoI rules and/or the selected AoIF 1202 may be included in (e.g., encapsulated and/or embedded) the registration acceptance message sent to the WTRU 102. Using the registration acceptance, the AoI rules may be configured for the WTRU 102. The registration acceptance message may also contain the address of the selected AoIF 1202. When the WTRU 102 performs processing to generate packets (e.g., for an established PDU session), the WTRU 102 may check whether there are any (e.g., configured) AoI rules (e.g., for this PDU session). Upon condition that any AoI rules are available (e.g., for the PDU session), the WTRU 102 may generate one or more packets according to the AoI rules, which may be performed similar to, or the same as, 1218 of FIG. 12.

Figure 23:
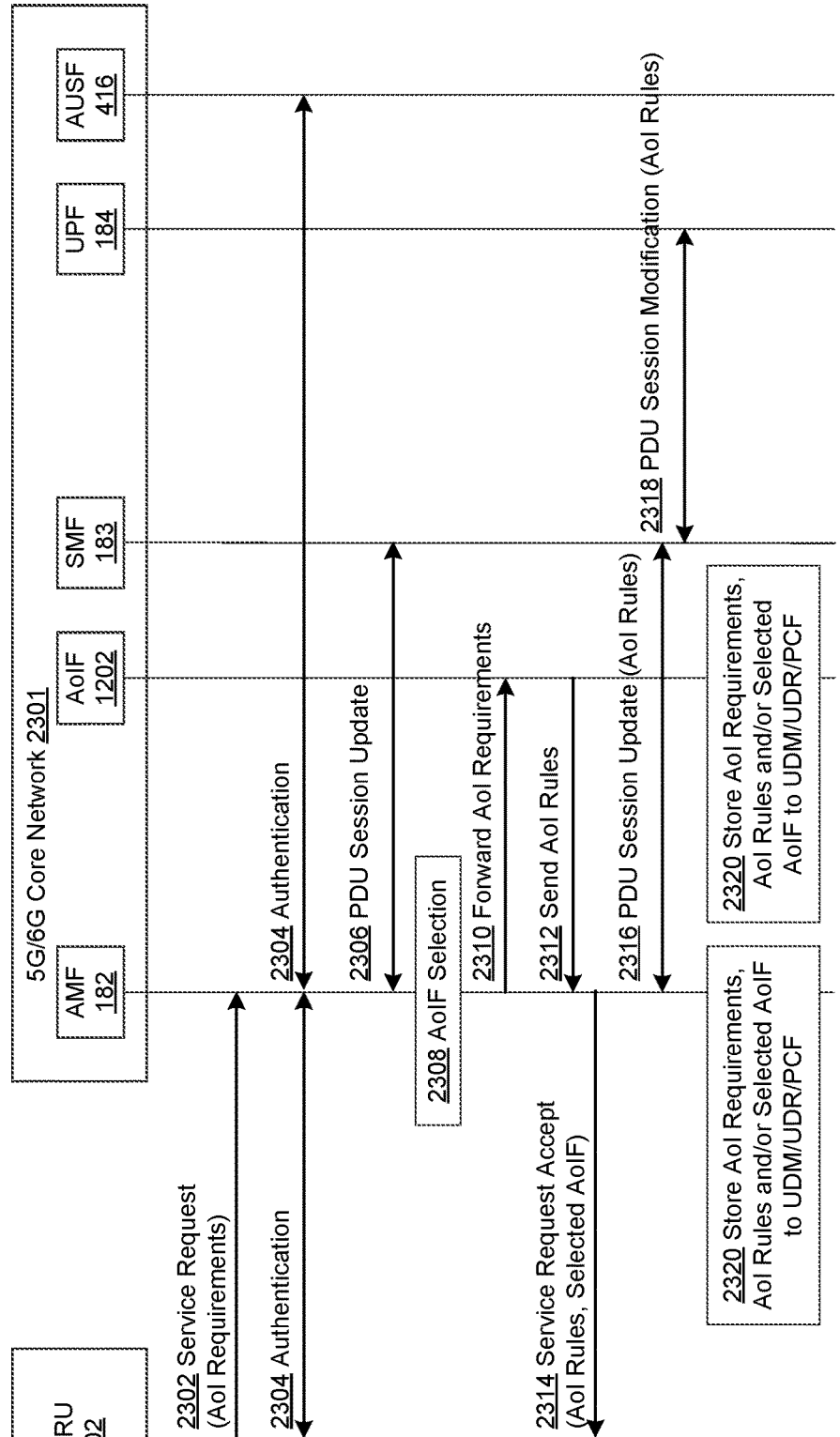
FIG. 23 is a diagram illustrating a representative procedure for a user equipment service request.

FIG. 23 is a diagram illustrating a representative procedure 2300 for a user equipment service request. As shown in FIG. 23, a 5G core (5GC) network and/or a 6G core (6GC) network 2301 may include any of an AMF 182, an AoIF 1202, a SMF 183, a UPF 184 and/or a AUSF 416 (e.g., as logical entities). In certain representative embodiments, the AoIF 1202 may be implemented as part of the PCF 410. That is, the PCF 410 may be expanded to include the AoIF 1202.

At 2302 in FIG. 23, a WTRU 102 may send a service request to its serving AMF 182. AoI requirements of the WTRU 102 may be included in (e.g., encapsulated and/or embedded) the service request. If the WTRU 102 is preconfigured with an AoIF 1202, it may include (e.g., encapsulate and/or embed) the AoIF 1202 address in the service request.

After receiving the service request, the AMF 182 may perform an authentication procedure with the AUSF 416 for the WTRU 102 at 2304. After authentication, the AMF 182 may perform a PDU session update procedure with the SMF 183 at 2306.

After receiving AoI requirements from the WTRU 102, the serving AMF 182 may discover and/or select an AoIF 1202 (e.g., from the NRF) at 2308. The serving AMF 182 may then forward the AoI requirements to the selected AoIF 1202 at 2310. The AoIF 1202 may generate AoI rules based on at least the received AoI requirements. The AoIF 1202 may send the generated AoI rules to the serving AMF 182 at 2312.

At 2314, the serving AMF 182 may send a service request acceptance to the WTRU 102. Some or all of the generated AoI rules and/or the selected AoIF 1202 may be included in (e.g., encapsulated and/or embedded) the service request acceptance sent to the WTRU 102. Using the service request acceptance, the AoI rules may be configured for the WTRU 102. When the WTRU 102 performs processing to generate packets for an established PDU session, the WTRU 102 may check whether there are any (e.g., configured) AoI rules for this PDU session. Upon condition that configured AoI rules are available for the established PDU session, the WTRU 102 may generate one or more packets according to the AoI rules, which may be similar to, or the same as, 1218 of FIG. 12.

At 2316, the serving AMF 182 may send a PDU session update request to the SMF 183. The PDU session update request may contain some or all of the AoI rules. At 2318, the SMF 183 may forward any received AoI rules to any (e.g., each) of the UPFs 184 that serve the WTRU 102. For example, the AoI rules may be forwarded to a UPF 184 by being included in a PDU session modification message. The serving AMF 182 and/or the selected AoIF 1202 may store the generated AoI rules and/or the address of selected AoIF 1202 to any of a UDM 418, a UDR, and/or a PCF 410. The serving AMF 182 and/or the selected AoIF 1202 may store any AoI requirements, any generated AoI rules and/or the address of the selected AoIF 1202 to any of a UDM 418, a UDR, and/or a PCF 410 at 2320.

Figure 24:
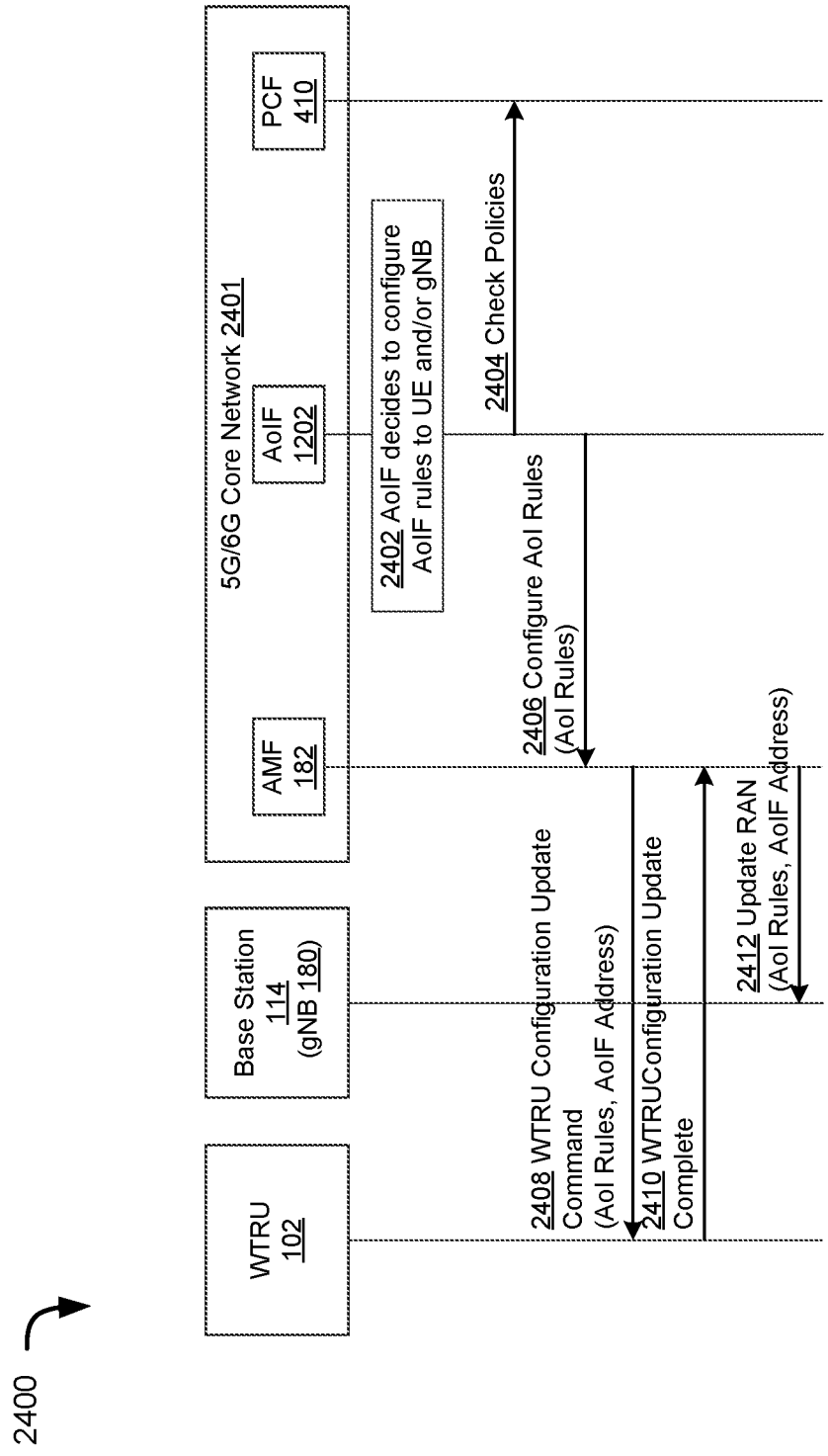
FIG. 24 is a diagram illustrating a representative procedure for a user equipment configuration update.

FIG. 24 is a diagram illustrating a representative procedure 2400 for a WTRU configuration update. As shown in FIG. 24, a 5G core (5GC) network and/or a 6G core (6GC) network 2401 may include any of an AMF 182, an AoIF 1202, and/or a PCF 410 (e.g., as logical entities). In certain representative embodiments, the AoIF 1202 may be implemented as part of the PCF 410. That is, the PCF 410 may be expanded to include the AoIF 1202.

At 2402, the AoIF 1202 may decide to configure AoIF 1202 rules to a WTRU 102 and/or a gNB, such as when new AoI rules are generated. At 2404, the AoIF 1202 may check for any applicable policies related to WTRU 102 configuration updates and/or for any new policies (e.g., policies related to network access and/or mobility) to be configured to the WTRU 102, such as by inquiring with a PCF 410.

At 2406, the AoIF 1202 may send some or all of the AoI rules to the serving AMF 182 of the WTRU 102. As another example, the AoIF 1202 may send some or all of the AoI rules to the PCF 410, and the PCF 410 may then forward any received AoI rules and/or any access and/or mobility policies to the serving AMF 182.

When the serving AMF 182 sends a WTRU 102 configuration update command to the WTRU 102 at 2408, some or all of the AoI rules and/or the selected AoIF 1202 may be included in (e.g., encapsulated and/or embedded) the WTRU 102 configuration update command sent to the WTRU 102. When the WTRU 102 performs processing to generate packets (e.g., for an established PDU session), the WTRU 102 may check if there are any configured AoI rules (e.g., for the PDU session). Upon condition that any AoI rules are available (e.g., for the PDU session), the WTRU 102 may generate one or more packets according to the AoI rules, which may be performed similar to, or the same as, 1218 of FIG. 12.

At 2410, the WTRU 102 may send a WTRU 102 configuration update complete message to indicate that the WTRU 102 configuration updated has completed.

At 2412, the AMF 182 may send a configuration update command to the RAN, such as to the base station (e.g., gNB). For example, some or all of the AoI rules and/or the selected AoIF 1202 may be included in (e.g., encapsulated and/or embedded) the configuration update command sent to the RAN.

Figure 25:
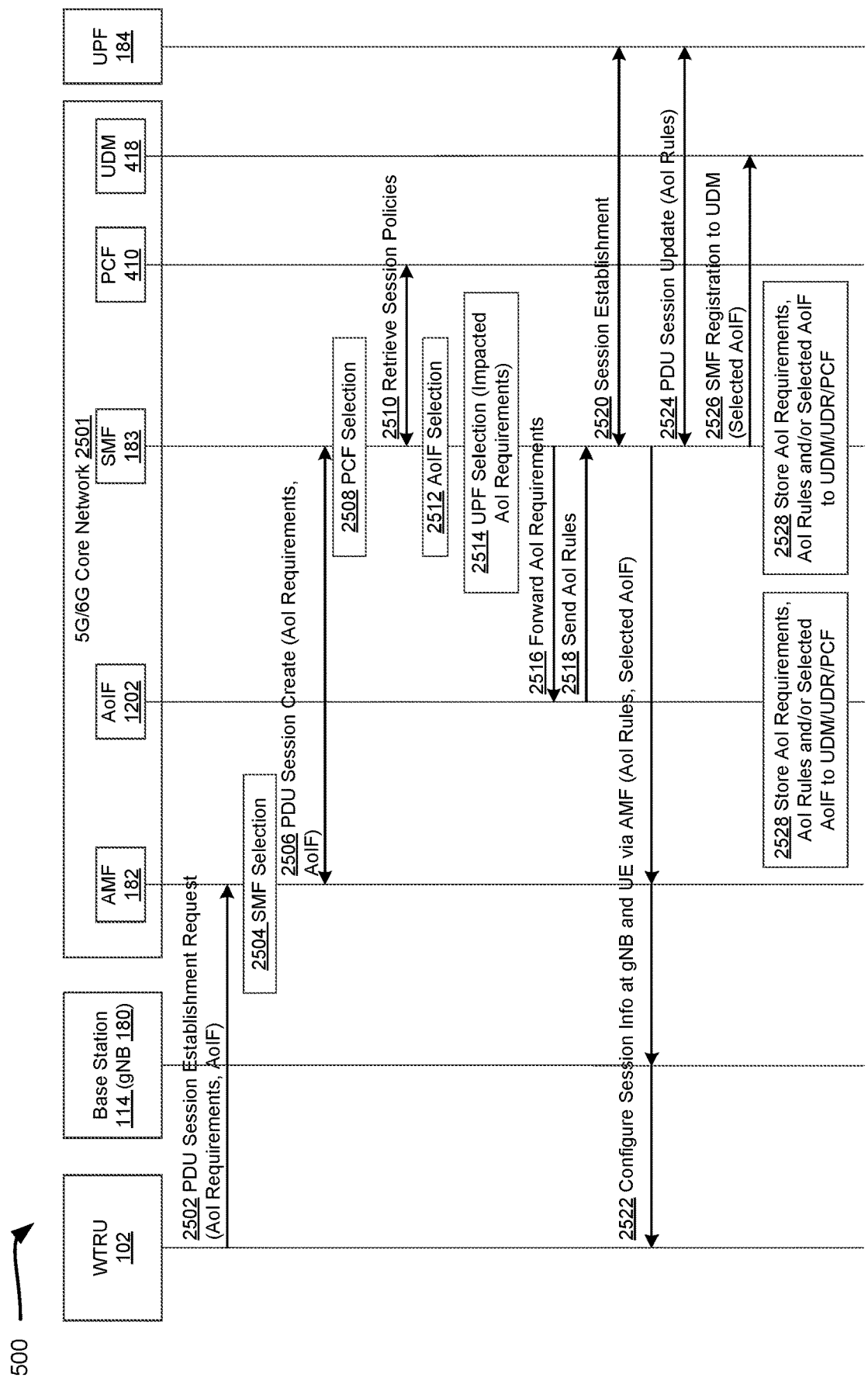
FIG. 25 is a diagram illustrating a representative procedure for establishing a protocol data unit session.

FIG. 25 is a diagram illustrating a representative procedure 2400 for a user equipment configuration update. As shown in FIG. 24, a 5G core (5GC) network and/or a 6G core (6GC) network 2501 may include any of an AMF 182, an AoIF 1202, a SMF 183, a PCF 410, a UPF 184 and/or a UDM 418 (e.g., as logical entities). In certain representative embodiments, the AoIF 1202 may be implemented as part of the PCF 410. That is, the PCF 410 may be expanded to include the AoIF 1202. The UPF 184 may be implemented outside of the 5GC and/or 6GC.

At 2502, the WTRU 102 may send a PDU session establishment request to its serving AMF 182. The WTRU 102 may include (e.g., encapsulate and/or embed) AoI requirements and/or an AoIF 1202 address in the service request. For example, the WTRU 102 may be preconfigured with an AoIF 1202, and the address of the AoIF 1202 may be included in the request.

At 2504, the serving AMF 182 may select an SMF 183 (e.g., based on the PDU session establishment request). At 2506, the serving AMF 182 may send a PDU session create request to a (e.g., selected) SMF 183. The received AoI requirements and/or the AoIF 1202 address may be included in (e.g., encapsulated and/or embedded) the PDU session create request sent to the SMF 183.

At 2508, after receiving AoI requirements from the serving AMF 182, the selected SMF 183 may perform PCF selection, and retrieve any session policies from the PCF 410 at 2510. The selected SMF 183 may also select an AoIF 1202 at 2512, such as in cases where the serving AMF 182 does not inform the SMF 183 of an address of any existing AoIF 1202.

At 2514, the selected SMF 183 may select a UPF 184 for the WTRU 102. The UPF selection procedure may take the received AoI requirements into account. For example, only a UPF 184 that supports AoI capabilities may be selected, such as to avoid impacting the WTRU 102 specified AoI requirements.

At 2516, the selected SMF 183 may forward the AoI requirements to the selected AoIF 1202. The selected AoIF 1202 may proceed to generate one or more AoI rules based on the AoI requirements. At 2518, the selected AoIF 1202 may send the generated AoI rules to the selected SMF 183.

At 2520, the selected SMF 183 may establish a PDU session with the selected UPF 184. At 2522, the selected SMF 183 may send a request to configure information for the PDU session to the WTRU 102 and/or the gNB. The request to configure the information for the PDU session may be sent via the serving AMF 182. The generated AoI rules and/or the AoIF 1202 address may be included in (e.g., encapsulated and/or embedded) the request sent at 2522. E needs to generate packets for an established PDU session, it will first check if there are any AoI rules for this PDU session; if AoI rules are available for this PDU session, the WTRU 102 will generates packets according to the AoI rules, which is similar to Step 7 of FIG. 10. Upon condition that any AoI rules are available (e.g., for the PDU session), the WTRU 102 may generate one or more packets according to the AoI rules, which may be performed similar to, or the same as, 1218 of FIG. 12.

At 2524, the selected SMF 183 may send a PDU session update request to the selected UPF 184. Some or all of the AoI rules may be included in (e.g., encapsulated and/or embedded) the PDU session update request. The UPF 184 may configure its AoI rules according to the received PDU session updated request. Thereafter, the UPF 184 may receive any incoming packet belonging to the established PDU session, and the UPF 184 may process and/or forward the packet according to corresponding AoI rules, which may be similar to, or the same as, 1220 of FIG. 12.

At 2526, the selected SMF 183 may send a request to register itself and the established PDU session to the UDM 418. Some or all of the AoI rules and/or the address of the selected AoIF 1202 may be included in (e.g., encapsulated and/or embedded) the registration request. In this manner, any other SNF 1008(e.g., the serving AMF 182) may then discover the selected AoIF 1202 for a particular WTRU 102 and/or a particular PDU session from the UDM 418.

At 2528, the selected SMF 183 and/or the selected AoIF 1202 may store any AoI requirements, any generated AoI rules and/or the address of the selected AoIF 1202 to any of a UDM 418, a UDR, and/or a PCF 410.

Figure 26:
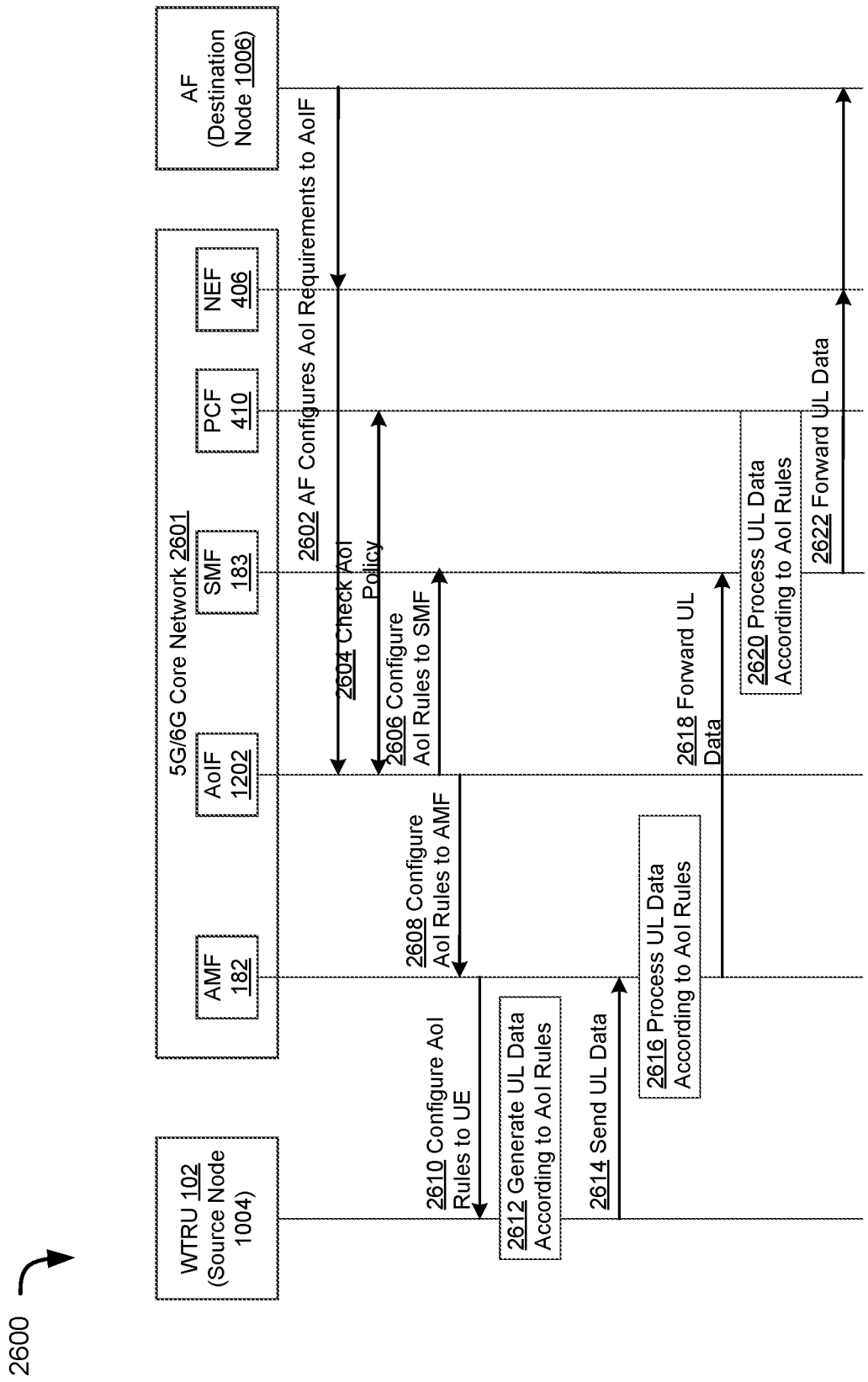
FIG. 26 is a diagram illustrating a representative procedure for age-aware control plane data transmission.

FIG. 26 is a diagram illustrating a representative procedure 2600 for age-aware control plane data transmission. As shown in FIG. 26, a 5G core (5GC) network and/or a 6G core (6GC) network may include any of an AMF 182, an AoIF 1202, a SMF 183, a PCF 410, a NEF 406 and/or a AF (e.g., as logical entities). In certain representative embodiments, the AoIF 1202 may be implemented as part of the PCF 410. That is, the PCF 410 may be expanded to include the AoIF 1202. The AF may be implemented outside of the 5GC and/or 6GC. Control plane (e.g., small) data transmission may be performed by the WTRU 102, as a source node 1004 and/or source proxy node, via the NEF 406 as follows.

At 2602, the AF, as a destination node 1006 and/or destination proxy node 1106, may send any AoI requirements (e.g., of the AF) to the AoIF 1202. A WTRU 102 identifier of the AF and/or any destination nodes may be indicated as part of the AoI requirements. For example, the AF may send the AoI requirements via the UPF 184. The AoIF 1202 may receive the AoI requirements (e.g., from the AF and/or the UPF 184).

At 2604, the AoIF 1202 may check with the PCF 410 for any AoI-related policies for the WTRU 102 and/or the AF. The AoIF 1202 may check with the PCF 410 as whether the AF and/or the WTRU 102 may be allowed (e.g., permitted) to use any AoI services provided by the AoIF 1202.

At 2606, the AoIF 1202 may generate one or more AoI rules based on the received AoI requirements and/or any applicable policies received from the PCF 410. The AoIF 1202 may then configure some or all of the AoI rules to the SMF 183, which may currently serve a traffic flow from the WTRU 102 to the AF. The AoIF 1202 may store some or all of the AoI rules to the UDR and/or UDSF, from which the SMF 183 and/or other SNFs 1008 may retrieve the stored AoI rules.

At 2608, the AoIF 1202 may configure some or all of the AoI rules to the AMF 182. At 2610, the AMF 182 may configure some or all of the AoI rules to the WTRU 102. At 2612, the WTRU 102 may generate uplink data (e.g., based on the configured AoI rules), and may be performed similarly to, or the same as, 1218 in FIG. 12.

At 2614, the WTRU 102 may send uplink data to the AMF 182. For example, the uplink data may be one or more small data transmissions. At 2616, the AMF 182 may process any uplink data received from the WTRU 102 according to the (e.g., configured) AoI rules, and the processing may be performed similarly to, or the same as, 1220 in FIG. 12. The AMF 182 may record any unused age budget and/or total age budget in the UL data to be forwarded to the SMF 183. At 2616, the AMF 182 may forward the (e.g., processed) uplink data to the SMF 183.

At 2618, the SMF 183 may process any uplink data received from the AMF 182 according to the (e.g., configured) AoI rules, and the processing may be performed similarly to, or the same as, 1220 in FIG. 12. The SMF 183 may record any unused age budget and/or total age budget in the UL data to be forwarded to the NEF 406. For example, where applicable AoI rules are configured at the SMF 183 for the received uplink data, the SMF 183 may check with the AoIF 1202 for any applicable AoI rules for the traffic flow (e.g., uplink data) from the WTRU 102 to the data network. The SMF 183 may retrieve some or all of the AoI rules for the traffic flow from the AoIF 1202 and may apply the retrieved AoI rules to any future uplink data of the same traffic flow. At 2620, the SMF 183 may forward the (e.g., processed) uplink data to AF via the NEF 406. The NEF 406 may record any unused age budget and/or total age budget in the UL data to be forwarded to the AF.

Figure 27:
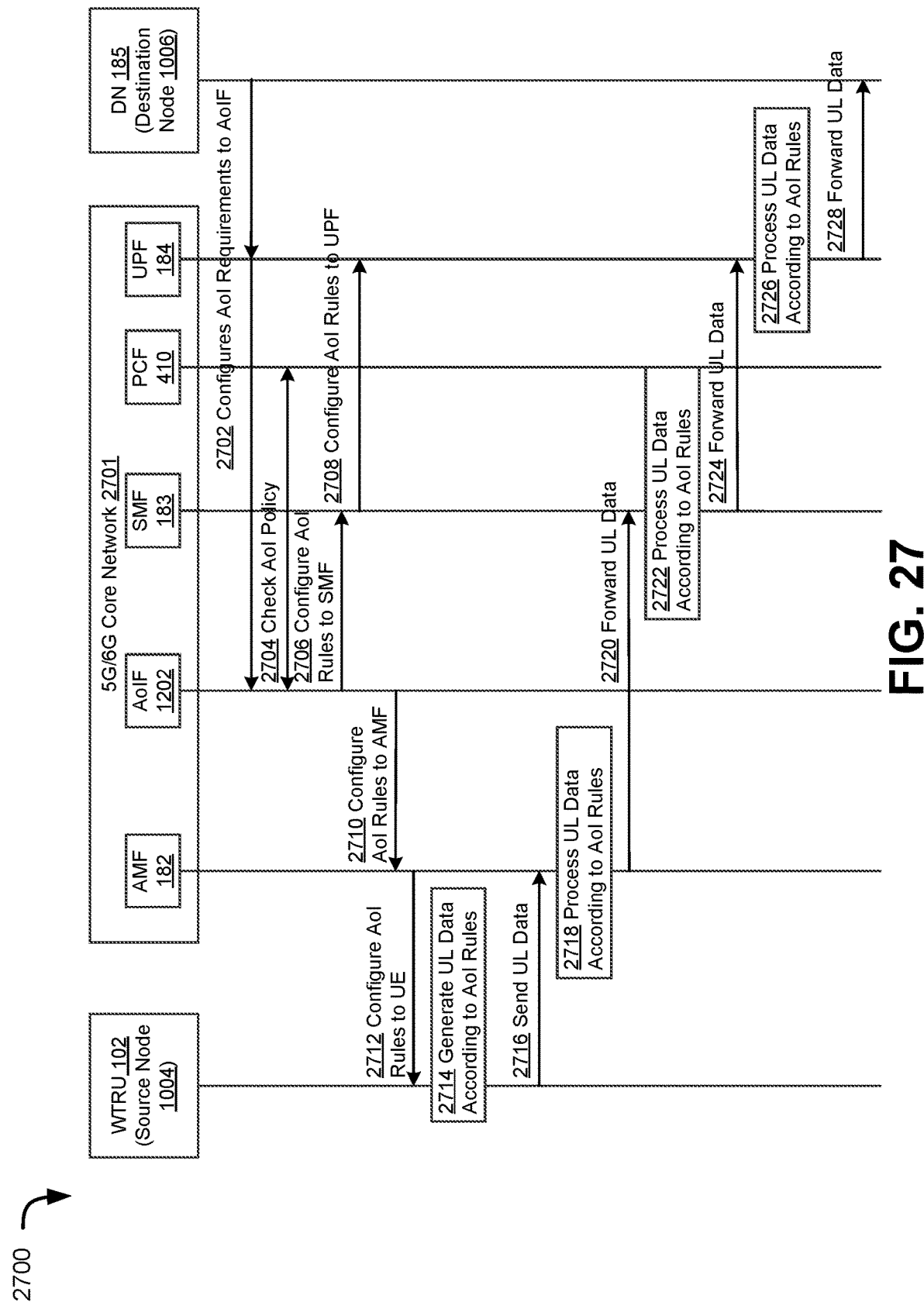
FIG. 27 is a diagram illustrating a representative procedure for age-aware user plane data transmission.

FIG. 27 is a diagram illustrating a representative procedure 2700 for age-aware user plane data transmission. As shown in FIG. 27, a 5G core (5GC) network and/or a 6G core (6GC) network 2701 may include any of an AMF 182, an AoIF 1202, a SMF 183, a PCF 410, and/or a UPF 184 (e.g., as logical entities). In certain representative embodiments, the AoIF 1202 may be implemented as part of the PCF 410. That is, the PCF 410 may be expanded to include the AoIF 1202. Control plane (e.g., small) data transmission may be performed by the WTRU 102, as a source node 1004 and/or source proxy node, via the UPF 184 as follows.

At 2702, the destination node 1006 and/or destination proxy node 1106 may send any AoI requirements (e.g., of the AF) to the AoIF 1202. A WTRU 102 identifier of the AF and/or any destination nodes may be indicated as part of the AoI requirements. For example, the AF may send the AoI requirements via the UPF 184. The AoIF 1202 may receive the AoI requirements (e.g., from the AF and/or the UPF 184).

At 2704, the AoIF 1202 may check with the PCF 410 for any AoI-related policies for the WTRU 102 and/or the AF. The AoIF 1202 may check with the PCF 410 as whether the AF and/or the WTRU 102 may be allowed (e.g., permitted) to use any AoI services provided by the AoIF 1202.

At 2706, the AoIF 1202 may generate one or more AoI rules based on the received AoI requirements and/or any applicable policies received from the PCF 410. The AoIF 1202 may then configure some or all of the AoI rules to the SMF 183, which may currently serve a traffic flow from the WTRU 102 to the AF. The AoIF 1202 may store some or all of the AoI rules to the UDR and/or UDSF, from which the SMF 183 and/or other SNFs 1008 may retrieve the stored AoI rules.

At 2708, the SMF 183 may configure some or all of the AoI rules to the UPF 184. At 2710, the AoIF 1202 may configure some or all of the AoI rules to the AMF 182, which currently covers (e.g., serves) the WTRU 102. At 2712, the AMF 182 may configure some or all of the AoI rules to the WTRU 102. At 2714, the WTRU 102 may generate uplink data (e.g., based on the configured AoI rules), and the processing may be performed similarly to, or the same as, 1218 in FIG. 12.

At 2716, the WTRU 102 may send uplink data to the AMF 182. For example, the uplink data may be one or more small data transmissions. At 2718, the AMF 182 may process any uplink data received from the WTRU 102 according to the (e.g., configured) AoI rules, and the processing may be performed similarly to, or the same as, 1220 in FIG. 12. The AMF 182 may record any unused age budget and/or total age budget in the UL data to be forwarded to the SMF 183. At 2720, the AMF 182 may forward the (e.g., processed) uplink data to the SMF 183.

At 2722, the SMF 183 may process any uplink data received from the AMF 182 according to the (e.g., configured) AoI rules, and the processing may be performed similarly to, or the same as, 1220 in FIG. 12. The SMF 183 may record any unused age budget and/or total age budget in the UL data to be forwarded to the UPF 184. For example, where applicable AoI rules are not configured and/or outdated at the SMF 183 for the received uplink data, the SMF 183 may check with the AoIF 1202 for any applicable AoI rules for the traffic flow (e.g., uplink data) from the WTRU 102 to the data network. The SMF 183 may retrieve some or all of the AoI rules for the traffic flow from the AoIF 1202 and may apply the retrieved AoI rules to any future uplink data of the same traffic flow. At 2724, the SMF 183 may forward the (e.g., processed) uplink data to AF via UPF 184.

At 2726, the UPF 184 may process any uplink data received from the AMF 182 according to the (e.g., configured) AoI rules, and the processing may be performed similarly to, or the same as, 1220 in FIG. 12. The UPF 184 may record any unused age budget and/or total age budget in the UL data to be forwarded to the DN. For example, where applicable AoI rules are not configured and/or outdated at the UPF 184 for the received uplink data, the UPF 184 may check with the AoIF 1202 for any applicable AoI rules for the traffic flow (e.g., uplink data) from the WTRU 102 to the data network. The UPF 184 may retrieve some or all of the AoI rules for the traffic flow from the AoIF 1202 and may apply the retrieved AoI rules to any future uplink data of the same traffic flow. At 2728, the UPF 184 may forward the (e.g., processed) UL data to the DN.

Age-Aware Messaging Services

Figure 28:
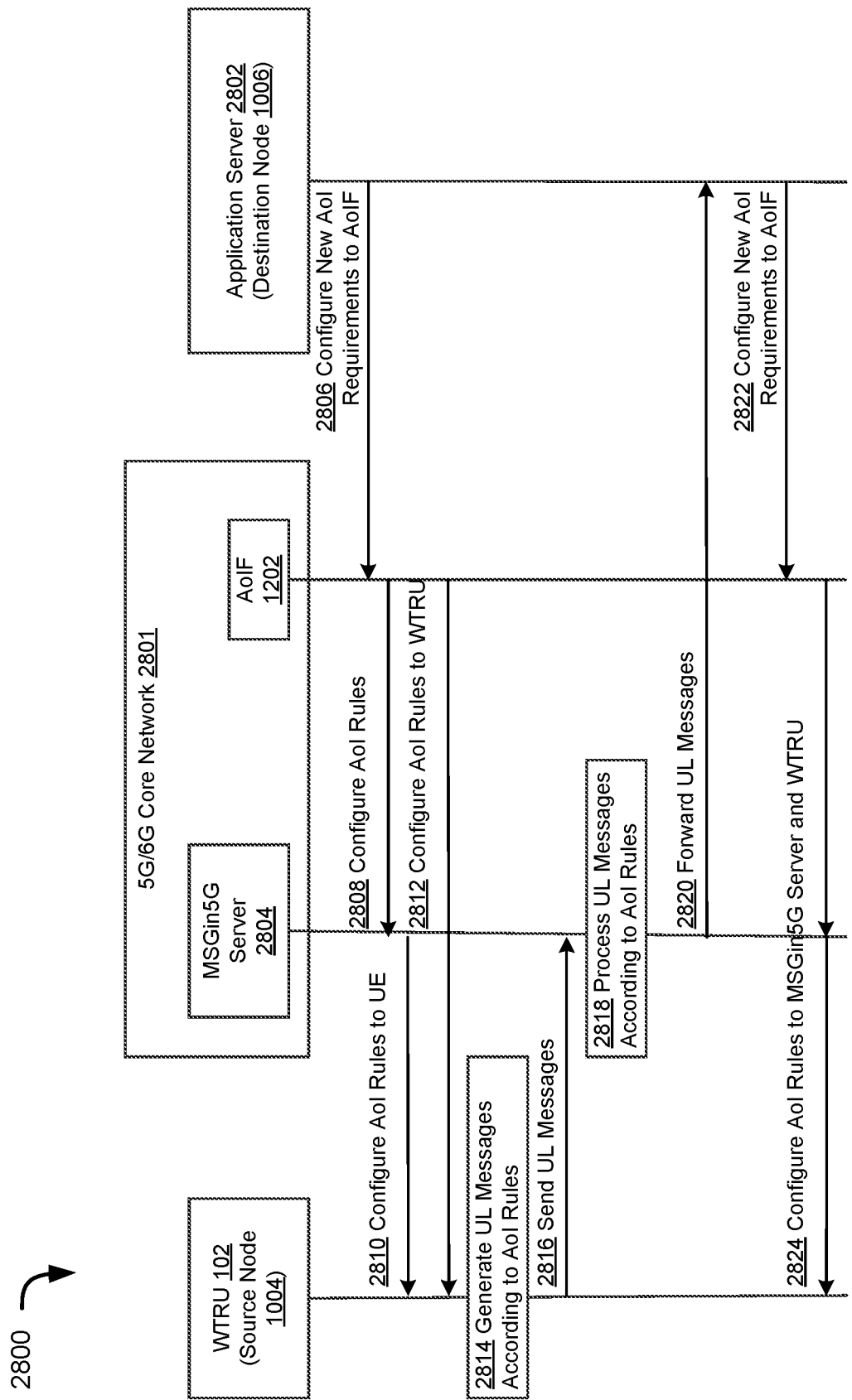
FIG. 28 is a diagram illustrating a representative procedure for age-aware messaging service.

FIG. 28 is a diagram illustrating a representative procedure 2800 for age-aware messaging service. As shown FIG. 28, a 5G core (5GC) network and/or a 6G core (6GC) network 2801 may include an AoIF 1202 and a messaging server 2804, such as a 3GPP MSGin5G Server as defined in 3GPP TR 23.700-24. The AoIF 1202 may be implemented as described elsewhere herein (e.g., in a PCF 410). A WTRU 102, as a source node 1004 and/or source proxy node, may send one or more messages through the messaging server to an application server, as a destination node 1006 and/or destination proxy node 1106. In certain representative embodiments, the traffic flow may be comprised of any messages from the WTRU 102 to the application server. The AoIF 1202 may collect and manage AoI requirements from the application server, generate AoI rules, and configure the AoI rules to the MSGin5G Server and/or the WTRU 102.

At 2806, the application server may send AoI requirements of a traffic flow to the AoIF 1202. At 2808, the AoIF 1202 may receive the AoI requirements and generate AoI rules based thereon. As an example, the AoIF 1202 may send a "Configure AoI Rules" request to the messaging server. This request may serve two purposes: 1) to configure the AoI rules for the messaging server itself; and/or 2) some or all of the AoI rules contained in this request may be intended for the WTRU 102, which may be forwarded by the messaging server. For example, the messaging server may forward some or all of the AoI rules for the WTRU 102 to the WTRU 102 (e.g., at 2810. As another example, the AoIF 1202 may send (e.g., directly) some or all of the AoI rules for the WTRU 102 to the WTRU 102 (e.g., at 2812).

At 2814, the WTRU 102 may generate one or more uplink messages according to the AoI rules (e.g., for the traffic flow). This processing may be performed similar to, or the same as, 1218 in FIG. 12. At 2816, the WTRU 102 may send any of the uplink messages to the messaging server.

At 2818, the messaging server may process the uplink messages according to configured AoI rules. This processing may be performed similar to, or the same as, 1220 in FIG. 12. The messaging server may record any unused age budget and/or total age budget in the uplink messages to be forwarded. At 2820, the messaging server may forward any uplink messages to the application server.

At 2822, the application server may receive any of the uplink messages and may estimate and/or measure the latest AoI. The application server may send new AoI requirements to AoIF 1202. (e.g., based on the estimated and/or measured AoI). Thereafter, the AoIF 1202 may generate new AoI rules and configure the new AoI rules to the messaging server and/or the WTRU 102, which may be performed similar to, or the same as, 2808 in FIG. 28. At 2824, the AoIF 1202 and/or the messaging server may configure (e.g., new) AoI Rules to the WTRU 120.

Figure 29:
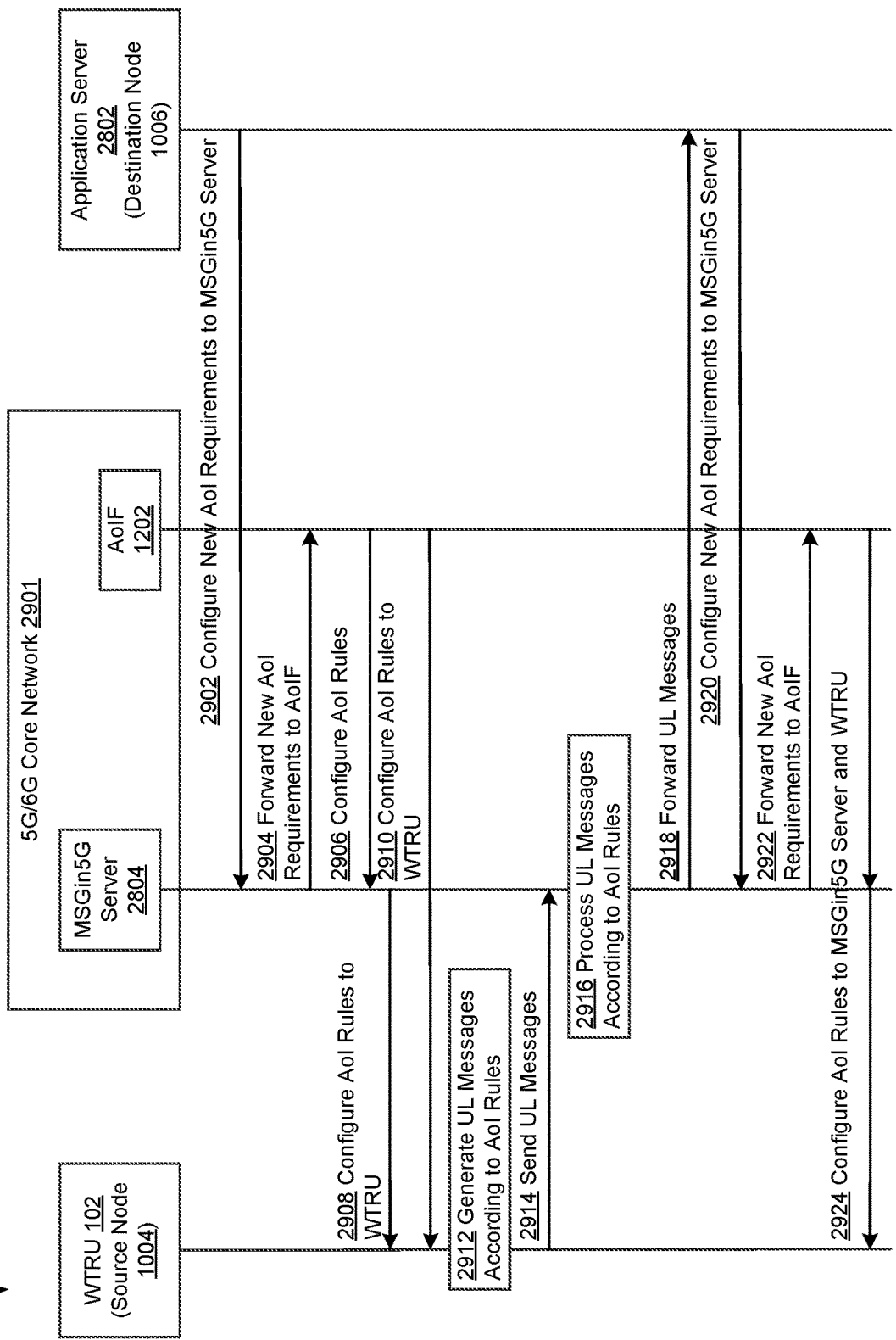
FIG. 29 is a diagram illustrating another representative procedure for age-aware messaging service.

FIG. 29 is a diagram illustrating another representative procedure 2900 for an age-aware messaging service. As shown FIG. 29, a 5G core (5GC) network and/or a 6G core (6GC) network 2901 may include an AoIF 1202 and a messaging server such as a 3GPP MSGin5G server 2804 as defined in 3GPP TR 23.700-24. The AoIF 1202 may be implemented as described elsewhere herein (e.g., in a PCF 410). A WTRU 102, as a source node 1004 and/or source proxy node, may send one or more messages through the messaging server to an application server, as a destination node 1006 and/or destination proxy node 1106. In certain representative embodiments, the traffic flow may be comprised of any messages from the WTRU 102 to the application server. The AoIF 1202 may receive AoI requirements from the messaging server.

At 2902, the application server may send (e.g., new) AoI requirements of the traffic flow to the messaging server. At 2904, the messaging server may receive the AoI requirements and forward the AoI requirements to the AoIF 1202. At 2906, the AoIF 1202 may receive the AoI requirements from the messaging server and may generate (e.g., new) AoI rules. The AoIF 1202 may configure the generated AoI rules at the messaging server. Then, 2908, 2910, 2912, 2914, 2916 and/or 2918 in FIG. 29 may be respectively performed similar to, or the same as, 2812 through 2820 in FIG. 28.

At 2918, the application server may receive any uplink messages from the messaging server and may estimate and/or measure the latest AoI of the traffic flow. The application server may send new AoI requirements to the messaging server (e.g., based on the estimated and/or measured AoI) at 2920. At 2922, the messaging server may forward the AoI requirements to the AoIF 1202. Thereafter, 2924 in FIG. 29 may be performed similar to, or the same as, 2824 in FIG. 28.

Figure 30:
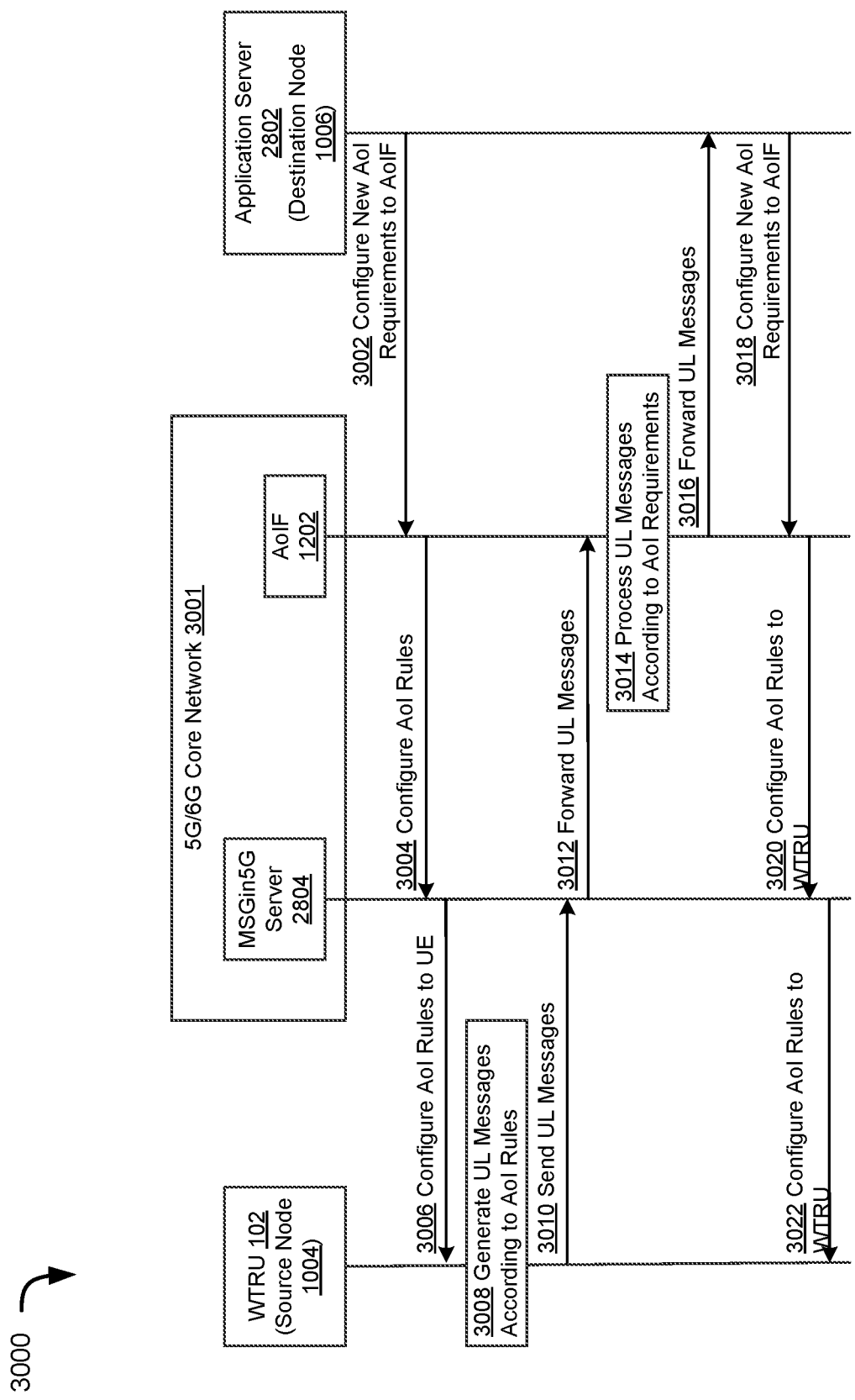
FIG. 30 is a diagram illustrating yet another representative procedure for age-aware messaging service.

FIG. 30 is a diagram illustrating yet another representative procedure 3000 for an age-aware messaging service. As shown FIG. 30, a 5G core (5GC) network and/or a 6G core (6GC) network 3001 may include an AoIF 1202 and a messaging server, such as a 3GPP MSGin5G server 2804 as defined in 3GPP TR 23.700-24. The AoIF 1202 may be implemented as described elsewhere herein (e.g., in a PCF 410). A WTRU 102, as a source node 1004 and/or source proxy node, may send one or more messages through the messaging server to an application server, as a destination node 1006 and/or destination proxy node 1106. The AoIF 1202 may generate AoI rules for any traffic flows, and may process uplink messages according to the AoI rules. In certain representative embodiments, the traffic flow may be comprised of any messages from the WTRU 102 to the application server.

At 3002, the application server may send AoI requirements of a traffic flow to the AoIF 1202. After receiving the AoI requirements from the application server, the AoIF 1202 may generate AoI rules (e.g., for the AoIF 1202, messaging server and WTRU 102, respectively).

At 3004, the AoIF 1202 may send some or all of the AoIF 1202 rules to the messaging server.

At 3006, the messaging server may send some or all of the AoIF 1202 rules to the WTRU 102. The AoI rules (e.g., specific to the WTRU 102) may be configured at the messaging server. For example, the messaging server may not be configured with any AoI rules and may forward any (e.g., all) received AoI rules to the WTRU 102. As another example, the messaging server may be configured with AoI rules and the WTRU 102 may be configured with AoI rules, respectively.

At 3008, the WTRU 102 generates one or more uplink messages according to AoI rules. This processing may be performed similar to, or the same as, 1218 in FIG. 12. At 3010, the WTRU 102 may send the uplink message to the messaging server.

At 3012, the messaging server may forward any received uplink messages (e.g., of the traffic flow) to the AoIF 1202. For example, where the messaging server is not configured with any AoI rules for the traffic flow, the messaging server may be transparent to any age budgeting and/or AoI of the traffic flow.

At 3014, the AoIF 1202 may process any received uplink messages of the traffic flow according to the AoI rules for the traffic flow. For example, the processing may include to record any unused age budget and/or total age budget in the uplink messages to be forwarded. At 3016, the AoIF 1202 may forward any uplink messages to the application server.

At 3018, the application server may receive any of the uplink messages and may estimate and/or measure the latest AoI. The application server may send new AoI requirements to AoIF 1202 (e.g., based on the estimated and/or measured AoI) at 3018. Thereafter, the AoIF 1202 may generate new AoI rules and configure the new AoI rules at 3020 and 3022 to the messaging server and/or the WTRU 102, which may be performed similar to, or the same as, 3004 and 3006 in FIG. 30.

Figure 31:
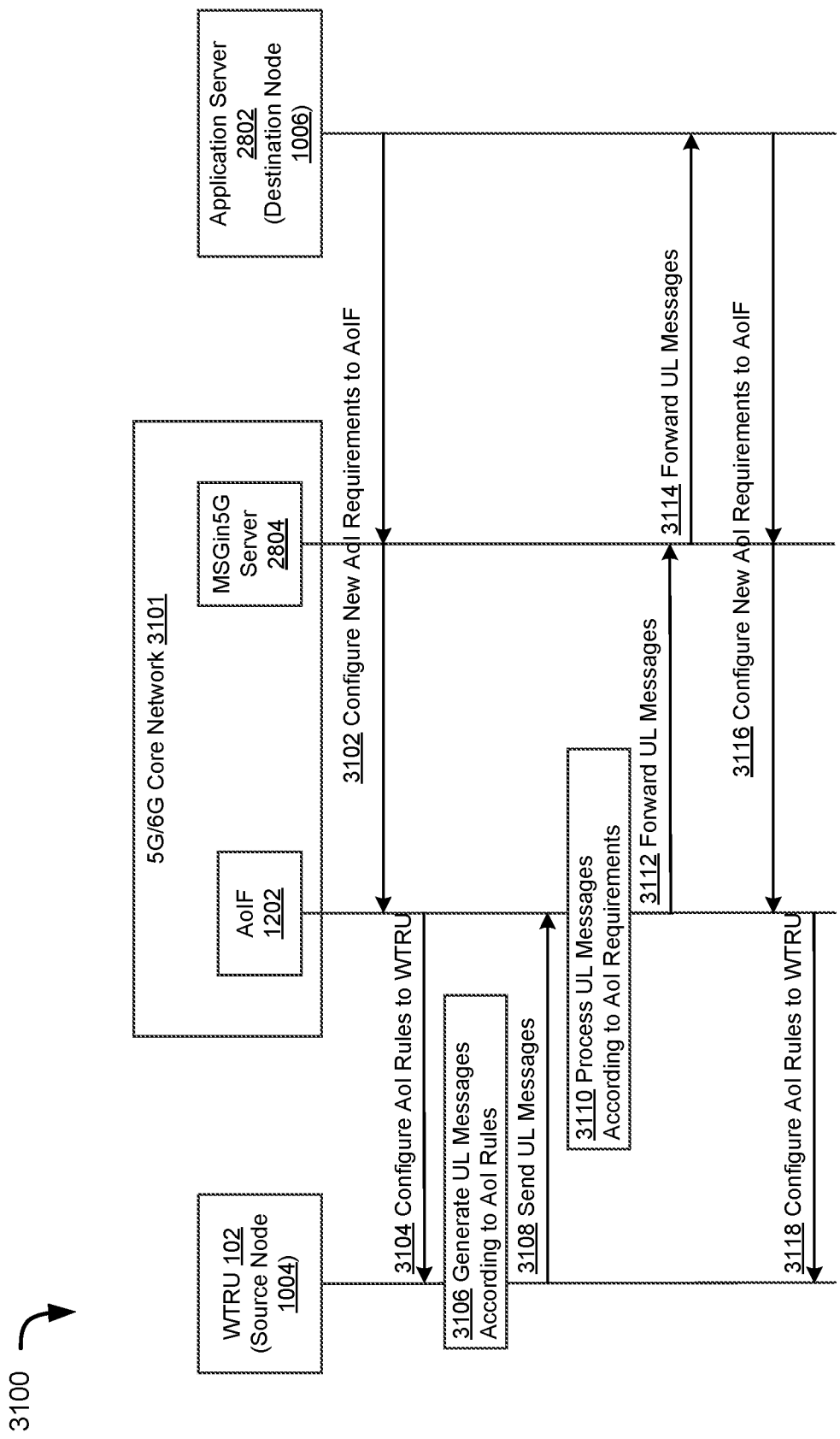
FIG. 31 is a diagram illustrating an additional representative procedure for age-aware messaging service.

FIG. 31 is a diagram illustrating an additional representative procedure 3100 for an age-aware messaging service. As shown FIG. 31, a 5G core (5GC) network and/or a 6G core (6GC) network 3101 may include an AoIF 1202 and a messaging server, such as a 3GPP MSGin5G server 2804 as defined in 3GPP TR 23.700-24. The AoIF 1202 may be implemented as described elsewhere herein (e.g., in a PCF 410). A WTRU 102, as a source node 1004 and/or source proxy node, may send one or more messages through the messaging server to an application server, as a destination node 1006 and/or destination proxy node 1106. The AoIF 1202 may generate AoI rules for any traffic flows, configure the AoI rules to the WTRU 102, and may process uplink messages according to the AoI rules. In certain representative embodiments, the traffic flow may be comprised of any messages from the WTRU 102 to the application server.

At 3102, the application server may send (e.g., new) AoI requirements to the AoIF 1202. For example, the AoI requirements may be sent via (e.g., relayed) by the messaging server. At 3104, the AoIF 1202 may receive the AoI requirements and generate AoI rules based thereon. The AoIF 1202 may then configure some or all of the generated AoI rules to the WTRU 102. The AoIF 1202 may also maintain and/or be configured with some or all of the AoI rules.

At 3106, the WTRU 102 may generate one or more uplink messages according to the configured AoI rules (e.g., for the traffic flow). This processing may be performed similar to, or the same as, 1218 in FIG. 12. At 3108, the WTRU 102 may send any of the uplink messages to the AoIF 1202.

At 3110, the AoIF 1202 may process the uplink messages according to the AoI rules (e.g., for the traffic flow). This processing may be performed similar to, or the same as, 1220 in FIG. 12. The AoIF 1202 may record any unused age budget and/or total age budget in the uplink messages to be forwarded. At 3112, the AoIF 1202 may forward any (e.g., processed) uplink messages to the messaging server.

At 3114, the messaging may forward the uplink messages according to the AoI rules (e.g., for the traffic flow). For example, the messaging server may perform processing on the uplink messages before forwarding them to the application server. This processing may be performed similar to, or the same as, 1220 in FIG. 12. The messaging server may record any unused age budget and/or total age budget in the uplink messages to be forwarded.

After receiving any uplink messages of the traffic flow, the application server may estimate and/or measure the AoI of the traffic flow. The application server may send new AoI requirements to the AoIF 1202 and/or the message server (e.g., based on the estimated and/or measured AoI) at 3116. Thereafter, the AoIF 1202 may generate new AoI rules and configure the new AoI rules to the WTRU 102 and/or the messaging server at 3118. 3116 and 3118 which may be performed similar to, or the same as, 3102 and 3104 in FIG. 31. Age-Awareness in Other Networks Future networks, such as Network 2030 and 6G networks, may be service-centric networks. For example, a service-centric network may be configured to provide a service plane (e.g., separate plane) for each respective service type. For example, each service plane may be established and/or configured as a service-specific virtual network (e.g., network slice). Each virtual network may be configured based on any respective application requirements associated with the service type.

In certain representative embodiments, the service type may be an AoI service. A service-specific virtual network may be configured for any applications that may have AoI requirements and/or may need certain AoI guarantees (e.g., average AoI, maximum AoI below a threshold, etc.). One or more applications may request respective AoI guarantees and/or may send respective AoI requirements, and the network may configure (e.g., newly create) an AoI service plane the applications. The AoI service plane may include any of AoIF 1202(s), source node(s), source proxy node(s), SNF(s), destination proxy node 1106(s), and/or destination node(s).

Figure 32:
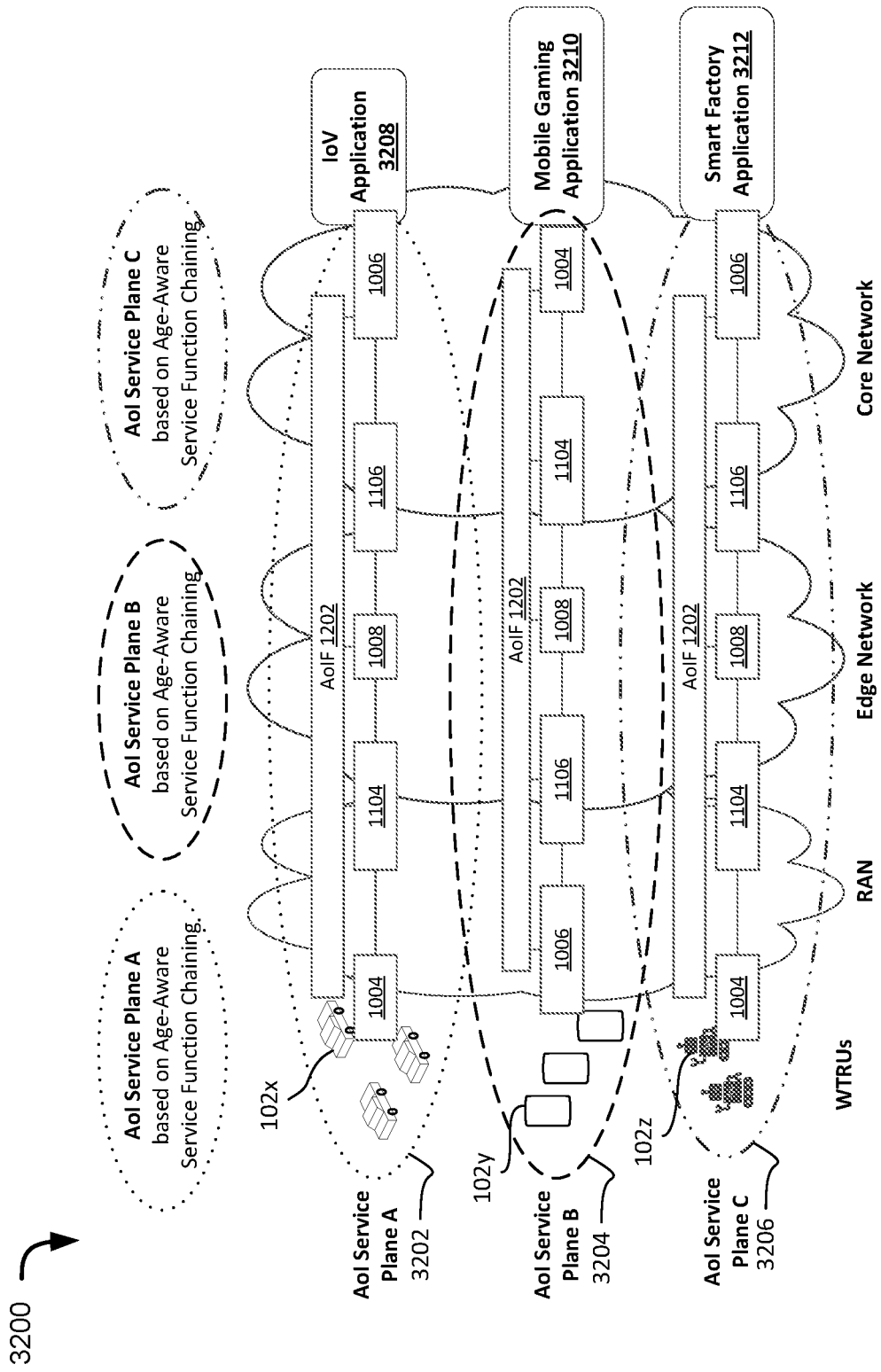
FIG. 32 is a diagram illustrating a representative system configuration for a service-centric network.

FIG. 32 is a diagram illustrating a representative system configuration 3200 for a service-centric network. As shown in FIG. 32, for example, multiple AoI service planes A, B and C 3202, 3204 and 3206 may configured from resources (e.g., same resources) in a RAN, edge network and/or core network. The AoI service planes may include any of a first AoI service plane A 3202 which may be configured as in FIG. 12, a second AoI service plane B 3204 which may be configured as in FIG. 15, and a third AoI service plane 3206 which may be configured as in FIG. 16.

For example, in AoI service plane A 3202, any source nodes 1004 may be vehicles 102x (e.g., autonomous vehicles, drones and/or platoons thereof) while the destination node 1006 may be one or more IoV applications 3208 that monitor and collect data from the vehicles 102x. An AoIF 1202 may reside in any of the RAN, edge network, and/or core network and may operate (e.g., according to the configuration shown in FIG. 12) to coordinate between any source node 1004 1004, source proxy node 1104, SNFs 1008, destination proxy node 1106, and destination node 1006 to achieve AoI requirements as may be indicated by any of the IoV applications 3208. For example, any source proxy nodes 1104 and/or destination proxy node 1106s 1106, if present, may reside in the edge network and/or core network.

For example, in AoI service plane B 3204, the source node 1004 1004 may be a mobile cloud gaming application 3210 and any destination nodes 1006 may be gaming consoles and/or mobile devices (e.g., smart phones) 102y. An AoIF 1202 may reside in any of the RAN, edge network, and/or core network and may operate (e.g., according to the configuration shown in FIG. 14) to coordinate between any source node 1004 1004, source proxy node 1104, SNFs 1008, destination proxy node 1106, and destination node 1006 to achieve AoI requirements as may be indicated by the mobile gaming application 3210. For example, any source proxy nodes 1104 and/or destination proxy node 1106s 1106, if present, may reside in the edge network and/or core network.

In AoI service plane C 3206, the source nodes 1004 may be autonomous vehicles and/or robots 102z while the destination node 1006 may be a smart factory application 3212 (e.g., to monitor and/or collect data from the source nodes 1004). An AoIF 1202 may reside in any of the RAN, edge network, and/or core network and may operate (e.g., according to the configuration shown in FIG. 14) to coordinate between any source node 1004 1004, source proxy node 1104, SNFs 1008, destination proxy node 1106, and destination node 1006 to achieve AoI requirements as may be indicated by the smart factory application 3212. For example, any source proxy nodes 1104 and/or destination proxy node 1106s 1106, if present, may reside in the edge network and/or core network.

It should be understood that the particular service planes shown in FIG. 32 are examples, and any of the service planes (e.g., AoI service planes A, B and/or C) may operate according to any of the configurations shown in FIGS. 12 and 15-19, for example. It should be understood that any of the procedures shown in FIGS. 12, 14 and 15 may be adapted and/or implemented for any of the configurations shown in FIGS. 22 to 31. For example, the traffic flow between the source node 1004 1004 and the destination node 1006 may be reversed. As another example, any of the source node 1004 1004 and/or the destination node 1006 may be configured as a proxy node to act on behalf of any number of source node(s) 1004 and/or any number of destination node(s) 1006, respectively.

FIG. 33 is a diagram illustrating a representative procedure for processing a packet flow. As shown in FIG. 33, the procedure 3300 may be implemented by a network entity (NE) as described herein, such as but not limited to a SNF 1008 which forwards a packet flow associated with a source node and a destination node. In FIG. 33, the method may include receiving information indicating one or more age of information (AoI) rules associated with the packet flow at 3302. For example, the one or more AoI rules may include at least a processing budget for the NE to process the packet flow. For example, the AoI of the packet flow may be associated with a time difference between generation and reception of a most recent information unit carried in the packet flow. At 3304, the NE may receive a packet of the packet flow. For example, the received packet may include information indicating a respective age budget of the received packet. After 3304, the NE may perform processing on the received packet at 3306. At 3308, on condition that an elapsed time for the processing of the received packet is less than or equal to a time amount associated with the processing budget and the respective age budget, the processed packet may be transmitted towards the destination node (e.g., to a next on-route NE).

For example, the time amount associated with the processing budget and the respective age budget may be determined as or using a sum of the processing budget and the respective age budget.

For example, the information indicating the one or more AoI rules may include a flag indicating that an updated age budget is included in the processed packet.

For example, the processed packet may include information indicating an updated age budget associated with the processed packet and/or which is related to the elapsed time for processing the received packet.

For example, the determining of the updated age budget may be based on the respective age budget and a difference between the processing budget and the elapsed time.

For example, the determining of the updated age budget may based on a sum of the respective age budget and a difference between the processing budget and the elapsed time.

For example, the respective age budget may be an accumulated age budget of the received packet or a remaining age budget of the received packet.

For example, the information indicating the one or more AoI rules may include a priority associated with the packet flow, and the processed packet may be transmitted towards the destination node using the priority associated with the packet flow.

For example, the processed packet of the packet flow may be transmitted to any of the destination node, a destination proxy node, or another NE associated with the packet flow.

FIG. 34 is a diagram illustrating another representative procedure for processing a packet flow. As shown in FIG. 34, the procedure 3400 may be implemented by a network entity (NE) as described herein, such as but not limited to a SNF 1008 which forwards a packet flow associated with a source node and a destination node. In FIG. 34, the method may include the NE receiving information indicating one or more age of information (AoI) rules associated with an AoI of the packet flow at 3402. For example, the one or more AoI rules may include at least a processing budget for the NE to process the packet flow. For example, the AoI of the packet flow is associated with a time difference between generation and reception of a most recent information unit carried by the packet flow. At 3404, the NE may receive a packet of the packet flow, wherein the received packet includes information indicating a respective age budget of the received packet. After 3404, the NE may perform processing the received packet at 3406. At 3408, on condition that an elapsed time for the processing of the received packet is greater than a time amount associated with the processing budget and the respective age budget, the NE may transmit the processed packet towards the destination node (e.g., to a next on-route NE), such as by using a probabilistic function to determine whether to transmit or drop the processed packet.

For example, the time amount associated with the processing budget and the respective age budget may be determined as or using a sum of the processing budget and the respective age budget.

For example, the information indicating the one or more AoI rules may include a flag indicating that an updated age budget is included in the processed packet.

For example, the processed packet may include information indicating an updated age budget associated with the processed packet and/or which is related to the elapsed time for processing the received packet.

For example, the determining of the updated age budget may be based on the respective age budget and a difference between the processing budget and the elapsed time.

For example, the determining of the updated age budget may be based on a sum of the respective age budget and a difference between the processing budget and the elapsed time.

For example, the determining of the respective age budget may be an accumulated age budget of the received packet or a remaining age budget of the received packet.

For example, the determining of the information indicating the one or more AoI rules may include a priority associated with the packet flow. For example, the processed packet may be transmitted towards the destination node using the priority associated with the packet flow.

For example, the determining of processed packet of the packet flow may be transmitted to any of the destination node, a destination proxy node, or another NE associated with the packet flow.

FIG. 35 is a diagram illustrating another representative procedure for processing a packet flow. As shown in FIG. 35, the procedure 3500 may be implemented by a network entity (NE) as described herein, such as but not limited to a SNF 1008 which forwards a packet flow associated with a source node and a destination node. In FIG. 35, the method may include the NE receiving information indicating one or more age of information (AoI) rules associated with an AoI of the packet flow at 3502. For example, the one or more AoI rules may include at least a processing budget for the NE to process the packet flow. For example, the AoI of the packet flow may be associated with a time difference between generation and reception of a most recent information unit carried by the packet flow. After 3502, the NE may receive a packet of the packet flow at 3504. For example, the received packet may include information indicating a respective age budget of the received packet. At 3506, the NE may perform processing on the received packet according to a time amount associated with the processing budget and the respective age budget. At 3508, on condition that an elapsed time of the processing of the received packet is greater than a time amount associated with the processing budget and the respective age budget, the NE may discard the processed packet, such as by using a probabilistic function to determine whether to transmit or drop the processed packet.

For example, the time amount associated with the processing budget and the respective age budget may be determined as or using a sum of the processing budget and the respective age budget.

For example, the discarding of the processed packet may be performed using a probabilistic function.

For example, the probabilistic function may be based on a number of hops between the source node and the destination node associated with the packet flow.

For example, the information indicating the one or more AoI rules may include any of an activation time period of the one or more AoI rules and/or an offset amount of time for activating the one or more AoI rules after receiving the information indicating the one or more AoI rules.

For example, the packet of the packet flow may be received from any of the source node, a source proxy node or another NE associated with the packet flow.

FIG. 36 is a diagram illustrating another representative procedure for processing a packet flow. As shown in FIG. 36, the procedure 3600 may be implemented by a network entity (NE) as described herein, such as but not limited to a SNF 1008 which forwards a packet flow associated with a source node and a destination node. In FIG. 36, the method may include the NE receiving information indicating one or more age of information (AoI) rules associated with an AoI of the packet flow at 3602. For example, the one or more AoI rules may include at least a processing budget for the NE to process the packet flow. For example, the AoI of the packet flow may be associated with a time difference between generation and reception of a most recent information unit carried by the packet flow at 3. After 3602, the NE may receive a packet of the packet flow at 3604. For example, the received packet may include information indicating a respective age budget of the received packet. At 3606, the NE may perform processing on the received packet according to a time amount associated with the processing budget and the respective age budget. At 3608, on condition that an elapsed time of the processing of the received packet is greater than a time amount associated with the processing budget and the respective age budget, the NE may transmit the packet which includes an indication that the time amount associated with the processing budget and the respective age budget was exceeded by the elapsed time.

For example, the time amount associated with the processing budget and the respective age budget may be determined as or using a sum of the processing budget and the respective age budget.

For example, the information indicating the one or more AoI rules may include a flag indicating that an updated age budget is included in the processed packet.

For example, the determining of the updated age budget may be based on the respective age budget and a difference between the processing budget and the elapsed time.

For example, the determining of the updated age budget may be based on a sum of the respective age budget and a difference between the processing budget and the elapsed time.

For example, the determining of the information indicating the one or more AoI rules may include a priority associated with the packet flow. For example, the processed packet may be transmitted towards the destination node using the priority associated with the packet flow.

For example, the determining of processed packet of the packet flow may be transmitted to any of the destination node, a destination proxy node, or another NE associated with the packet flow.

FIG. 37 is a diagram illustrating a representative procedure for processing a traffic flow. As shown in FIG. 37, the procedure 3700 may be implemented by a network entity (NE) as described herein, such as but not limited to a SNF 1008 which forwards a traffic flow associated with a source node and a destination node. In FIG. 37, the method may include receiving information indicating one or more age of information (AoI) rules associated with the traffic flow at 3702. For example, the one or more AoI rules may include at least a processing budget for the NE to process the traffic flow. For example, the AoI of the traffic flow may be associated with a time difference between generation and reception of a most recent information unit carried in the traffic flow. At 3704, the NE may receive a data unit of the traffic flow. For example, the received data unit may include information indicating a respective age budget of the received data unit. After 3704, the NE may perform processing on the received data unit at 3706. At 3708, on condition that an elapsed time for the processing of the received data unit is less than or equal to a time amount associated with the processing budget and the respective age budget, the processed data unit may be transmitted towards the destination node (e.g., to a next on-route NE).

For example, the time amount associated with the processing budget and the respective age budget may be determined as or using a sum of the processing budget and the respective age budget.

For example, the information indicating the one or more AoI rules may include a flag indicating that an updated age budget is included in the processed data unit.

For example, the transmitted data unit may include information indicating an updated age budget associated with the processed data unit and/or which is related to the elapsed time for processing the received data unit.

For example, the determining of the updated age budget may be based on the respective age budget and a difference between the processing budget and the elapsed time.

For example, the determining of the updated age budget may based on a sum of the respective age budget and a difference between the processing budget and the elapsed time.

For example, the respective age budget may be an accumulated age budget of the received data unit or a remaining age budget of the received data unit.

For example, the information indicating the one or more AoI rules may include a priority associated with the traffic flow, and the processed data unit may be transmitted towards the destination node using the priority associated with the traffic flow.

For example, the processed data unit of the traffic flow may be transmitted to any of the destination node, a destination proxy node, or another NE associated with the traffic flow.

FIG. 38 is a diagram illustrating another representative procedure for processing a traffic flow. As shown in FIG. 38, the procedure 3800 may be implemented by a network entity (NE) as described herein, such as but not limited to a SNF 1008 which forwards a traffic flow associated with a source node and a destination node. In FIG. 38, the method may include the NE receiving information indicating one or more age of information (AoI) rules associated with an AoI of the traffic flow at 3802. For example, the one or more AoI rules may include at least a processing budget for the NE to process the traffic flow. For example, the AoI of the traffic flow is associated with a time difference between generation and reception of a most recent information unit carried by the traffic flow. At 3804, the NE may receive a data unit of the traffic flow, wherein the received data unit includes information indicating a respective age budget of the received data unit. After 3804, the NE may perform processing the received data unit at 3806. At 3808, on condition that an elapsed time for the processing of the received data unit is greater than a time amount associated with the processing budget and the respective age budget, the NE may transmit the processed data unit towards the destination node (e.g., to a next on-route NE), such as by using a probabilistic function to determine whether to transmit or drop the processed data unit.

For example, the time amount associated with the processing budget and the respective age budget may be determined as or using a sum of the processing budget and the respective age budget.

For example, the information indicating the one or more AoI rules may include a flag indicating that an updated age budget is included in the transmitted data unit.

For example, the transmitted data unit may include information indicating an updated age budget associated with the transmitted data unit and/or which is related to the elapsed time for processing the received data unit.

For example, the determining of the updated age budget may be based on the respective age budget and a difference between the processing budget and the elapsed time.

For example, the determining of the updated age budget may be based on a sum of the respective age budget and a difference between the processing budget and the elapsed time.

For example, the determining of the respective age budget may be an accumulated age budget of the received data unit or a remaining age budget of the received data unit.

For example, the determining of the information indicating the one or more AoI rules may include a priority associated with the traffic flow. For example, the processed data unit may be transmitted towards the destination node using the priority associated with the traffic flow.

For example, the determining of processed data unit of the traffic flow may be transmitted to any of the destination node, a destination proxy node, or another NE associated with the traffic flow.

FIG. 39 is a diagram illustrating another representative procedure for processing a traffic flow. As shown in FIG. 39, the procedure 3900 may be implemented by a network entity (NE) as described herein, such as but not limited to a SNF 1008 which forwards a traffic flow associated with a source node and a destination node. In FIG. 39, the method may include the NE receiving information indicating one or more age of information (AoI) rules associated with an AoI of the traffic flow at 3902. For example, the one or more AoI rules may include at least a processing budget for the NE to process the traffic flow. For example, the AoI of the traffic flow may be associated with a time difference between generation and reception of a most recent information unit carried by the traffic flow. After 3902, the NE may receive a data unit of the traffic flow at 3904. For example, the received data unit may include information indicating a respective age budget of the received data unit. At 3906, the NE may perform processing on the received data unit according to a sum of the processing budget and the respective age budget. At 3908, on condition that an elapsed time of the processing of the received data unit is greater than a time amount associated with the processing budget and the respective age budget, the NE may discard the processed data unit, such as by using a probabilistic function to determine whether to transmit or drop the processed data unit.

For example, the time amount associated with the processing budget and the respective age budget may be determined as or using a sum of the processing budget and the respective age budget.

For example, the discarding of the processed data unit may be performed using a probabilistic function.

For example, the probabilistic function may be based on a number of hops between the source node and the destination node associated with the traffic flow.

For example, the information indicating the one or more AoI rules may include any of an activation time period of the one or more AoI rules and/or an offset amount of time for activating the one or more AoI rules after receiving the information indicating the one or more AoI rules.

For example, the data unit of the traffic flow may be received from any of the source node, a source proxy node or another NE associated with the traffic flow.

FIG. 40 is a diagram illustrating another representative procedure for processing a traffic flow. As shown in FIG. 40, the procedure 4000 may be implemented by a network entity (NE) as described herein, such as but not limited to a SNF 1008 which forwards a traffic flow associated with a source node and a destination node. In FIG. 40, the method may include the NE receiving information indicating one or more age of information (AoI) rules associated with an AoI of the traffic flow at 4002. For example, the one or more AoI rules may include at least a processing budget for the NE to process the traffic flow. For example, the AoI of the traffic flow may be associated with a time difference between generation and reception of a most recent information unit carried by the traffic flow at 3. After 4002, the NE may receive a data unit of the traffic flow at 4004. For example, the received data unit may include information indicating a respective age budget of the received data unit. At 4006, the NE may perform processing on the received data unit according to a sum of the processing budget and the respective age budget. At 4008, on condition that an elapsed time of the processing of the received data unit is greater than a time amount associated with the processing budget and the respective age budget, the NE may transmit the data unit which includes an indication that the sum of the processing budget and the respective age budget was exceeded by the elapsed time.

For example, the time amount associated with the processing budget and the respective age budget may be determined as or using a sum of the processing budget and the respective age budget.

For example, the information indicating the one or more AoI rules may include a flag indicating that an updated age budget is included in the processed data unit.

For example, the determining of the updated age budget may be based on the respective age budget and a difference between the processing budget and the elapsed time.

For example, the determining of the updated age budget may be based on a sum of the respective age budget and a difference between the processing budget and the elapsed time.

For example, the determining of the information indicating the one or more AoI rules may include a priority associated with the traffic flow. For example, the processed data unit may be transmitted towards the destination node using the priority associated with the traffic flow.

For example, the determining of processed data unit of the traffic flow may be transmitted to any of the destination node, a destination proxy node, or another NE associated with the traffic flow.

FIG. 41 is a diagram illustrating a representative procedure for processing a traffic flow. As shown in FIG. 41, the procedure 4100 may be implemented by a network entity (NE) as described herein, such as but not limited to a SNF 1008 which forwards a traffic flow associated with a source node and a destination node. In FIG. 41, the method may include receiving information indicating one or more age of information (AoI) rules associated with the traffic flow at 4102. For example, the one or more AoI rules may include at least a processing budget for the NE to process the traffic flow. For example, the AoI of the traffic flow may be associated with a time difference between generation and reception of a most recent information unit carried in the traffic flow. At 4104, the NE may receive a small data transmission (SDT) of the traffic flow. For example, the received SDT may include information indicating a respective age budget of the received SDT. After 4104, the NE may perform processing on the received SDT at 4106. At 3308, on condition that an elapsed time for the processing of the received SDT is less than or equal to a time amount associated with the processing budget and the respective age budget, the processed SDT may be transmitted towards the destination node (e.g., to a next on-route NE).

For example, the time amount associated with the processing budget and the respective age budget may be determined as or using a sum of the processing budget and the respective age budget.

For example, the information indicating the one or more AoI rules may include a flag indicating that an updated age budget is included in the transmitted SDT.

For example, the transmitted SDT may include information indicating an updated age budget associated with the transmitted SDT and/or which is related to the elapsed time for processing the received SDT.

For example, the determining of the updated age budget may be based on the respective age budget and a difference between the processing budget and the elapsed time.

For example, the determining of the updated age budget may based on a sum of the respective age budget and a difference between the processing budget and the elapsed time.

For example, the respective age budget may be an accumulated age budget of the received SDT or a remaining age budget of the received SDT.

For example, the information indicating the one or more AoI rules may include a priority associated with the traffic flow, and the processed SDT may be transmitted towards the destination node using the priority associated with the traffic flow.

For example, the processed SDT of the traffic flow may be transmitted to any of the destination node, a destination proxy node, or another NE associated with the traffic flow.

FIG. 42 is a diagram illustrating another representative procedure for processing a traffic flow. As shown in FIG. 42, the procedure 4200 may be implemented by a network entity (NE) as described herein, such as but not limited to a SNF 1008 which forwards a traffic flow associated with a source node and a destination node. In FIG. 42, the method may include the NE receiving information indicating one or more age of information (AoI) rules associated with an AoI of the traffic flow at 4202. For example, the one or more AoI rules may include at least a processing budget for the NE to process the traffic flow. For example, the AoI of the traffic flow is associated with a time difference between generation and reception of a most recent information unit carried by the traffic flow. At 4204, the NE may receive a SDT of the traffic flow, wherein the received SDT includes information indicating a respective age budget of the received SDT. After 4204, the NE may perform processing the received SDT at 4206. At 4208, on condition that an elapsed time for the processing of the received SDT is greater than a time amount associated with the processing budget and the respective age budget, the NE may transmit the processed SDT towards the destination node (e.g., to a next on-route NE), such as by using a probabilistic function to determine whether to transmit or drop the processed SDT.

For example, the time amount associated with the processing budget and the respective age budget may be determined as or using a sum of the processing budget and the respective age budget.

For example, the information indicating the one or more AoI rules may include a flag indicating that an updated age budget is included in the transmitted SDT.

For example, the transmitted SDT may include information indicating an updated age budget associated with the transmitted SDT and/or which is related to the elapsed time for processing the received SDT.

For example, the determining of the updated age budget may be based on the respective age budget and a difference between the processing budget and the elapsed time.

For example, the determining of the updated age budget may be based on a sum of the respective age budget and a difference between the processing budget and the elapsed time.

For example, the determining of the respective age budget may be an accumulated age budget of the received SDT or a remaining age budget of the received SDT.

For example, the determining of the information indicating the one or more AoI rules may include a priority associated with the traffic flow. For example, the processed SDT may be transmitted towards the destination node using the priority associated with the traffic flow.

For example, the determining of processed SDT of the traffic flow may be transmitted to any of the destination node, a destination proxy node, or another NE associated with the traffic flow.

FIG. 43 is a diagram illustrating another representative procedure for processing a traffic flow. As shown in FIG. 43, the procedure 4300 may be implemented by a network entity (NE) as described herein, such as but not limited to a SNF 1008 which forwards a traffic flow associated with a source node and a destination node. In FIG. 43, the method may include the NE receiving information indicating one or more age of information (AoI) rules associated with an AoI of the traffic flow at 4302. For example, the one or more AoI rules may include at least a processing budget for the NE to process the traffic flow. For example, the AoI of the traffic flow may be associated with a time difference between generation and reception of a most recent information unit carried by the traffic flow. After 4302, the NE may receive a SDT of the traffic flow at 4304. For example, the received SDT may include information indicating a respective age budget of the received SDT. At 4306, the NE may perform processing on the received SDT according to a time amount associated with the processing budget and the respective age budget. At 4308, on condition that an elapsed time of the processing of the received SDT is greater than the time amount associated with the processing budget and the respective age budget, the NE may discard the processed SDT, such as by using a probabilistic function to determine whether to transmit or drop the processed SDT.

For example, the time amount associated with the processing budget and the respective age budget may be determined as or using a sum of the processing budget and the respective age budget.

For example, the discarding of the processed SDT may be performed using a probabilistic function.

For example, the probabilistic function may be based on a number of hops between the source node and the destination node associated with the traffic flow.

For example, the information indicating the one or more AoI rules may include any of an activation time period of the one or more AoI rules and/or an offset amount of time for activating the one or more AoI rules after receiving the information indicating the one or more AoI rules.

For example, the SDT of the traffic flow may be received from any of the source node, a source proxy node or another NE associated with the traffic flow.

FIG. 44 is a diagram illustrating another representative procedure for processing a traffic flow. As shown in FIG. 44, the procedure 4400 may be implemented by a network entity (NE) as described herein, such as but not limited to a SNF 1008 which forwards a traffic flow associated with a source node and a destination node. In FIG. 44, the method may include the NE receiving information indicating one or more age of information (AoI) rules associated with an AoI of the traffic flow at 4402. For example, the one or more AoI rules may include at least a processing budget for the NE to process the traffic flow. For example, the AoI of the traffic flow may be associated with a time difference between generation and reception of a most recent information unit carried by the traffic flow at 3. After 4402, the NE may receive a SDT of the traffic flow at 4404. For example, the received SDT may include information indicating a respective age budget of the received SDT. At 4406, the NE may perform processing on the received SDT according to a time amount associated with the processing budget and the respective age budget. At 4408, on condition that an elapsed time of the processing of the received SDT is greater than the time amount associated with the processing budget and the respective age budget, the NE may transmit the SDT which includes an indication that the time amount associated with the processing budget and the respective age budget was exceeded by the elapsed time.

For example, the time amount associated with the processing budget and the respective age budget may be determined as or using a sum of the processing budget and the respective age budget.

For example, the information indicating the one or more AoI rules may include a flag indicating that an updated age budget is included in the transmitted SDT.

For example, the determining of the updated age budget may be based on the respective age budget and a difference between the processing budget and the elapsed time.

For example, the determining of the updated age budget may be based on a sum of the respective age budget and a difference between the processing budget and the elapsed time.

For example, the determining of the information indicating the one or more AoI rules may include a priority associated with the traffic flow. For example, the processed SDT may be transmitted towards the destination node using the priority associated with the traffic flow.

For example, the determining of processed SDT of the traffic flow may be transmitted to any of the destination node, a destination proxy node, or another NE associated with the traffic flow.

FIG. 45 is a diagram illustrating a representative procedure for processing a traffic flow. As shown in FIG. the procedure 4500 may be implemented by a network entity (NE) as described herein, such as but not limited to a SNF 1008 which forwards a traffic flow associated with a source node and a destination node. In FIG. 45, the method may include receiving information indicating one or more age of information (AoI) rules associated with the traffic flow at 4502. For example, the one or more AoI rules may include at least a processing budget for the NE to process the traffic flow. For example, the AoI of the traffic flow may be associated with a time difference between generation and reception of a most recent information unit carried in the traffic flow. At 4504, the NE may receive a message of the traffic flow. For example, the received message may include information indicating a respective age budget of the received message. After 4504, the NE may perform processing on the received message at 4506. At 4508, on condition that an elapsed time for the processing of the received message is less than or equal to a time amount associated with the processing budget and the respective age budget, the processed message may be transmitted towards the destination node (e.g., to a next on-route NE).

For example, the time amount associated with the processing budget and the respective age budget may be determined as or using a sum of the processing budget and the respective age budget.

For example, the information indicating the one or more AoI rules may include a flag indicating that an updated age budget is included in the transmitted message.

For example, the transmitted message may include information indicating an updated age budget associated with the transmitted message and/or which is related to the elapsed time for processing the received message.

For example, the determining of the updated age budget may be based on the respective age budget and a difference between the processing budget and the elapsed time.

For example, the determining of the updated age budget may based on a sum of the respective age budget and a difference between the processing budget and the elapsed time.

For example, the respective age budget may be an accumulated age budget of the received message or a remaining age budget of the received message.

For example, the information indicating the one or more AoI rules may include a priority associated with the traffic flow, and the processed message may be transmitted towards the destination node using the priority associated with the traffic flow.

For example, the processed message of the traffic flow may be transmitted to any of the destination node, a destination proxy node, or another NE associated with the traffic flow.

For example, the message may be a MSGin5G message.

For example, the message may be received from or transmitted to a MSGin5G server.

FIG. 46 is a diagram illustrating another representative procedure for processing a traffic flow. As shown in FIG. 46, the procedure 4600 may be implemented by a network entity (NE) as described herein, such as but not limited to a SNF 1008 which forwards a traffic flow associated with a source node and a destination node. In FIG. 46, the method may include the NE receiving information indicating one or more age of information (AoI) rules associated with an AoI of the traffic flow at 4602. For example, the one or more AoI rules may include at least a processing budget for the NE to process the traffic flow. For example, the AoI of the traffic flow is associated with a time difference between generation and reception of a most recent information unit carried by the traffic flow. At 4604, the NE may receive a message of the traffic flow, wherein the received message includes information indicating a respective age budget of the received message. After 4604, the NE may perform processing the received message at 4606. At 4608, on condition that an elapsed time for the processing of the received message is greater than a time amount associated with the processing budget and the respective age budget, the NE may transmit the processed message towards the destination node (e.g., to a next on-route NE), such as by using a probabilistic function to determine whether to transmit or drop the processed message.

For example, the time amount associated with the processing budget and the respective age budget may be determined as or using a sum of the processing budget and the respective age budget.

For example, the information indicating the one or more AoI rules may include a flag indicating that an updated age budget is included in the transmitted message.

For example, the transmitted message may include information indicating an updated age budget associated with the transmitted message and/or which is related to the elapsed time for processing the received message.

For example, the determining of the updated age budget may be based on the respective age budget and a difference between the processing budget and the elapsed time.

For example, the determining of the updated age budget may be based on a sum of the respective age budget and a difference between the processing budget and the elapsed time.

For example, the determining of the respective age budget may be an accumulated age budget of the received message or a remaining age budget of the received message.

For example, the determining of the information indicating the one or more AoI rules may include a priority associated with the traffic flow. For example, the processed message may be transmitted towards the destination node using the priority associated with the traffic flow.

For example, the determining of processed message of the traffic flow may be transmitted to any of the destination node, a destination proxy node, or another NE associated with the traffic flow.

For example, the message may be a MSGin5G message.

For example, the message may be received from or transmitted to a MSGin5G server.

FIG. 47 is a diagram illustrating another representative procedure for processing a traffic flow. As shown in FIG. 47, the procedure 4700 may be implemented by a network entity (NE) as described herein, such as but not limited to a SNF 1008 which forwards a traffic flow associated with a source node and a destination node. In FIG. 47, the method may include the NE receiving information indicating one or more age of information (AoI) rules associated with an AoI of the traffic flow at 4702. For example, the one or more AoI rules may include at least a processing budget for the NE to process the traffic flow. For example, the AoI of the traffic flow may be associated with a time difference between generation and reception of a most recent information unit carried by the traffic flow. After 4702, the NE may receive a message of the traffic flow at 4704. For example, the received message may include information indicating a respective age budget of the received message. At 4706, the NE may perform processing on the received message according to a time amount associated with the processing budget and the respective age budget. At 4708, on condition that an elapsed time of the processing of the received message is greater than the time amount associated with the processing budget and the respective age budget, the NE may discard the processed message, such as by using a probabilistic function to determine whether to transmit or drop the processed message.

For example, the time amount associated with the processing budget and the respective age budget may be determined as or using a sum of the processing budget and the respective age budget. For example, the discarding of the processed message may be performed using a probabilistic function.

For example, the probabilistic function may be based on a number of hops between the source node and the destination node associated with the traffic flow.

For example, the information indicating the one or more AoI rules may include any of an activation time period of the one or more AoI rules and/or an offset amount of time for activating the one or more AoI rules after receiving the information indicating the one or more AoI rules.

For example, the message of the traffic flow may be received from any of the source node, a source proxy node or another NE associated with the traffic flow.

For example, the message may be a MSGin5G message.

For example, the message may be received from or transmitted to a MSGin5G server.

FIG. 48 is a diagram illustrating another representative procedure for processing a traffic flow. As shown in FIG. 48, the procedure 4800 may be implemented by a network entity (NE) as described herein, such as but not limited to a SNF 1008 which forwards a traffic flow associated with a source node and a destination node. In FIG. 48, the method may include the NE receiving information indicating one or more age of information (AoI) rules associated with an AoI of the traffic flow at 4802. For example, the one or more AoI rules may include at least a processing budget for the NE to process the traffic flow. For example, the AoI of the traffic flow may be associated with a time difference between generation and reception of a most recent information unit carried by the traffic flow at 3. After 4802, the NE may receive a message of the traffic flow at 4804. For example, the received message may include information indicating a respective age budget of the received message. At 4806, the NE may perform processing on the received message according to a time amount associated with the processing budget and the respective age budget. At 4808, on condition that an elapsed time of the processing of the received message is greater than the time amount associated with the processing budget and the respective age budget, the NE may transmit the processed message which includes an indication that the time amount associated with the processing budget and the respective age budget was exceeded by the elapsed time.

For example, the time amount associated with the processing budget and the respective age budget may be determined as or using a sum of the processing budget and the respective age budget.

For example, the information indicating the one or more AoI rules may include a flag indicating that an updated age budget is included in the transmitted message.

For example, the determining of the updated age budget may be based on the respective age budget and a difference between the processing budget and the elapsed time.

For example, the determining of the updated age budget may be based on a sum of the respective age budget and a difference between the processing budget and the elapsed time.

For example, the determining of the information indicating the one or more AoI rules may include a priority associated with the traffic flow. For example, the processed message may be transmitted towards the destination node using the priority associated with the traffic flow.

For example, the processed message of the traffic flow may be transmitted to any of the destination node, a destination proxy node, or another NE associated with the traffic flow. For example, the message may be a MSGin5G message.

For example, the message may be received from or transmitted to a MSGin5G server.

In certain representative embodiments, a WTRU may perform a method which may include sending, to a network entity in a network, a requested first age-of-information (AoI) indication for a traffic flow, the requested first AoI indication corresponding to one or more AoI parameters for the traffic flow. The WTRU may receive a transmission associated with the traffic flow, and the WTRU may determine an AoI of the traffic flow based on an AoI indication for the received transmission.

For example, upon condition that the determined AoI based on the AoI indication in the received transmission does not satisfy one or more of the AoI parameters corresponding to the requested first AoI indication for the traffic flow, the WTRU may send, to the network entity in the network, a requested second AoI indication for the traffic flow, the requested second AoI indication corresponding to at least one AoI parameter different than the requested first AoI indication.

For example, the WTRU may receive the AoI indication for the received transmission in another transmission separate from the received transmission. Upon condition that the determined AoI based on the AoI indication for the received transmission does not satisfy one or more AoI parameters corresponding to the requested first AoI indication for the traffic flow, the WTRU may send, to the network entity in the network, a requested second AoI indication for the traffic flow, the requested second AoI indication corresponding to at least one AoI parameter different than the requested first AoI indication.

For example, the WTRU may receive, from the network entity, an AoI rule indication for an AoI rule configuration for any of generating, processing and/or forwarding the traffic flow by the network.

For example, the WTRU may receive, from a service or network function (SNF), an AoI rule indication of an AoI rule configuration including one or more rules for any of generating, processing and/or forwarding the traffic flow by the network.

For example, the AoI indication in the received transmission may include a remaining age budget for the transmission and/or an accumulated age of the transmission.

For example, the network entity may include a policy control function (PCF).

For example, the network entity may includes an age-of-information function (AoIF).

For example, the network entity may include an on-route service or network function (SNF) for the traffic flow.

For example, the network entity may be a logical function executed by a source node, and the source node may generate the traffic flow.

For example, the network entity may be a logical function executed by a source proxy node, and the source proxy node may aggregate information from one or more source nodes to generate the traffic flow.

For example, the transmission may be any of a WTRU-originated data plane transmission, a server-originated data plane transmission, a WTRU-originated control plane transmission, or a server-originated control plane transmission. The AoI indication for the received transmission may associated with a time from generation of an information unit in the transmission to a reception of the information unit at the WTRU. For example, the traffic flow may be transmitted within or otherwise associated with a network slice.

In certain representative embodiments, a WTRU may perform a method which may include receiving, by the WTRU from a network entity in a network, a first age-of-information (AoI) rule configuration indication for any of generating, processing and/or forwarding a traffic flow. The WTRU may generate and send, to the network, a transmission associated with the traffic flow according to an AoI rule configuration corresponding to the received first AoI rule configuration indication.

For example, the WTRU may further receive, from the network entity in the network, a second AoI rule configuration indication for the traffic flow. The second AoI rule configuration indication may be different than the first AoI rule configuration indication.

For example, the transmission may be sent by the WTRU to any of a source proxy node, an on-route service or network function (SNF), or the network entity.

For example, the network entity may include any of a policy control function (PCF), an age-of-information function (AoIF) or an on-route service or network function (SNF) for the traffic flow.

For example, the transmission may include an AoI indication for the transmission.

For example, the AoI indication may be included in a network service header (NSH) or a general packet radio service tunneling protocol (GTP) header.

In certain representative embodiments, a network entity may perform a method which may include receiving, from a first node, a requested first age-of-information (AoI) indication for a traffic flow, the requested first AoI indication corresponding to one or more AoI parameters for the traffic flow. The network entity may configure a first AoI rule configuration for the traffic flow at a second node and one or more service or network functions (SNFs) on a route of the traffic flow. The first AoI rule configuration may include one or more rules for any of generating, processing and/or forwarding the traffic flow by the network.

For example, the network entity may process a transmission associated with the traffic flow. The network entity may retransmit or forward the processed transmission associated with the traffic flow, and the processed transmission may include an AoI indication.

For example, the indication of the remaining age budget for the transmission and/or the accumulated age of the transmission may be in a header or a body of the transmission.

For example, the network entity may receive a transmission associated with the traffic flow and an AoI indication of the transmission. Upon condition that the transmission is expired based on the AoI indication and the first AoI rule configuration, the network entity may insert a discard flag in the transmission. The transmission with the inserted discard flag may then be retransmitted or forwarded, by the network entity to a downstream one of the SNFs.

For example, the network entity may receive, from an upstream one of the SNFs, a transmission belonging to the traffic flow. Upon condition that the transmission includes a discard flag, the network entity may determine whether to discard the transmission according to a discard rate in the first AoI rule configuration. Upon condition that the transmission is not to be discarded, transmission may then be retransmitted or forwarded, by the network entity to a downstream one of the SNFs. Upon condition that the transmission is to be discarded, the network entity may discard the transmission.

In certain representative embodiments, the network entity may perform a method which includes receiving, from a first node, a requested first age-of-information (AoI) indication for a traffic flow. The requested first AoI indication may correspond to one or more AoI parameters for the traffic flow. The network entity may configure a first AoI rule configuration for the traffic flow at a second node and one or more service or network functions (SNFs) on a route of the traffic flow, the first AoI rule configuration including one or more rules for any of generating, processing and/or forwarding the traffic flow by the network.

For example, the network entity may receive, from the first node, a second requested AoI indication for the traffic flow. The network entity may configure a second AoI rule configuration for the traffic flow at the second node and one or more service or network functions (SNF) on the route of the traffic flow. The second AoI rule configuration may include one or more rules for any of generating, processing and/or forwarding the traffic flow by the network different than the first AoI rule configuration.

For example, the network entity may include any of a source proxy node, an on-route service or network function (SNF), or a logical AoI function (AoIF).

For example, the transmission may include any of a WTRU-originated data plane transmission, a server-originated data plane transmission, a WTRU-originated control plane transmission, or a server-originated control plane transmission. The AoI indication for the received transmission may be associated with a time from generation of an information unit in the transmission to a reception of the information unit at the WTRU.

In certain representative embodiments, a WTRU may include a processor, a transceiver, and a storage unit which may be configured to execute any of the methods described herein.

In certain representative embodiments, a network element may include a processor, a transceiver, and a storage unit which may be configured to execute any of the methods described herein.

In certain representative embodiments, instructions may be stored on a non-transitory computer readable storage medium which, when executed by a processing device, causes the processing device to perform any of the methods described herein.

Conclusion

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method implemented by a source proxy node to forward a traffic flow from a set of source nodes to a destination node, the method comprising:
   receiving, by the source proxy node from destination node, an age of information (AoI) rule associated with information units carried in the traffic flow, wherein the AoI rule includes an age budget for the source proxy node to process the traffic flow;
   processing, by the source proxy node, one or more received packets of the traffic flow from one or more source nodes of the set of source nodes; and
   transmitting, by the source proxy node, one or more of the processed packets to the destination node, wherein a processing time amount for the processing of the one or more transmitted packets satisfies the age budget.

2. The method of claim 1, further comprising:
   receiving the one or more packets of the traffic flow.

3. The method of claim 1, further comprising:
   sending at least a portion of the AoI rule to the set of source nodes.

4. The method of claim 1, wherein the respective processing time amount for the processing of each of the one or more transmitted packets satisfies the age budget when the respective processing time is less than a time amount corresponding to the age budget.

5. The method of claim 1, wherein the age budget defines a maximum processing interval for processing of the one or more received packets.

6. The method of claim 1, wherein the AoI rule includes a priority associated with the traffic flow, and wherein the transmitting of the one or more processed packets to the destination node is based on the priority associated with the packet flow.

7. The method of claim 1, wherein the one or more processed packets are transmitted to an application server as the destination node.

8. The method of claim 1, wherein the AoI rule includes identification information of the traffic flow, source identification information of the set of source nodes for the traffic flow, and destination identification information of the destination node for the packet traffic flow.

9. A source proxy node to forward a traffic flow from a set of source nodes to a destination node, the method comprising:
   a processor and a transceiver which are configured to:
   receive, from destination node, an age of information (AoI) rule associated with information units carried in the traffic flow, wherein the AoI rule includes age budget for the source proxy node to process the traffic flow,
   process one or more received packets of the traffic flow from one or more source nodes of the set of source nodes, and
   transmit one or more of the processed packets to the destination node, wherein a processing time amount for the processing of the one or more transmitted packets satisfies the age budget.

10. The source proxy node of claim 9, wherein the processor and the transceiver are configured to:
    receive the one or more packets of the traffic flow.

11. The source proxy node of claim 8, wherein the processor and the transceiver are configured to send at least a portion of the AoI rule to the set of source nodes.

12. The source proxy node of claim 8, wherein the respective processing time amount for the processing of each of the one or more transmitted packets satisfies the age budget when the respective processing time is less than a time amount corresponding to the age budget.

13. The source proxy node of claim 9, wherein the age budget defines a maximum processing interval for processing of the one or more received packets.

14. The source proxy node of claim 9, wherein the AoI rule includes a priority associated with the traffic flow, and wherein the processor and the transceiver are further configured to transmit the one or more processed packets to the destination node based on the priority associated with the traffic flow.

15. The source proxy node of claim 9, wherein the one or more processed packets are transmitted to an application server as the destination node.

16. The source proxy node of claim 9, wherein the AoI rule includes identification information of the traffic flow, source identification information of the set of source nodes for the traffic flow, and destination identification information of the destination node for the packet traffic flow.

\* \* \* \* \*